(12) United States Patent
Wu et al.

(10) Patent No.: US 12,126,514 B2
(45) Date of Patent: Oct. 22, 2024

(54) SYSTEM AND METHOD FOR EVALUATING TRANSMISSION PERFORMANCE RELATED TO NETWORK NODE, AND RELATED DEVICE

(71) Applicant: HUAWEI TECHNOLOGIES CO., LTD., Guangdong (CN)

(72) Inventors: Hao Wu, Beijing (CN); Yonggang Chen, Hangzhou (CN); Yongming Zhang, Beijing (CN); Tao Su, Boulogne Billancourt (FR); Qinghua Lei, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 339 days.

(21) Appl. No.: 17/586,853

(22) Filed: Jan. 28, 2022

(65) Prior Publication Data

US 2022/0150150 A1 May 12, 2022

Related U.S. Application Data

(63) Continuation of application No. PCT/CN2020/095574, filed on Jun. 11, 2020.

(30) Foreign Application Priority Data

Jul. 30, 2019 (CN) .......................... 201910696540.0

(51) Int. Cl.
*H04L 43/12* (2022.01)
*H04L 43/0829* (2022.01)
(Continued)

(52) U.S. Cl.
CPC .......... *H04L 43/12* (2013.01); *H04L 43/0852* (2013.01); *H04L 49/70* (2013.01); *H04L 43/0829* (2013.01)

(58) Field of Classification Search
CPC ..... H04L 43/12; H04L 43/0852; H04L 49/70; H04L 43/0829; H04L 45/70;
(Continued)

(56) References Cited

U.S. PATENT DOCUMENTS 8,730,821 B2 * 5/2014 Song ................... H04L 43/0829
370/241.1
9,954,751 B2 4/2018 Zhang et al.
(Continued)

FOREIGN PATENT DOCUMENTS

CN 102685014 A 9/2012
CN 103152223 A 6/2013
(Continued)

OTHER PUBLICATIONS

Moradi Farnaz et al.: "On time-stamp accuracy of passive monitoring in a container execution environment",2016 IFIP Networking. Co Nferenc E (IFIPNetworking) And.Worksho P S, IFIP, May 17, 2016 (May 17, 2016), pp. 117-125,XP032915733.
(Continued)

*Primary Examiner* — Mohamed A Kamara

(57) ABSTRACT

A system and a method for evaluating transmission performance related to a network node, and a related device are disclosed. The system includes a network node and a control node. The network node is configured to obtain a test packet, and process the test packet by using a virtual switch, to generate a mirrored packet corresponding to the test packet. The mirrored packet carries a generation timestamp and generation location information. The control node is configured to receive the mirrored packet from the network node, to evaluate, based on the mirrored packet, transmission performance of at least a part of link that is related to the network node and that is in a path. The control node obtain transmission performance of the network node in the
(Continued)

path and the transmission performance of at least a part of link that is related to the network node.

20 Claims, 19 Drawing Sheets

(51) Int. Cl.
*H04L 43/0852* (2022.01)
*H04L 49/00* (2022.01)

(58) Field of Classification Search
CPC . H04L 41/046; H04L 43/106; H04L 43/0882; H04L 43/20; H04L 47/115; H04L 43/50; H04L 45/302; H04L 47/11; H04L 47/28; H04L 49/208; H04L 41/142; H04L 43/08; H04L 41/0677
See application file for complete search history.

(56) References Cited

U.S. PATENT DOCUMENTS

| | | | |
|---|---|---|---|
| 2007/0147258 A1* | 6/2007 | Mottishaw | H04L 43/106 370/392 |
| 2008/0126561 A1 | 5/2008 | Ryu et al. | |
| 2012/0163191 A1* | 6/2012 | Tokimizu | H04L 47/10 370/242 |
| 2013/0148503 A1* | 6/2013 | Hutchison | H04L 43/50 370/235 |
| 2016/0352601 A1* | 12/2016 | Zhang | H04L 43/0829 |
| 2017/0093667 A1 | 3/2017 | Thirumoorthy et al. | |
| 2017/0134971 A1 | 5/2017 | Huang et al. | |
| 2018/0324197 A1 | 11/2018 | Zettel, II et al. | |

FOREIGN PATENT DOCUMENTS

| | | |
|---|---|---|
| CN | 106506636 A | 3/2017 |
| CN | 106789177 A | 5/2017 |
| CN | 107453884 A | 12/2017 |
| CN | 107690778 A | 2/2018 |
| CN | 107820225 A | 3/2018 |
| CN | 107888455 A | 4/2018 |
| CN | 108075936 A | 5/2018 |
| EP | 1802037 A2 | 6/2007 |

OTHER PUBLICATIONS

Extended European Search Report dated Jul. 27, 2022 issued for European Application No. 20847371.0 (10 pages).
Chuanxiong Guo et al.,"Pingmesh: A Large-Scale System for Data Center Network Latency Measurement and Analysis", SIGCOMM 15,total:14pages.
Yibo Zhu et al., "Packet-Level Telemetry in Large Datacenter Networks". SIGCOMM 15,total:13pages. Published Aug. 17, 2015.
P. Lapukhov et al., "Data-plane probe for in-band telemetry collection draft-lapukhov-dataplane-probe-01",Jun. 10, 2016,total:16pages.
Office Action dated Sep. 30, 2021 issued for Chinese Application No. 201910696540.0 (14 pages).

* cited by examiner

SYSTEM AND METHOD FOR EVALUATING TRANSMISSION PERFORMANCE RELATED TO NETWORK NODE, AND RELATED DEVICE

CROSS-REFERENCE TO RELATED APPLICATIONS

This application is a continuation of International Application No. PCT/CN2020/095574, filed on Jun. 11, 2020, which claims priority to Chinese Patent Application No. 201910696540.0, filed on Jul. 30, 2019. The disclosures of the aforementioned applications are hereby incorporated by reference in their entireties.

TECHNICAL FIELD

This disclosure relates to the field of communications technologies, and in particular, to a system and a method for evaluating transmission performance related to a network node, and a related device.

BACKGROUND

With the continuous development of network technologies, a current network is characterized by a large quantity of network elements and complex services and networking, for example, networks of various data centers. This brings an unprecedented challenge to evaluation of network transmission performance In the conventional technology, a network delay measurement and analysis system (PingMesh) may evaluate transmission performance of a to-be-evaluated network. PingMesh is to establish a probe connection between a pair of servers, to collect a round trip time (RTT) between the pair of servers and identify a network fault between the pair of servers based on the RTT.

In the conventional technology, to cover a plurality of links in a network, an endpoint node in the network needs to establish a probe connection to all other endpoint nodes in the network, to form a probe connection matrix. The endpoint node may be a server or a terminal. This evaluation manner covers transmission performance of all endpoint nodes in a to-be-evaluated network, and causes relatively high communication and calculation overheads. This results in a waste of limited network resources.

SUMMARY

Embodiments of the present invention provide a system and a method for evaluating transmission performance related to a network node, and a related device. The system, the method, and the related device are used to evaluate transmission performance of a network, so as to effectively improve evaluation precision, and reduce communication and calculation overheads for evaluation, thereby effectively reducing resources used for transmission performance evaluation.

A first aspect of the embodiments of the present invention provides a system for evaluating transmission performance related to a network node. The system includes the network node and a control node coupled to the network node, and the network node belongs to a path. The network node is configured to obtain a test packet, where the test packet includes a 5-tuple corresponding to the path, and process the test packet by using a virtual switch, to generate a mirrored packet corresponding to the test packet, where the mirrored packet carries a generation timestamp and generation location information, the generation timestamp is used to indicate a timestamp of a time for generating the mirrored packet, and the generation location information is used to indicate a location at which the mirrored packet is generated. The control node is configured to receive the mirrored packet from the network node, to evaluate, based on the mirrored packet, transmission performance of at least a part of link that is related to the network node and that is in the path.

It may be understood that, when the test packet is a first test packet, if the first test packet is transmitted from a source node to a destination node, the source node is configured to configure the first test packet based on a 5-tuple of a service packet, and forward the first test packet to a next-hop network node; or when the test packet is a second test packet, if the second test packet is transmitted from a destination node to a source node, the destination node is configured to configure the second test packet based on a 5-tuple of a service packet, and forward the second test packet to a next-hop network node.

By using the system according to this aspect, the test packet can be transmitted in a transmission direction of a service packet and/or the test packet is transmitted in a transmission direction opposite to the transmission direction of the service packet. In a process of transmitting the test packet, the network node mirrors the test packet to generate the mirrored packet. The control node evaluates, based on the mirrored packet from the network node, transmission performance that is related to the network node. It can be learned that, there is no need to evaluate all paths included in the system, but only transmission performance of the network node located in the path needs to be evaluated. Therefore, evaluation flexibility is improved, communication and calculation overheads for evaluating transmission performance inside a network node or transmission performance between network nodes are reduced, and resources of a to-be-evaluated network are effectively saved. In addition, because the mirrored packet carries the generation location information, the control node can accurately locate, based on the generation location information, a location at which a transmission performance problem occurs.

According to the first aspect of the embodiments of the present invention, in an optional implementation of the first aspect of the embodiments of the present invention, the transmission performance of at least a part of link that is related to the network node includes transmission performance of the network node, for example, whether a packet loss event or a network congestion event occurs inside the network node; or the transmission performance of at least a part of link that is related to the network node may refer to transmission performance of a link between the network node and any other network node in the path, for example, whether a packet loss event or a network congestion event occurs on a link between the network node and a next-hop network node, for another example, a packet loss rate of the entire path in which the network node is located and that is used to transmit the test packet.

According to the first aspect of the embodiments of the present invention, in an optional implementation of the first aspect of the embodiments of the present invention, the network node is configured to: mirror the test packet by using a first packet mirroring point, to generate a first mirrored packet, where the test packet flows into the virtual switch through the first packet mirroring point; and/or mirror the test packet by using a second packet mirroring point, to generate a second mirrored packet, where the test packet flows out of the virtual switch through the second packet mirroring point.

It may be understood that, the first mirrored packet carries a first generation timestamp, the first generation timestamp is used to indicate a timestamp at which the first packet mirroring point generates the first mirrored packet, the second mirrored packet carries a second generation timestamp, and the second generation timestamp is used to indicate a timestamp at which the second packet mirroring point generates the second mirrored packet.

Optionally, the packet mirroring points are bridges located in the virtual switch of the network node. A bridge used as the first packet mirroring point is disposed at an ingress of the virtual switch, so that a packet flows into the virtual switch through the first packet mirroring point. A bridge used as the second packet mirroring point is disposed at an egress of the virtual switch, so that the packet flows out of the virtual switch through the second packet mirroring point. First generation location information carried in the first mirrored packet may include an identifier used to indicate the first packet mirroring point, and second generation location information carried in the second mirrored packet may include an identifier used to indicate the second packet mirroring point, so that the control node determines, based on the indication of the generation location information, a packet mirroring point at which the mirrored packet is specifically generated.

Optionally, the generation location information carried in the mirrored packet may further include an identifier used to indicate the network node, and the identifier used to indicate the network node may be a universally unique identifier (UUID).

It can be learned that, the network node mirrors the test packet by using the first packet mirroring point and/or the second packet mirroring point of the virtual switch that are/is set by the network node, and reports the mirrored packet to the control node. By using the first mirrored packet and/or the second mirrored packet reported by the network node in the path, the control node may evaluate whether a packet loss event or a network congestion event occurs inside the network node, and may further evaluate whether a packet loss event or a network congestion event occurs on a link between the network node and a next-hop network node, to accurately determine a packet loss location and/or a network congestion location in the to-be-evaluated network. The packet loss location and/or the network congestion location may be a network node inside which a packet loss event or a network congestion event occurs, or the packet loss location and/or the network congestion location are/is located between two adjacent network nodes. This improves efficiency of evaluating transmission performance of the to-be-evaluated network.

According to the first aspect of the embodiments of the present invention, in an optional implementation of the first aspect of the embodiments of the present invention, first event information is generated when the second mirrored packet from the network node is not received within first target duration, where the first event information is used to indicate that a packet loss event occurs inside the network node, and a timing start point of the first target duration is the first generation timestamp carried in the first mirrored packet that is received by the control node.

It can be learned that, after receiving the first mirrored packet from the network node, the control node starts timing of the first target duration based on the first generation timestamp carried in the first mirrored packet, obtains the generation location information carried in the first mirrored packet, and determines, based on the generation location information, whether the second mirrored packet reported by the same network node is received. To be specific, the generation location information carried in the first mirrored packet and the generation location information carried in the second mirrored packet are jointly used to indicate the network node, and if the control node does not receive, within the first target duration, the second mirrored packet reported by the same network node, the control node determines that a packet loss event occurs inside the network node. In this way, accurate locating of the packet loss event inside the network node is implemented, to implement evaluation of transmission performance inside the network node. In addition, the first generation timestamp carried in the first mirrored packet is used to identify whether a packet loss event occurs inside the network node. This reduces a difficulty in evaluating transmission performance of the to-be-evaluated network, and improves efficiency of evaluating the transmission performance.

According to the first aspect of the embodiments of the present invention, in an optional implementation of the first aspect of the embodiments of the present invention, the system further includes a next-hop network node of the network node in the path. The network node is further configured to send a processed test packet to the next-hop network node. The next-hop network node is configured to: receive the test packet from the network node, generate a third mirrored packet based on the test packet, and send the third mirrored packet to the control node. The control node is further configured to generate second event information when the third mirrored packet from the next-hop network node is not received within second target duration, where the second event information is used to indicate that a packet loss event occurs on a link between the network node and the next-hop network node, a timing start point of the second target duration is the second generation timestamp carried in the second mirrored packet that is received by the control node from the network node, the generation location information carried in the second mirrored packet is used to indicate the network node, and generation location information carried in the third mirrored packet is used to indicate the next-hop network node.

It can be learned that, after receiving the second mirrored packet from the network node, the control node starts timing of the second target duration based on the second generation timestamp carried in the second mirrored packet, obtains the generation location information carried in the second mirrored packet, and determines, based on the generation location information, whether the third mirrored packet reported by the next-hop network node of the network node is received. To be specific, the generation location information carried in the second mirrored packet and the generation location information carried in the third mirrored packet indicate two adjacent network nodes, and if the control node does not receive, within the second target duration, the third mirrored packet reported by the next-hop network node, the control node determines that a packet loss event occurs on the link between the network node and the next-hop network node. In this way, accurate locating of the packet loss event on the link between the network nodes is implemented, to implement evaluation of transmission performance of the link between the network nodes. In addition, the second generation timestamp carried in the second mirrored packet is used to identify whether a packet loss event occurs on the link between the network nodes. This reduces a difficulty in evaluating transmission performance of the to-be-evaluated network, and improves efficiency of evaluating the transmission performance.

According to the first aspect of the embodiments of the present invention, in an optional implementation of the first aspect of the embodiments of the present invention, the test packet includes a first identifier field having a first value and a second identifier field having a second value, the first value and the second value jointly indicate that a packet is a test packet, and a bit length of the second identifier field is greater than a bit length of the first identifier field.

It can be learned that, the first identifier field having the first value and the second identifier field having the second value jointly indicate that a packet is a test packet, to implement two-level matching of the test packet. This implements accurate identification of the test packet, and effectively avoids noise caused by misidentification of the test packet.

According to the first aspect of the embodiments of the present invention, in an optional implementation of the first aspect of the embodiments of the present invention, the first identifier field is a pre-matched bit field in a packet header, and the second identifier field is located inside payload data of the test packet.

According to the first aspect of the embodiments of the present invention, in an optional implementation of the first aspect of the embodiments of the present invention, when receiving the test packet, the network node is configured to: determine at least one pre-matched packet from a plurality of received packets based on the first identifier field having the first value; and determine the test packet from the at least one pre-matched packet based on the second identifier field having the second value.

It can be learned that, because the bit length of the first identifier field is less than the bit length of the second identifier field, when a value of a first identifier field in a packet is not the first value, resources of the network node are not consumed to continue to detect whether the packet is a test packet, and most service packets unrelated to the test packet may be filtered out by using the first identifier field, so that resources of the network node are saved, and overheads for identifying the test packet are effectively reduced. When a value of a first identifier field in a pre-matched packet is the first value, the network node determines whether a value of a second identifier field in the packet is the second value. The network node determines that the pre-matched packet is the test packet, only when the value of the second identifier field in the pre-matched packet is the second value. Because the bit length of the second identifier field is relatively long, identification of the test packet by using the second identifier field avoids a case of misidentification, implements accurate identification of the test packet, and completely eliminates noise caused by misidentification of the test packet.

According to the first aspect of the embodiments of the present invention, in an optional implementation of the first aspect of the embodiments of the present invention, the control node obtains a first target delay, where the first target delay is a difference between the second generation timestamp carried in the second mirrored packet and the first generation timestamp carried in the first mirrored packet.

It can be learned that, whether a network congestion event occurs inside the network node can be determined by using the first target latency. This implements evaluation of internal transmission performance of the network node. In addition, the internal transmission performance of the network node is evaluated by using the first generation timestamp carried in the first mirrored packet and the second generation timestamp carried in the second mirrored packet. This reduces a difficulty in evaluating the internal transmission performance of the network node, and improves evaluation efficiency and accuracy.

According to the first aspect of the embodiments of the present invention, in an optional implementation of the first aspect of the embodiments of the present invention, that the control node evaluates, based on the mirrored packet, transmission performance of at least a part of link that is related to the network node and that is in the path includes: The control node generates first congestion indication information when the first target delay is greater than or equal to a first timeout threshold, where the first congestion indication information is used to indicate that a network congestion event occurs inside the network node.

It can be learned that, the control node can compare the obtained first target latency with the first timeout threshold, to determine whether a network congestion event occurs inside the network node. If the network congestion event occurs inside the network node, the control node directly generates the first congestion indication information, to directly prompt operation and maintenance personnel by using the first congestion indication information that the network congestion event occurs inside the network node. This improves efficiency and accuracy of locating network congestion inside the network node.

According to the first aspect of the embodiments of the present invention, in an optional implementation of the first aspect of the embodiments of the present invention, the path further includes a next-hop network node of the network node, and the method further includes: The control node obtains a second target delay, where the second target delay is a difference between a generation timestamp carried in a third mirrored packet that is sent by the next-hop network node and the second generation timestamp carried in the second mirrored packet that is sent by the network node.

It can be learned that, whether a network congestion event occurs between network nodes can be determined by using the second target latency. This implements evaluation of transmission performance of a link between the network node and the next-hop network node. In addition, evaluation is performed by using the second mirrored packet of the network node and the third mirrored packet of the next-hop network node. This reduces a difficulty in evaluating the transmission performance of the link between the network node and the next-hop network node, and improves evaluation efficiency and accuracy.

According to the first aspect of the embodiments of the present invention, in an optional implementation of the first aspect of the embodiments of the present invention, that the control node evaluates, based on the mirrored packet, transmission performance of at least a part of link that is related to the network node and that is in the path includes: The control node generates second congestion indication information when the second target delay is greater than or equal to a second timeout threshold, where the second congestion indication information is used to indicate that a network congestion event occurs on the link between the network node and the next-hop network node.

It can be learned that, the control node can compare the obtained second target latency with the second timeout threshold, to determine whether a network congestion event occurs on the link between the network node and the next-hop network node. If the network congestion event occurs on the link between the network node and the next-hop network node, the control node directly generates the second congestion indication information, to directly prompt the operation and maintenance personnel by using the second congestion indication information that the network congestion event occurs on the link between the network node and the next-hop network node. This improves efficiency and accuracy of locating a network congestion event between network nodes.

According to the first aspect of the embodiments of the present invention, in an optional implementation of the first aspect of the embodiments of the present invention, the generation location information includes a universally unique identifier UUID of the network node, and the method further includes: The control node obtains a UUID of each network node in the path based on a mirrored packet that is received from each network node in the path.

It can be learned that, the control node can determine, for the test packet reported by the network node, a traffic map of the test packet. To be specific, a network can determine, based on generation location information included in a mirrored packet reported by each network node that is used to forward the test packet, a specific network element instance of each network node that the test packet passes through in a transmission process. In this way, the control node can accurately learn a flow direction of a packet transmitted between a source virtual machine and a destination virtual machine, to perform traffic scheduling, congestion control, and the like on a to-be-evaluated network. This improves efficiency of controlling the to-be-evaluated network.

A second aspect of the embodiments of the present invention provides a method for evaluating transmission performance related to a network node. The method is used for the network node, and the network node belongs to a path from a source node to a destination node. The method includes: The network node obtains a test packet, where the test packet includes a 5-tuple corresponding to the path; the network node processes the test packet by using a virtual switch, to generate a mirrored packet corresponding to the test packet, where the mirrored packet carries a generation timestamp and generation location information, the generation timestamp is used to indicate a timestamp of a time for generating the mirrored packet, the generation location information is used to indicate a location at which the mirrored packet is generated, and the mirrored packet is used to evaluate transmission performance of at least a part of link that is related to the network node and that is in the path; and the network node sends the mirrored packet to a control node.

For detailed descriptions of a specific performing process and beneficial effects shown in this aspect, refer to the first aspect. Details are not described again.

According to the second aspect of the embodiments of the present invention, in an optional implementation of the second aspect of the embodiments of the present invention, the transmission performance of at least a part of link that is related to the network node includes transmission performance of the network node, and/or transmission performance of a link between the network node and any other network node in the path.

According to the second aspect of the embodiments of the present invention, in an optional implementation of the second aspect of the embodiments of the present invention, that the network node processes the test packet by using a virtual switch, to generate a mirrored packet of the test packet includes: mirroring the test packet by using a first packet mirroring point of the network node, to generate a first mirrored packet, where the test packet flows into the virtual switch through the first packet mirroring point; and/or mirroring the test packet by using a second packet mirroring point of the network node, to generate a second mirrored packet, where the test packet flows out of the virtual switch through the second packet mirroring point.

According to the second aspect of the embodiments of the present invention, in an optional implementation of the second aspect of the embodiments of the present invention, the test packet includes a first identifier field having a first value and a second identifier field having a second value, the first value and the second value jointly indicate that a packet is a test packet, and a bit length of the second identifier field is greater than a bit length of the first identifier field.

According to the second aspect of the embodiments of the present invention, in an optional implementation of the second aspect of the embodiments of the present invention, the first identifier field is a pre-matched bit field in a packet header, and the second identifier field is located inside payload data of the test packet.

According to the second aspect of the embodiments of the present invention, in an optional implementation of the second aspect of the embodiments of the present invention, that the network node receives the test packet specifically includes: The network node determines at least one pre-matched packet from a plurality of received packets based on the first identifier field having the first value; and the network node determines the test packet from the at least one pre-matched packet based on the second identifier field having the second value.

According to the second aspect of the embodiments of the present invention, in an optional implementation of the second aspect of the embodiments of the present invention, if the network node is the destination node, after the network node obtains the test packet, the method further includes: When the network node receives a first test packet, the network node sends a second test packet to the source node, where a source address carried in the first test packet is an address of the source node and a destination address carried in the first test packet is an address of the destination node, and a source address carried in the second test packet is the address of the destination node and a destination address carried in the second test packet is the address of the source node.

It can be learned that, in a two-way test mode in this aspect, a quantity of times of evaluating transmission performance of each network node in the path and transmission performance between two adjacent network nodes is effectively increased. This improves accuracy of evaluating transmission performance related to a network node, improves accuracy of determining a packet loss location and/or a network congestion location, effectively avoids a case of misdetermining, and can avoid a case in which a packet loss location and/or a network congestion location are/is omitted in an evaluation process.

According to the second aspect of the embodiments of the present invention, in an optional implementation of the second aspect of the embodiments of the present invention, if the network node is the destination node, the method further includes: The second packet mirroring point of the network node ends forwarding of the first test packet.

It can be learned that, in the path, the first test packet is transmitted in a transmission direction of a service packet, and after the first test packet is mirrored at the second packet mirroring point of the destination node to generate the second mirrored packet, the second packet mirroring point ends forwarding of the first test packet. In this way, a case in which the first test packet is forwarded to a virtual machine of the destination node is effectively avoided, so that the virtual machine does not process the first test packet, thereby avoiding noise generated in a process in which the virtual machine processes the first test packet.

According to the second aspect of the embodiments of the present invention, in an optional implementation of the second aspect of the embodiments of the present invention, if the network node is the source node, the method further includes: The second packet mirroring point of the network node ends forwarding of the second test packet.

In the path, a transmission direction of the second test packet is opposite to the transmission direction of the service packet, and after the second test packet is mirrored at the second packet mirroring point of the source node to generate the second mirrored packet, the second packet mirroring point ends forwarding of the second test packet. In this way, a case in which the second test packet is forwarded to a virtual machine of the source node is effectively avoided, so that the virtual machine does not process the second test packet, thereby avoiding noise generated in a process in which the virtual machine processes the second test packet.

According to the second aspect of the embodiments of the present invention, in an optional implementation of the second aspect of the embodiments of the present invention, after the network node processes the test packet by using the virtual switch, to generate the mirrored packet of the test packet, the method further includes: The virtual switch of the network node forwards the test packet to a next-hop network node of the network node in the path based on the 5-tuple included in the test packet.

It can be learned that, the virtual switch of the network node forwards the test packet to the next-hop network node based on the 5-tuple included in the test packet, so that the test packet can be transmitted in a transmission direction of a service packet or transmitted in a transmission direction opposite to a transmission direction of a service packet. In this way, the control node can evaluate, by using the test packet, a transmission fault that occurs in a process of transmitting the service packet. This effectively and accurately evaluates transmission performance of the network node.

A third aspect of the embodiments of the present invention provides a method for evaluating transmission performance related to a network node. The method is used for a control node, the control node is coupled to the network node, and the network node belongs to a path from a source node to a destination node. The method includes: The control node receives a mirrored packet from the network node, where the mirrored packet carries a generation timestamp and generation location information, the generation timestamp is used to indicate a timestamp of a time for generating the mirrored packet, and the generation location information is used to indicate a location at which the mirrored packet is generated; and the control node evaluates, based on the mirrored packet, transmission performance of at least a part of link that is related to the network node and that is in the path.

For specific descriptions of beneficial effects and a specific process in which the control node in this aspect performs the method for evaluating transmission performance related to a network node, refer to the first aspect. Details are not described again.

A fourth aspect of the embodiments of the present invention provides a network node. The network node belongs to a path from a source node to a destination node. The network node includes: an obtaining unit, configured to obtain a test packet, where the test packet includes a 5-tuple corresponding to the path; a processing unit, configured to process the test packet by using a virtual switch, to generate a mirrored packet corresponding to the test packet, where the mirrored packet carries a generation timestamp and generation location information, the generation timestamp is used to indicate a timestamp of a time for generating the mirrored packet, the generation location information is used to indicate a location at which the mirrored packet is generated, and the mirrored packet is used to evaluate transmission performance of at least a part of link that is related to the network node and that is in the path; and a sending unit, configured to send the mirrored packet to a control node.

For specific descriptions of beneficial effects and a specific process in which the network node in this aspect performs the method for evaluating transmission performance related to a network node, refer to the foregoing descriptions. Details are not described again.

According to the fourth aspect of the embodiments of the present invention, in an optional implementation of the fourth aspect of the embodiments of the present invention, the processing unit is configured to: mirror the test packet by using a first packet mirroring point of the network node, to generate a first mirrored packet, where the test packet flows into the virtual switch through the first packet mirroring point; and/or mirror the test packet by using a second packet mirroring point of the network node, to generate a second mirrored packet, where the test packet flows out of the virtual switch through the second packet mirroring point.

According to the fourth aspect of the embodiments of the present invention, in an optional implementation of the fourth aspect of the embodiments of the present invention, the test packet includes a first identifier field having a first value and a second identifier field having a second value, the first value and the second value jointly indicate that a packet is a test packet, and a bit length of the second identifier field is greater than a bit length of the first identifier field.

According to the fourth aspect of the embodiments of the present invention, in an optional implementation of the fourth aspect of the embodiments of the present invention, the first identifier field is a pre-matched bit field in a packet header, and the second identifier field is located inside payload data of the test packet.

According to the fourth aspect of the embodiments of the present invention, in an optional implementation of the fourth aspect of the embodiments of the present invention, the obtaining unit is further configured to: determine at least one pre-matched packet from a plurality of received packets based on the first identifier field having the first value; and determine the test packet from the at least one pre-matched packet based on the second identifier field having the second value.

A fifth aspect of the embodiments of the present invention provides a control node. The control node is coupled to a network node, and the network node belongs to a path from a source node to a destination node. The control node includes: a receiving unit, configured to receive a mirrored packet from the network node, where the mirrored packet carries a generation timestamp and generation location information, the generation timestamp is used to indicate a timestamp of a time for generating the mirrored packet, and the generation location information is used to indicate a location at which the mirrored packet is generated; and a processing unit, configured to evaluate, based on the mirrored packet, transmission performance of at least a part of link that is related to the network node and that is in the path.

For specific descriptions of beneficial effects and a specific process in which the control node in this aspect performs the method for evaluating transmission performance related to a network node, refer to the foregoing descriptions. Details are not described again.

According to the fifth aspect of the embodiments of the present invention, in an optional implementation of the fifth aspect of the embodiments of the present invention, the receiving unit is configured to: receive a first mirrored packet from the network node, where first generation location information carried in the first mirrored packet is used to indicate that the first mirrored packet is generated at a first packet mirroring point of the network node, and a first generation timestamp carried in the first mirrored packet is used to indicate a timestamp at which the first packet mirroring point generates the first mirrored packet; and/or receive a second mirrored packet from the network node, where second generation location information carried in the second mirrored packet is used to indicate that the second mirrored packet is generated at a second packet mirroring point of the network node, and a second generation timestamp carried in the second mirrored packet is used to indicate a timestamp at which the second packet mirroring point generates the second mirrored packet.

According to the fifth aspect of the embodiments of the present invention, in an optional implementation of the fifth aspect of the embodiments of the present invention, the processing unit is configured to generate first event information when the second mirrored packet from the network node is not received within first target duration, where the first event information is used to indicate that a packet loss event occurs inside the network node, a timing start point of the first target duration is the first generation timestamp carried in the first mirrored packet that is received by the receiving unit, and the first generation location information carried in the first mirrored packet and the second generation location information carried in the second mirrored packet are jointly used to indicate the network node.

According to the fifth aspect of the embodiments of the present invention, in an optional implementation of the fifth aspect of the embodiments of the present invention, the path further includes a next-hop network node of the network node, and the processing unit is configured to generate second event information when a third mirrored packet from the next-hop network node is not received within second target duration, where the second event information is used to indicate that a packet loss event occurs on a link between the network node and the next-hop network node, a timing start point of the second target duration is the second generation timestamp carried in the second mirrored packet that is received by the receiving unit from the network node, and the generation location information carried in the second mirrored packet is used to indicate the network node.

According to the fifth aspect of the embodiments of the present invention, in an optional implementation of the fifth aspect of the embodiments of the present invention, the processing unit is further configured to obtain a first target delay, where the first target delay is a difference between a second generation timestamp and a first generation timestamp that are sent by a same network node.

According to the fifth aspect of the embodiments of the present invention, in an optional implementation of the fifth aspect of the embodiments of the present invention, the processing unit is configured to generate first congestion indication information when the first target delay is greater than or equal to a first timeout threshold, where the first congestion indication information is used to indicate that a network congestion event occurs inside the network node.

According to the fifth aspect of the embodiments of the present invention, in an optional implementation of the fifth aspect of the embodiments of the present invention, the path includes a network node and a next-hop network node that are adjacent, the next-hop network node is a next-hop network node of the network node, and the processing unit is further configured to obtain a second target delay, where the second target delay is a difference between a generation timestamp carried in a third mirrored packet that is sent by the next-hop network node and the second generation timestamp carried in the second mirrored packet that is sent by the network node.

According to the fifth aspect of the embodiments of the present invention, in an optional implementation of the fifth aspect of the embodiments of the present invention, the processing unit is configured to generate second congestion indication information when the second target delay is greater than or equal to a second timeout threshold, where the second congestion indication information is used to indicate that a network congestion event occurs on a link between the network node and the next-hop network node.

According to the fifth aspect of the embodiments of the present invention, in an optional implementation of the fifth aspect of the embodiments of the present invention, the generation location information includes a universally unique identifier UUID of the network node, and the processing unit is configured to obtain the UUID of each network node in the path based on the mirrored packet that is received from each network node in the path.

A sixth aspect of the embodiments of the present invention provides a device for evaluating transmission performance related to a network node. The device includes a processing circuit, a storage medium, and a communications interface, and the processing circuit is configured to execute instructions stored in the storage medium, so that the device is used as a network node to perform the method according to the first aspect or the second aspect.

A seventh aspect of the embodiments of the present invention provides a device for evaluating transmission performance related to a network node. The device includes a processing circuit, a storage medium, and a communications interface, and the processing circuit is configured to execute instructions stored in the storage medium, so that the device is used as a control node to perform the method according to the first aspect or the third aspect.

An eighth aspect of the embodiments of the present invention provides a computer-readable storage medium. The computer-readable storage medium stores computer instructions, and when the computer instructions are run on a computer, the computer is enabled to perform the method according to any one of the first aspect, the second aspect, or the third aspect.

A ninth aspect of the embodiments of the present invention provides a computer program product. The computer program product includes computer program code, and when the computer program code is run on a computer, the computer is enabled to perform the method according to any one of the first aspect, the second aspect, or the third aspect.

DESCRIPTION OF EMBODIMENTS

The following clearly and completely describes the technical solutions in the embodiments of the present invention with reference to the accompanying drawings in the embodiments of the present invention. It is clear that, the described embodiments are merely a part rather than all of the embodiments of the present invention. All other embodiments obtained by a person skilled in the art based on the embodiments of the present invention without creative efforts shall fall within the protection scope of the present invention.

Figure 1:
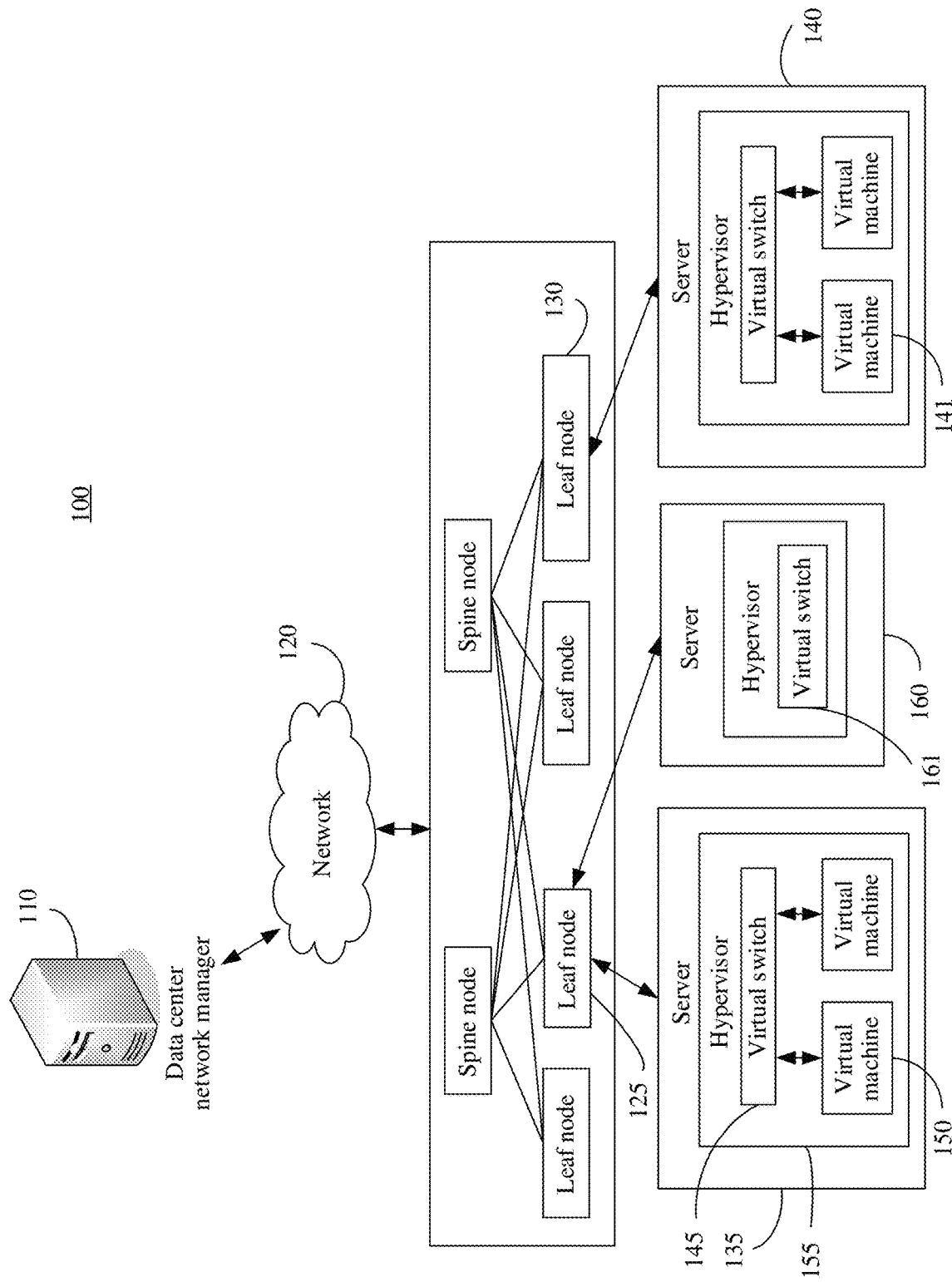
FIG. 1 is a schematic diagram of a network architecture of a network according to this disclosure.

This disclosure provides a method for evaluating transmission performance related to a network node. The following first describes, with reference to FIG. 1, a network architecture of a network to which the method in this disclosure is applied. A specific network type of the network is not limited in this embodiment. For example, the network may be a data center network. This embodiment is described by using an example in which the network is a data center network. As shown in FIG. 1, a data center network 100 includes at least one data center network manager (DCNM) 110, and the DCNM 110 manages a leaf switch and a spine switch through a network 120. The data center network manager 110 may be implemented in a form of a server on which an application (App) responsible for network management is integrated. Each leaf switch may be implemented in a form of a top of rack switch (ToR Switch), that is, each leaf switch may be located in a rack unit (or referred to as Rack).

FIG. 1 is used as an example. Two leaf switches such as a leaf 125 and a leaf 130 may be located in one rack unit, and the rack unit can accommodate one or more servers (for example, a server 135, a server 160, or a server 140 in FIG. 1). Each leaf switch is configured to route or forward a communication message between a server in the rack unit and a server located in another rack unit. Each server (the server 135 associated with the leaf switch 125 in FIG. 1 is used as an example) may accommodate one or more virtual switches 145. The virtual switch and a virtual machine are created by and run on a hypervisor 155 of each server, where the hypervisor 155 implements virtualization and scheduling of a physical resource on the server, so that the physical resource is provided for one or more virtual machines to use.

Each virtual switch 145 may be configured to manage communication between virtual machines in a virtual machine network and/or a virtual network, where the virtual machine network and/or the virtual network are/is constituted by the virtual machines. Each virtual switch 145 is implemented by using software running on the server 135. In this way, the virtual switch 145 can implement a function of a physical switch Similarly, each virtual machine 150 is implemented by using software running on the server 135. For the data center network 100, any quantity of servers may exist, and each server may accommodate any quantity of virtual switches and any quantity of virtual machines.

Optionally, the data center network shown in FIG. 1 may further include a server 160 that forwards a received service packet. For example, if a virtual machine 150 carried on the server 135 sends a service packet to a virtual machine 141 carried on the server 140, the server 140 may forward, to the virtual machine 141, the service packet sent by the virtual machine 150. As shown in FIG. 1, it can be learned that the server 160 only needs to forward the service packet. Therefore, on the server 160, a virtual switch 161 is disposed, but a virtual machine does not need to be disposed.

The server 135 and the leaf switch 125 that is associated with the server 135 are disposed in one rack unit. This is not shown in FIG. 1. Another server may also be accommodated in the rack. The leaf switch 125 and the leaf switch 130 are responsible for performing routing processing or forwarding processing on communication information of the server (including a virtual machine running on the server) that is used as a sending party or a receiving party and that is in the rack. Specifically, top of rack switches refer to the switches 125 and 130, and other leaf switches in FIG. 1. The leaf switches 125 and 130 can be used to provide a backup and fault tolerance for communication of the server, the virtual machine, and the virtual switch in the rack. In this way, the leaf switch 125 and the leaf switch 130 are two equivalent switches. These leaf switches and the spine switch may be configured to communicate with the data center network manager 110. The data center network manager 110 may be configured to manage communication between servers (physical machines or virtual machines) inside different racks by controlling the spine switch and the leaf switches.

Figure 2:
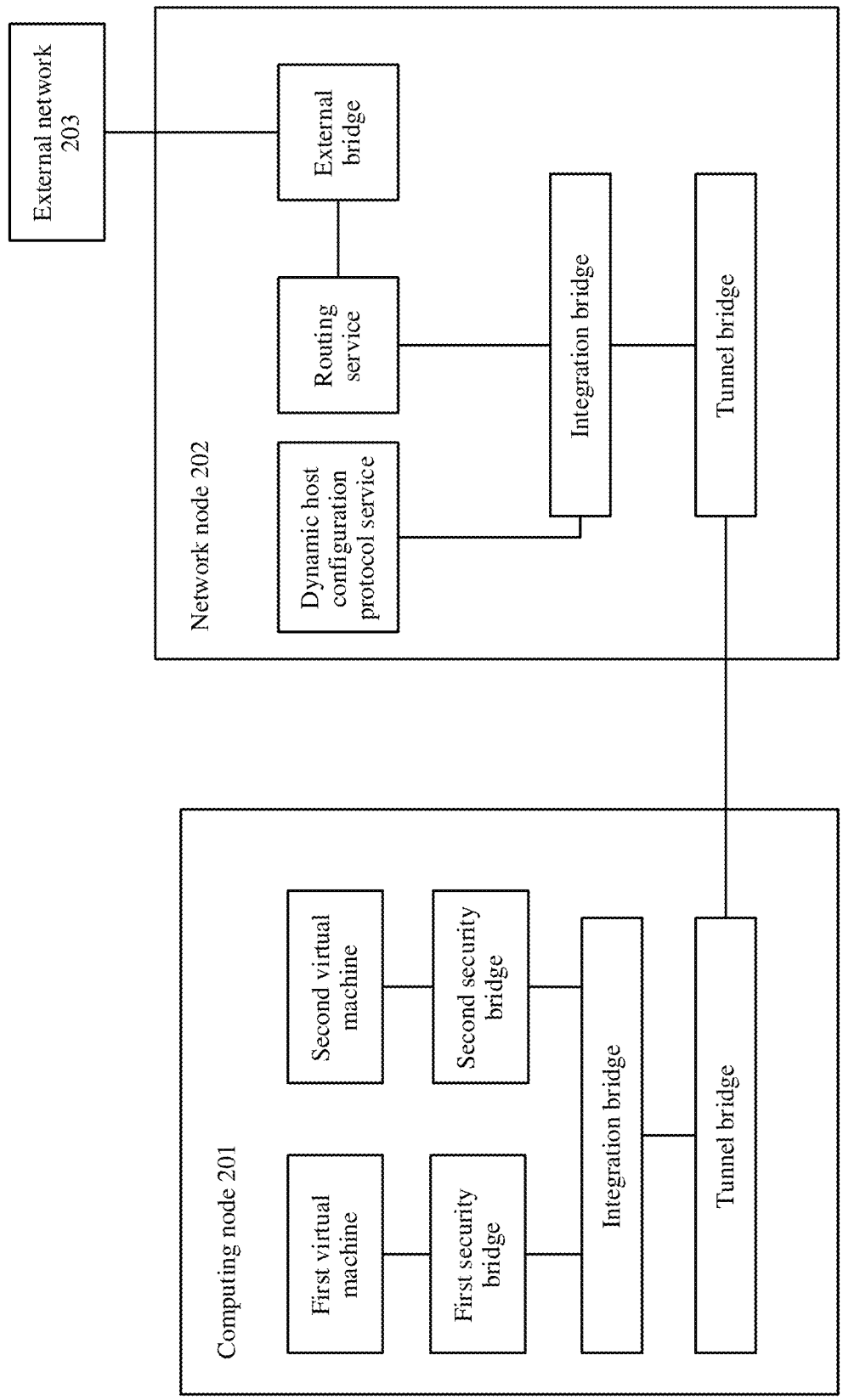
FIG. 2 is a schematic diagram of a local network architecture of a virtual network included in a network according to this disclosure.

With the large-scale cloud deployment of the data center network, the data center network shown in FIG. 1 is divided into an underlay network and an upper-layer virtual network. The underlay network mainly includes physical devices (that is, spine nodes and leaf nodes as shown in FIG. 1). The virtual network mainly includes virtual devices (that is, virtual switches and virtual machines located on the server shown in FIG. 1). To make full use of resources, all tenant services run in upper-layer virtual networks, and tenant resources are isolated by using different virtual networks. For a better understanding, a structure of a virtual network including virtual devices is described below by using an example with reference to FIG. 2. FIG. 2 shows a typical virtual network structure on a cloud computing management platform (OpenStack).

Generally, implementation forms of a virtual network on OpenStack include a virtual local area network (VLAN), generic routing encapsulation (GRE), a virtual extensible local area network (VXLAN), and the like. In the example shown in FIG. 2, an example in which the virtual network on OpenStack is implemented as a VXLAN is used for description. Still referring to FIG. 2, OpenStack includes a computing node (CNA) 201 and a network node 202. It should be noted that, in FIG. 2, one computing node 201 and one network node 202 are used as an example for description. Specific quantities of computing nodes 201 and network nodes 202 included on the OpenStack are not limited.

On OpenStack, all network-related logical management, such as a domain name system (DNS), a dynamic host configuration protocol (DHCP), and routing, is implemented on the network node 202. The computing node 201 only needs to provide basic network function support for deployed virtual machines, including isolating virtual machines of different tenants, performing security policy management (security group), and the like.

FIG. 2 is still used as an example. The computing node 201 includes two virtual machines: a first VM and a second VM. The computing node 201 further includes a plurality of bridges, and the bridge is used to represent a virtual device that can be connected to different network devices and that is implemented by using software code. Different virtual machines inside the computing node 201 are connected to an integration bridge (br-int) by using corresponding security bridges (qbr). Specifically, the first VM is connected to the integration bridge by using a corresponding first security bridge, and the second VM is connected to the integration bridge by using a corresponding second security bridge. Then, the integration bridge is connected, by using a tunnel bridge, to an external network of a physical host that carries the computing node 201.

For example, after receiving a service packet sent by the corresponding first VM, the first security bridge allocates an internal vlan number to the service packet. The integration bridge is a bridge configured to implement an internal network function of the computing node 201. br-int is used as a normal layer-2 switch, and is configured to forward the service packet based on the vlan number and a media access control (MAC) address that are carried in the service packet.

br-int is connected to the tunnel bridge (br-tun). br-tun communicates with br-tun on another physical machine, to form a unified communication layer. br-tun is used to form a point-to-point communication network between a network node and a computing node and between different computing nodes. A large amount of data is exchanged between the network node and the computing node and between the different computing nodes through this network. In this way, communication between the network node and the computing node is enabled.

The network node 202 includes three bridges: br-tun, br-int, and an external bridge (br-ex). br-tun of the network node 202 receives a service packet from br-tun of the computing node 201, and forwards the service packet to br-int of the network node 202. A dynamic host configuration protocol service connected to br-int is used to provide a DHCP service for the service packet. br-int forwards, to a routing service, the service packet received from br-tun. The routing service configures, for the service packet, an address of an external network that the service packet needs to access, and the routing service sends the service packet to br-ex. br-ex is configured to connect to an external network 203. Therefore, when br-ex receives the service packet, br-ex sends the service packet to the external network 203. In this way, communication between the virtual machine on the computing node and the external network 203 is implemented.

It can be learned from FIG. 1 and FIG. 2 that, the data center network has a plurality of physical devices (such as the foregoing servers) and a plurality of virtual devices (such as the foregoing bridges and virtual machines), and tenant services are isolated by using different virtual networks. Specifically, inside the computing node 201 and the network node 202, the security bridge allocates different VLAN numbers to different tenant services to isolate the different tenant services inside the nodes. Outside the nodes, different tenant services are isolated by using a virtual extensible LAN (VxLAN). Different tenants correspond to different virtual networks. When a large quantity of tenants use the data center network, networking of the data center network is complex. This brings great challenges to operation and maintenance and transmission performance evaluation for the data center network. Details are as follows.

The data center network includes both a physical device and a virtual device. When a source virtual machine needs to access a destination virtual machine, an end-to-end connection between the source virtual machine and the destination virtual machine crosses a plurality of components at different layers. For example, the end-to-end connection includes a plurality of network nodes and a plurality of physical switches. Therefore, the end-to-end connection has a large network scale, and is extremely complex. Once a fault occurs in the end-to-end connection, because there are many potential fault points in the end-to-end connection, it is very difficult and costly to locate the fault.

There is no effective method for evaluating and figuring out a "gray failure" of the data center network. The "gray failure" means that a same network element in the data center network has abnormal behavior for only some packets, but can correctly process most other packets. Due to the "gray failure" phenomenon of the data center network, a random packet loss is a most common failure. A recurrence degree is low, a symptom is not obvious, but impact is extensive. Currently, frontline operation and maintenance personnel manually check the "gray failure". In this case, the "gray failure" check is difficult and inefficient. In addition, locating of the "gray failure" is time-consuming.

With large-scale deployment of public cloud services, roles included in the data center network are increasing. An application, a network, or a user operation error may cause a same abnormal symptom. Therefore, it is difficult to diagnose a fault by viewing only the symptom. Based on statistics, only 50% of internal data center network failures are caused by network faults. In a complex data center network, a failure cause needs to be quickly diagnosed to check whether a fault is a local network fault. It can be learned that, it is very difficult to diagnose a fault in the data center network.

To diagnose the fault in the data center network, a PingMesh technology is provided currently. PingMesh is a fault test tool for the data center network. PingMesh runs a specific agent program on a server. Transmission control protocol (TCP) communication (or referred to as a probe connection) is simulated between two servers by using their respective configured agents, to collect round trip time (RTT) data between the two agents, so as to test a network fault between the pair of agents based on the data.

Figure 3:
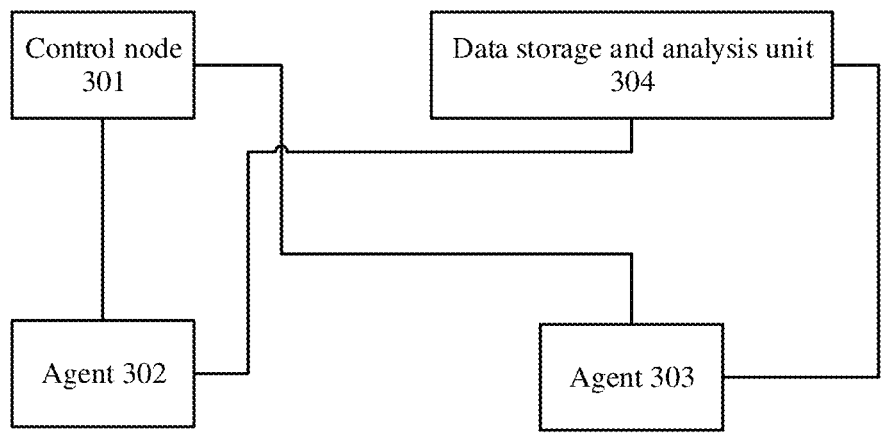
FIG. 3 is a schematic diagram of a network architecture of a network delay measurement and analysis system according to the conventional technology.

A structure of components included in PingMesh is described below with reference to FIG. 3 by using an example. PingMesh includes three main components.

A control node 301 is a centralized control component, and is configured to calculate a network global topology of the data center network. The control node 301 is disposed on a server or a server cluster that is configured to perform a control function. The network global topology refers to a detection connection matrix of all agents in the data center network. To be specific, in servers of each TOR switch, the control node 301 selects an agent of a server as a representative of the ToR switch to communicate with an agent representative of another ToR switch. As shown in FIG. 3, servers, selected by the control node 301, of different TOR switches communicate with each other by using an agent 302 and an agent 303 that are carried on the servers. To cover all links in the data center network, an agent of a TOR switch establishes communication duplex connections with agents of all other TOR switches in the data center network. A communication duplex connection established between a pair of agents means that two probe connections are established between the pair of agents, and the two agents each are used as an initiator. The control node 301 is configured to: record, in a packet internet groper (ping) list, a peer agent with which each agent needs to communicate, and deliver the list to the agent.

An agent is a distributed component, and an agent process runs on each server. After an agent is selected as a representative agent of a ToR switch, the agent initiates a probe connection to all agents included in the ping list. FIG. 3 is still used as an example. The agent 302 sends a probe connection establishment packet (probe packet) to the agent 303 based on the ping list. After receiving the probe packet, the agent 303 returns a corresponding reply packet to the agent 302, and the agent 302 calculates RTT data based on the reply packet. A probe connection is initiated periodically. The agent periodically reports locally collected RTT data to a data storage and analysis unit 304.

The data storage and analysis unit 304 is a centralized component. The data storage and analysis unit 304 is disposed on a server or a server cluster configured to perform a control function, and is configured to store RTT data reported by each agent, so as to calculate a network packet loss rate, and check, based on the rate, whether the network is faulty.

PingMesh does not directly measure a packet loss, but indirectly calculates a packet loss rate between a pair of agents based on RTT data. Specifically, the agent sets an initial value of a timeout threshold of a probe connection packet to 3 seconds and a maximum quantity of retransmissions of the probe connection packet to 2, and sets that the timeout is doubled each time the probe connection packet is retransmitted. Therefore, PingMesh infers, based on a value of a final RTT, a quantity of retransmissions that have occurred. For example, if measured RTT data is 3 to 9 seconds, one retransmission occurs; if the RTT data is 9 to 21 seconds, two retransmissions occur. The packet loss rate is calculated by using the following formula:

$$\frac{probes\_witth\_3s\_rtt + probes\_with\_9s\_rtt}{total\_successful\_probes}$$

where probes_with_3s_rtt represents a quantity of retransmissions of the RTT data that falls within an interval [3s, 9s), probes_with_9s_rtt represents a quantity of retransmissions of the RTT data that falls within an interval [9s, 21s), and total_successful_probes is a total quantity of times of successfully returning reply packets. PingMesh specifies a network fault testing rule in advance. For example, when a packet loss rate in a network is greater than 0.1%, the data storage and analysis unit 304 determines that a network fault exists.

The following describes a technical disadvantage of performing fault diagnosis on the data center network by using PingMesh.

PingMesh implements measurement for networks between different ToR switches. PingMesh can only find a network fault on an upper layer of a ToR switch through a test, but cannot diagnose a virtual network fault inside each server covered by the ToR switch. That is, PingMesh cannot diagnose a network failure inside each node (for example, a computing node or a network node) included in the data center network. It can be learned that, a test granularity of PingMesh is coarse, and cannot cover a test of a virtual network inside a server. In a cloud data center, there are a large quantity of virtual bridges and containerized network elements in virtual networks inside a computing node, and PingMesh cannot test whether these virtual networks are faulty.

PingMesh measures RTT data of a probe connection only on a server side and determines a network fault between a pair of agents based on the RTT data. However, a network between the pair of agents is still in a "black-box" state. Even though it is found that a connection failure exists in the network between the pair of agents, a specific packet loss location and/or a specific network congestion location in a communication path between the pair of agents cannot be accurately determined. It can be learned that, PingMesh cannot accurately obtain a packet loss location and/or a network congestion location in the network through a test.

By using PingMesh, an agent of a TOR switch needs to establish a probe connection with agents of all other TOR switches included in the data center network, to form a probe connection matrix. The probe connection matrix covers all TOR switches included in the data center network. In this "full coverage" manner of evaluating transmission performance of a network node, if a network fault between two servers needs to be obtained, "full coverage" detection needs to be performed on the data center network. This causes relatively high communication and calculation overheads. In a service-first data center network, limited service resources are preempted, thereby resulting in a waste of data center network resources.

This disclosure provides a method for evaluating transmission performance related to a network node, where the method can effectively reduce networking resources. To better understand the method in this embodiment, the following first describes, with reference to FIG. 4 by using an example, a network architecture of a virtual network of a network to which the method in this embodiment is applied.

Figure 4:
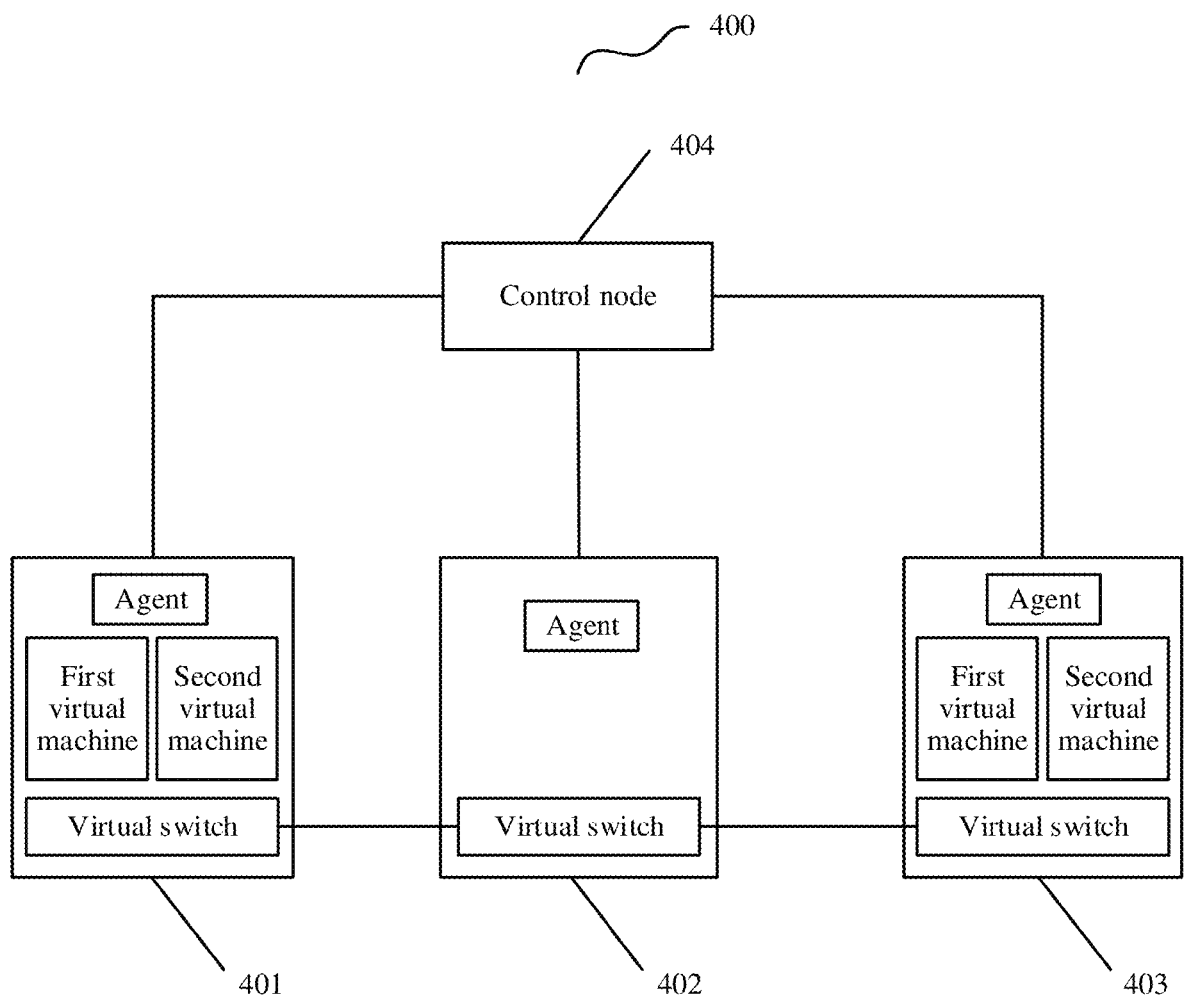
FIG. 4 is a schematic diagram of a network architecture of a virtual network according to this disclosure.

As shown in FIG. 4, a network 400 includes a plurality of paths. The method for evaluating transmission performance related to a network node is used to evaluate any one path in the plurality of paths. A to-be-evaluated path includes a plurality of network nodes. The plurality of network nodes include a source node 401, at least one forwarding node 402, and a destination node 403 that are sequentially coupled. The network 400 further includes a control node 404, where the control node 404 is coupled to each network node. The source node 401 and the destination node 403 each carry one or more virtual machines. For specific descriptions of the source node 401 and the destination node 403, refer to a specific description of the computing node shown in FIG. 2. Details are not described again. A specific node type of the forwarding node 402 and a quantity of the forwarding nodes 402 are not limited in this embodiment, provided that the forwarding node 402 can forward a service packet between the source node 401 and the destination node 403. For a specific description of the forwarding node 402, refer to a specific description of the network node shown in FIG. 2. Details are not described again. A host machine of the control node 404 in this embodiment may be a single computer device or a cluster of computer devices, and the control node 404 is also a part of the computer device, for example, an integrated circuit chip. In an implementation process, steps performed by the control node in the method in this embodiment may be implemented by using an integrated logical circuit of hardware in a processor or by using instructions in a form of software.

To implement the method for evaluating transmission performance related to a network node in this embodiment, an agent may be configured on each network node in this embodiment. The agent and a virtual switch included on each network node in this embodiment are two independent processes.

Still referring to FIG. 4, a virtual switch is further configured on each of the source node 401, the forwarding node 402, and the destination node 403. Optionally, one or more virtual switches may be configured on each network node. In this embodiment, an example in which one virtual switch is configured on each network node is used for description. Specifically, the virtual switch and a virtual machine on each network node are created and run on a hypervisor of the network node, where the hypervisor implements virtualization and scheduling of a physical resource on the network node, so that the physical resource is provided for one or more virtual machines to use.

A specific network type of the network 400 is not limited in this embodiment. For example, the network 400 may be a data center network.

Figure 5:
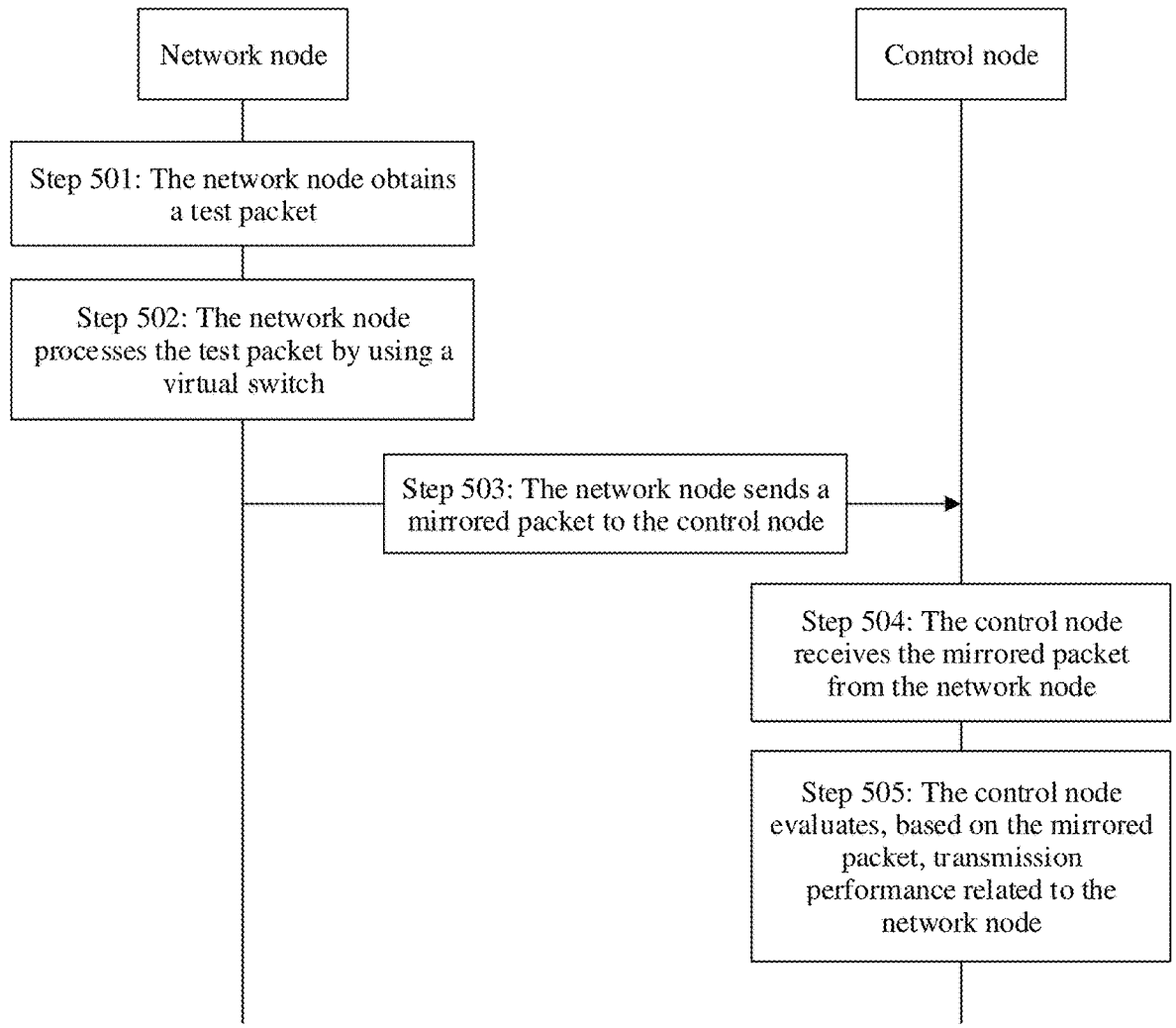
FIG. 5 is a flowchart of steps in a method for evaluating transmission performance related to a network node according to an embodiment of this disclosure.

Based on the architecture of the virtual network shown in FIG. 4, the following describes, with reference to FIG. 5 by using an example, a specific process of performing the method for evaluating transmission performance related to a network node in this embodiment.

Step 501: A network node obtains a test packet.

The network node in this embodiment may be any one of the source node, the forwarding node, and the destination node that are shown in FIG. 4, and a specific node type is not limited in this embodiment.

The test packet in this embodiment is a packet corresponding to a service packet, and the service packet is a packet sent by a source virtual machine located on the source node to a destination virtual machine located on the destination node. A type of a service implemented by using the service packet is not limited in this embodiment. For example, the source virtual machine of the source node accesses the destination virtual machine of the destination node by using the service packet. For another example, a packet internet groper (Ping) test for a network between the source virtual machine of the source node and the destination virtual machine of the destination node is implemented by using the service packet. When it is determined that an abnormality occurs in the service packet, for example, a packet loss occurs in the service packet sent from the source virtual machine of the source node to the destination virtual machine of the destination node, or a delay is excessively large, a test packet may be configured for the service packet.

Optionally, the test packet corresponding to the service packet may be a first test packet. Specifically, a 5-tuple included in the first test packet is used to identify a path for transmitting the service packet. More specifically, a source address included in the first test packet is an internet protocol (IP) address of the source node, a destination address included in the first test packet is an IP address of the destination node, a source port is a port of the source node, and a destination port is a port of the destination node. It can be learned that, the first test packet is transmitted along the service packet transmission path, to track transmission of the service packet between the source node and the destination node.

Optionally, the test packet corresponding to the service packet may be a second test packet. Specifically, a 5-tuple included in the second test packet is used to identify a path opposite to a path for transmitting the service packet. More specifically, a source address included in the second test packet is an IP address of the destination node, a destination address included in the second test packet is an IP address of the source node, a source port is a port of the destination node, and a destination port is a port of the source node. It can be learned that, the second test packet is transmitted in a direction opposite to a direction in which the service packet is transmitted.

Step 502: The network node processes the test packet by using a virtual switch.

A specific process in which the network node processes the test packet is described below by using an example.

The virtual switch included in the network node includes one or more packet mirroring points, and the packet mirroring point is configured to mirror the test packet to generate a mirrored packet. For a specific description of the virtual switch, refer to the foregoing description. Details are not described again. The packet mirroring point in this embodiment may be a virtual bridge included in the virtual switch.

Specifically, the mirrored packet generated by the packet mirroring point in this embodiment includes a generation timestamp, and the generation timestamp is used to indicate a timestamp of a time at which the packet mirroring point generates the mirrored packet.

The mirrored packet in this embodiment further includes generation location information. The generation location information is used to indicate a location at which the mirrored packet is generated. Optionally, the generation location information is used to indicate the network node that generates the mirrored packet. For example, the generation location information includes a UUID of the network node that generates the mirrored packet. Optionally, the generation location information is used to indicate an identifier of the packet mirroring point that generates the mirrored packet. For example, if the packet mirroring point is located at an ingress bridge of the virtual switch, where the ingress bridge of the virtual switch means that a packet flows into the virtual switch through the bridge, the generation location information in this embodiment includes an identifier of the ingress bridge, and the identifier of the ingress bridge may be a character "in". For another example, if the packet mirroring point is located at an egress bridge of the virtual switch, where the egress bridge of the virtual switch means that a packet flows out of the virtual switch through the bridge, the generation location information in this embodiment includes an identifier of the egress bridge, and the identifier of the egress bridge may be a character "out".

Optionally, if the test packet is the first test packet, and the network node is the source node or the forwarding node, the virtual switch of the network node forwards the first test packet to a next-hop network node based on the 5-tuple included in the first test packet. If the network node is the destination node, the virtual switch of the network node ends, based on the 5-tuple in the first test packet, forwarding of the first test packet.

Optionally, if the test packet is the second test packet, and the network node is the destination node or the forwarding node, the virtual switch of the network node forwards the second test packet to a next-hop network node based on the 5-tuple included in the second test packet. If the network node is the source node, the virtual switch of the network node ends, based on the 5-tuple in the second test packet, forwarding of the second test packet.

Step 503: The network node sends the mirrored packet to a control node.

In this embodiment, after the network node generates the mirrored packet, the network node may send the mirrored packet to the control node. Optionally, if the mirrored packet includes the UUID of the network node, the UUID in the mirrored packet may be configured in the mirrored packet by the packet mirroring point. Optionally, the packet mirroring point of the network node may send the mirrored packet to an agent of the network node, and the agent configures the UUID of the network node in the mirrored packet.

Step 504: The control node receives the mirrored packet from the network node.

Step 505: The control node evaluates, based on the mirrored packet, transmission performance related to the network node.

The transmission performance related to the network node refers to transmission performance of at least a part of link that is related to the network node and that is in a path. Specifically, the control node evaluates, based on the generation timestamp and the generation location information that are carried in the mirrored packet, the transmission performance of at least a part of link that is related to the network node. The transmission performance of at least a part of link that is related to the network node may specifically refer to one or more of the following: whether a packet loss event occurs inside the network node, whether a packet loss event occurs between the network node and the next-hop network node, whether a network congestion event occurs inside the network node, whether a network congestion event occurs between the network node and the next-hop network node, a packet loss rate of the path, or the like, where the next-hop network node is specifically a next-hop network node of the network node in the path.

According to the method in this embodiment, there is no need to perform "full coverage" detection on all paths included in the network, and the control node can analyze, by using a mirrored packet reported by each network node in one path in the network, the transmission performance of at least a part of link that is related to the network node and that is in the path. This improves transmission performance evaluation flexibility, effectively reduces calculation overheads for evaluating transmission performance, and effectively reduces service resources for networking. Therefore, if a packet loss event occurs in the path, the control node can accurately locate a network node inside which the packet loss event occurs and/or a link on which the packet loss event occurs. For another example, if a network congestion event occurs in the path, the control node can accurately locate a network node inside which the network congestion event occurs and/or a link on which the network congestion event occurs. This improves accuracy of evaluating transmission performance related to the network node, reduces a difficulty in evaluating the transmission performance related to the network node, and improves transmission performance evaluation efficiency.

Figure 6:
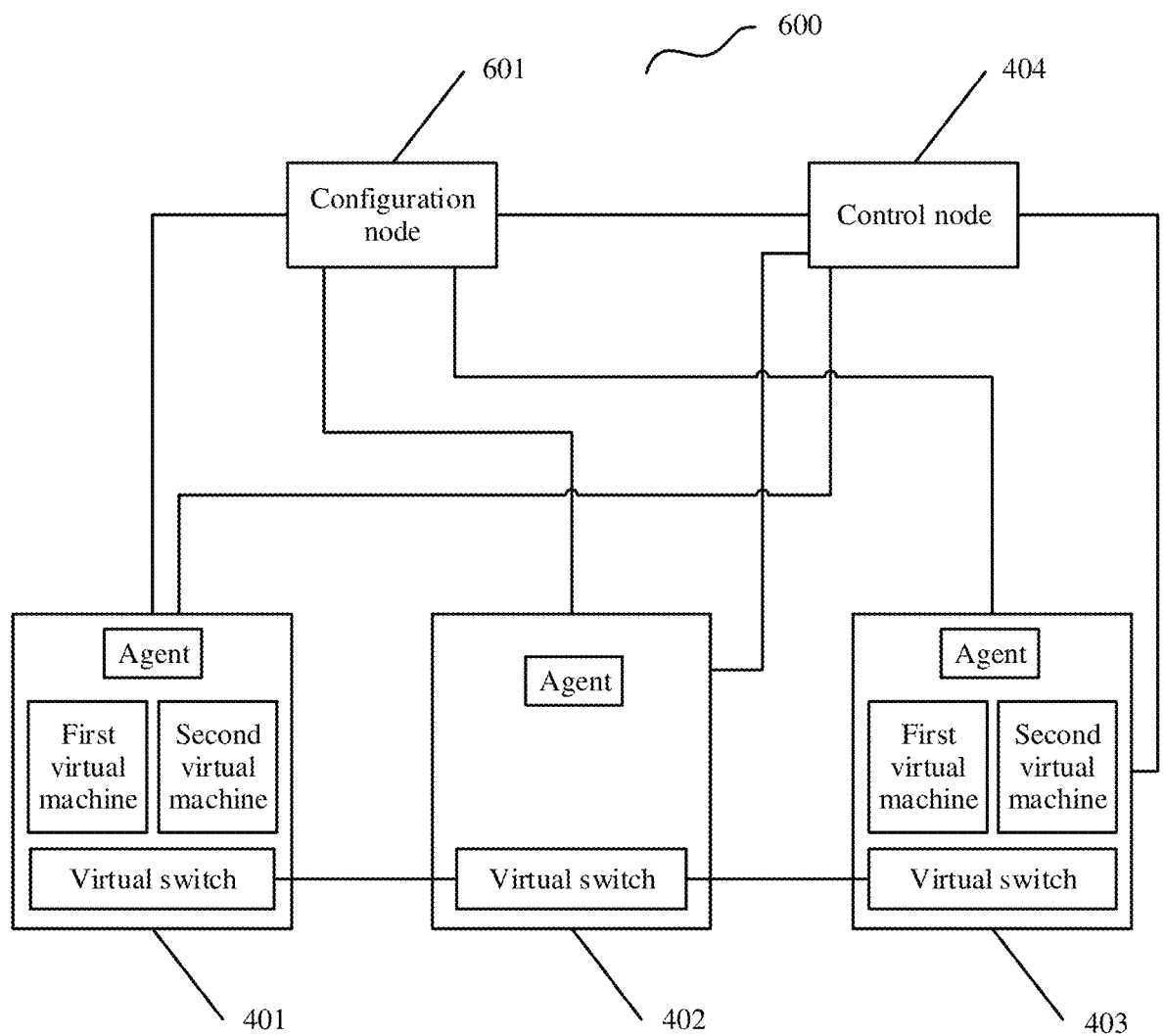
FIG. 6 is a schematic diagram of another network architecture of a virtual network according to this disclosure.

Based on FIG. 4 and FIG. 5, the following describes another network architecture of a virtual network of a network in this embodiment by using an example with reference to FIG. 6. In comparison with the network architecture of the network 400 shown in FIG. 4, a network 600 in this embodiment further includes a configuration node 601. In this embodiment, to reduce load of the control node 404 in a process of evaluating transmission performance related to a network node in the network, the configuration node 601 may be added in the network. The configuration node 601 is coupled to each network node. For descriptions of other architectures included in the network 600, refer to FIG. 4. Details are not described in this embodiment. Optionally, a host machine of the configuration node 601 in this embodiment may be the same as the host machine of the control node 404, that is, a computer device on which the configuration node 601 is located and the computer device on which the control node 404 is located are a same computer device. Optionally, a host machine of the configuration node 601 is different from the host machine of the control node 404, that is, a computer device on which the configuration node 601 is located and the computer device on which the control node 404 is located are two different computer devices. Optionally, the configuration node 601 in this embodiment may be a part of the computer device, for example, an integrated circuit chip. In an implementation process, steps performed by the configuration node 601 in the method in this embodiment may be implemented by using an integrated logical circuit of hardware in a processor or by using instructions in a form of software.

Figure 7:
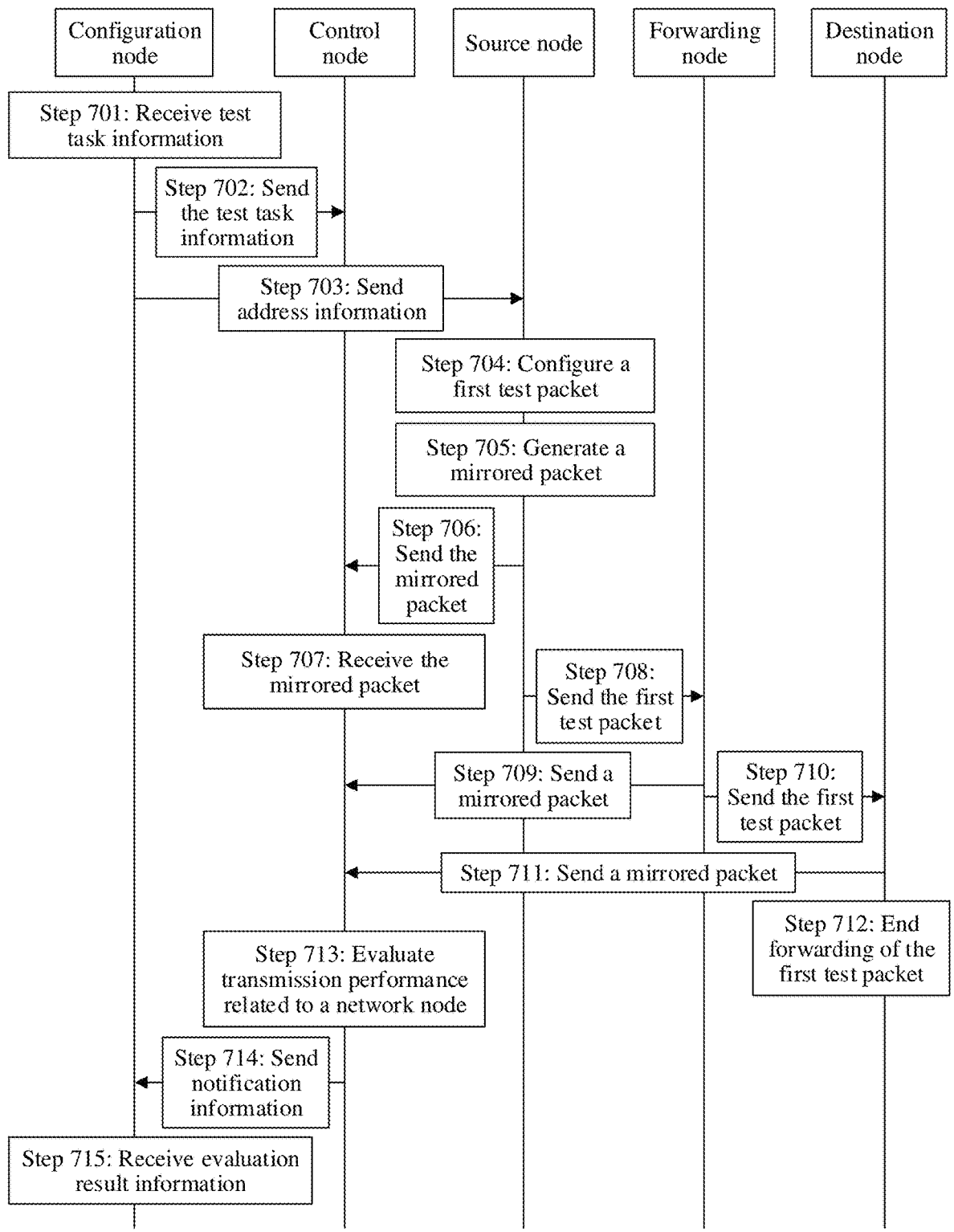
FIG. 7 is a flowchart of steps in a method for evaluating transmission performance related to a network node according to another embodiment of this disclosure.

Based on the network architecture of the network shown in FIG. 6, the following describes, with reference to FIG. 7 by using an example, a specific process of the method for evaluating transmission performance related to a network node provided in this embodiment.

Step 701: A configuration node receives test task information.

When a fault occurs in a network between a source virtual machine carried on a source node and a destination virtual machine carried on a destination node, that is, when the source virtual machine sends a service packet to the destination virtual machine, if a problem such as an excessively large transmission delay, a service packet loss, or a service packet transmission interruption occurs in a process of transmitting the service packet, operation and maintenance personnel may input, to the configuration node through a northbound interface (Portal), test task information used to evaluate transmission performance of a path between the source virtual machine and the destination virtual machine. Specifically, the test task information includes one or more of the following: a test task identifier, a test scenario, a test mode, a 5-tuple of the service packet, information about a source node, information about a destination node, a source media access control (MAC) address of the service packet, a destination MAC address of the service packet, a VLAN number of the service packet, a quantity of test packets, a timeout threshold, a test rate, a preset path, and the like.

The test task identifier is used to identify a current test task, and the test task is used to evaluate a network, of the service packet, between the source node and the destination node. The test scenario is used to indicate a scenario to which the current test task belongs, for example, a virtual private cloud (VPC). The test mode is used to indicate a unidirectional test mode or a bidirectional test mode. The unidirectional test mode is used to indicate the source node to send a first test packet to the destination node to evaluate the network between the source node and the destination node. The bidirectional test mode is used to indicate the source node to send a first test packet to the destination node and indicate the destination node to send a second test packet to the source node, to evaluate the network between the source node and the destination node. The information about the source node may be an identifier of the source node and/or a node type of the source node. For example, the node type of the source node may be a computing node. The information about the destination node may be an identifier of the destination node and/or a node type of the destination node. The quantity of test packets is used to indicate a quantity of test packets used to evaluate the network between the source virtual machine and the destination virtual machine. The test rate may be used to indicate a rate at which the source node sends the first test packet to the destination node. The preset path includes a node type of each network node that the service packet passes through in a process of transmission between the source node and the destination node.

Step 702: The configuration node sends the test task information to a control node.

In this embodiment, when the configuration node receives the test task information sent by the operation and maintenance personnel, the configuration node may forward the test task information to the control node.

Step 703: The configuration node sends address information to the source node.

Specific content of the address information is not limited in this embodiment, provided that the address information can be used to identify the path shown in FIG. 5. In this embodiment, the address information includes at least a part of information included in the test task information. For example, in this embodiment, the address information includes the 5-tuple, the source MAC address, and the destination MAC address of the service packet.

In this embodiment, an example in which the test mode included in the test task information is a unidirectional test mode is used. In this case, the configuration node in this embodiment sends the address information only to the source node. If the test mode included in the test task information is a bidirectional test mode, the configuration node sends the address information to the source node and the destination node.

A sequence of performing step 702 and step 703 is not limited in this embodiment.

Step 704: The source node configures the first test packet based on the address information.

In this embodiment, when the source node receives the address information from the configuration node, the source node may configure, based on the address information, the first test packet used to be sent to the destination node. For a specific description of the first test packet, refer to FIG. 5. Details are not described in this embodiment. Specifically, the configuration node sends the address information to an agent included in the source node, and the agent of the source node configures the first test packet based on the address information.

A specific process in which the source node configures the first test packet is not limited in this embodiment, provided that each network node in the path can accurately distinguish the service packet from the first test packet. For example, the first test packet configured by the source node may include a first test packet identifier. In this way, when determining that a received packet includes the first test packet identifier, each network node in the path may determine that the packet is the first test packet. The first test packet identifier is not limited in this embodiment, provided that there is a one-to-one correspondence between the first test packet identifier and the first test packet.

Step 705: The source node mirrors the first test packet to generate a mirrored packet.

A packet mirroring point is disposed on the source node in this embodiment, and the packet mirroring point is configured to mirror the first test packet to generate the mirrored packet. Each packet mirroring point on the source node in this embodiment is connected to the agent, so that the packet mirroring point can send the mirrored packet generated by the packet mirroring point to the agent. A specific manner of disposing the packet mirroring point is described below by using an example.

Figure 8:
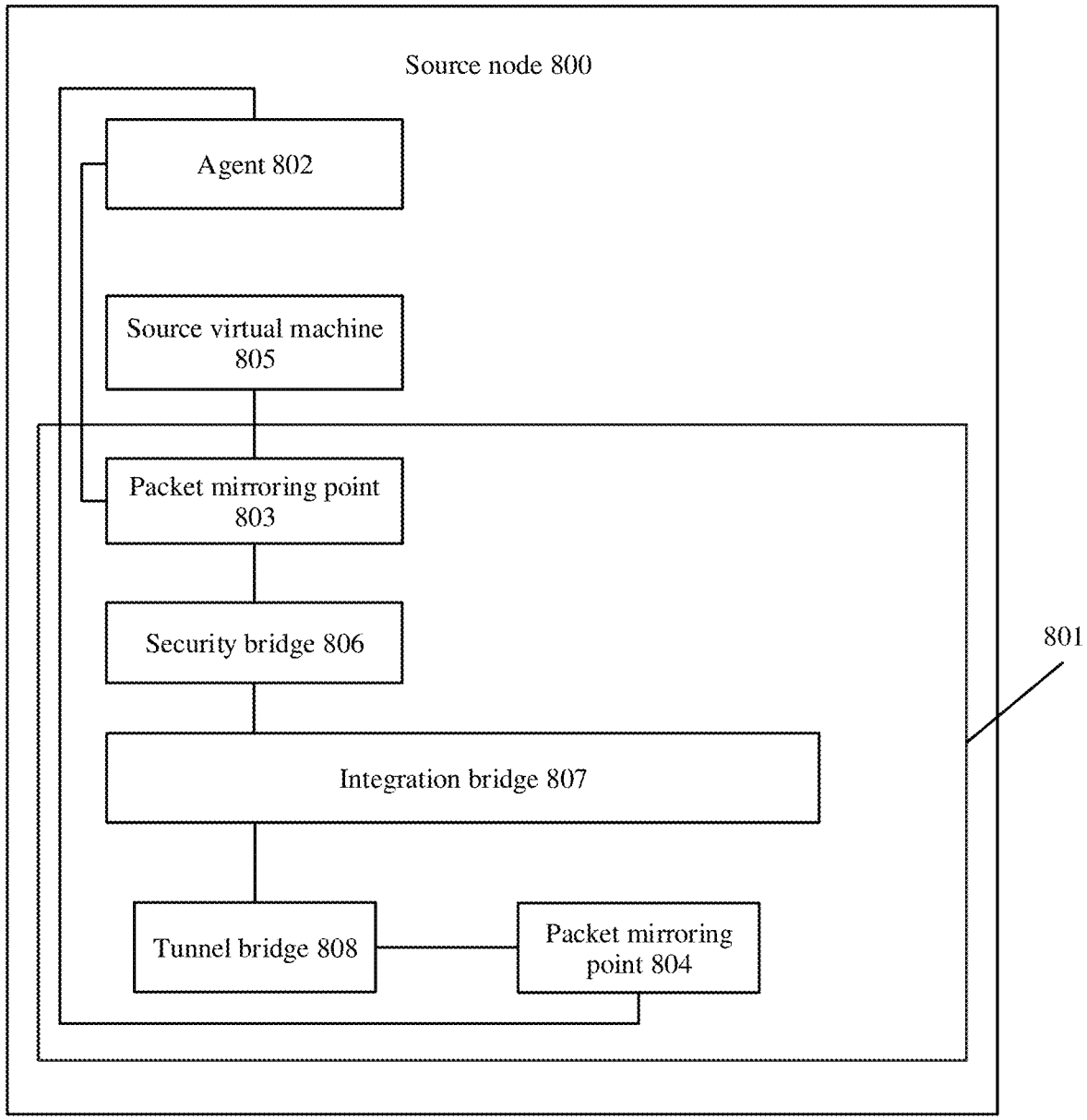
FIG. 8 is a schematic structural diagram of a source node according to an embodiment of this disclosure.

Optionally, the source node includes two packet mirroring points. For a better understanding, this example is specifically described below with reference to FIG. 8. As shown in FIG. 8, when an agent 802 of a source node 800 receives the address information, the agent 802 configures the first test packet based on the address information, and sends the first test packet to a virtual switch 801. In this embodiment, a packet mirroring point 803 may be disposed on the virtual switch 801, the packet mirroring point 803 is connected to a source virtual machine 805, and the first test packet is used to flow into the virtual switch 801 through the packet mirroring point 803. That is, the packet mirroring point 803 is a first packet mirroring point through which the first test packet flows into the virtual switch 801. The packet mirroring point 803 forwards the received first test packet to a security bridge 806. Optionally, an example in which the packet mirroring point 803 and the security bridge 806 in this embodiment are independent of each other is used for description. In another scenario, the packet mirroring point 803 may alternatively be disposed in the security bridge 806.

In this embodiment, the packet mirroring point 803 may mirror the received first test packet to generate a first mirrored packet, where the first mirrored packet generated by the packet mirroring point 803 carries a first generation timestamp and first generation location information of the generated first mirrored packet. The first generation location information may include a character "in", so that the first generation location information is used to indicate that the first mirrored packet is generated at a location at which the first mirrored packet flows into the virtual switch. When the packet mirroring point 803 generates the first mirrored packet, the packet mirroring point 803 sends, to the agent 802, the first mirrored packet that carries the first generation timestamp and the first generation location information.

For a transmission path of the first test packet on the source node 800 in this embodiment, refer to FIG. 8. To be specific, a path for transmitting the first test packet on the source node 800 sequentially includes the agent 802, the packet mirroring point 803, the security bridge 806, an integration bridge 807, a tunnel bridge 808, and a packet mirroring point 804, so that the first test packet flows out of the virtual switch 801 through the packet mirroring point 804. Optionally, an example in which the packet mirroring point 804 and the tunnel bridge 808 in this embodiment are independent of each other is used for description. In another scenario, the packet mirroring point 804 may alternatively be disposed in the tunnel bridge 808.

In this embodiment, the packet mirroring point 804 is disposed on the virtual switch 801, and the packet mirroring point 804 is a second packet mirroring point through which the first test packet flows out of the virtual switch 801. When the packet mirroring point 804 receives the first test packet sent by the tunnel bridge, the packet mirroring point 804 may mirror the first test packet to generate a second mirrored packet. The second mirrored packet generated by the packet mirroring point 804 carries a second generation timestamp and second generation location information of the generated second mirrored packet. The second generation location information may include a character "out", so that the second generation location information is used to indicate that the second mirrored packet is generated at a location at which the second mirrored packet flows out of the virtual switch. When the packet mirroring point 804 generates the second mirrored packet, the packet mirroring point 804 sends the second mirrored packet to the agent 802.

The foregoing description for the manner of disposing the packet mirroring point included in the source node is an optional example and is not limited, provided that the virtual switch can generate, for the test packet, one or more mirrored packets that carry a generation timestamp and generation location information.

Step 706: The source node sends the mirrored packet to the control node.

With reference to FIG. 8, the agent 802 in this embodiment sends, to the control node, the first mirrored packet received from the packet mirroring point 803, and the agent 802 in this embodiment further sends, to the control node, the second mirrored packet received from the packet mirroring point 804. That is, the control node in this embodiment may receive the first mirrored packet and the second mirrored packet that are reported by the source node.

Optionally, the agent 802 in this embodiment may send the first mirrored packet and the second mirrored packet to the control node at the same time. Optionally, the agent 802 may send the first mirrored packet and the second mirrored packet to the control node at different times. This is not specifically limited in this embodiment.

Optionally, when the agent 802 of the source node receives the first mirrored packet from the packet mirroring point 803 and the second mirrored packet from the packet mirroring point 804, the agent 802 may set a UUID of the source node in the first generation location information carried in the first mirrored packet and/or the second generation location information carried in the second mirrored packet.

Optionally, the packet mirroring point 803 of the source node may set the UUID of the source node in the first generation location information, and/or the packet mirroring point 804 of the source node may set the UUID of the source node in the second generation location information. This is not specifically limited in this embodiment.

Step 707: The control node receives the mirrored packet from the source node.

Step 708: The source node sends the first test packet to a forwarding node.

When the first test packet flows out of the virtual switch included in the source node, the virtual switch may forward the first test packet to a next-hop forwarding node based on an indication of the address information. FIG. 6 is used as an example. The source node 401 may send the first test packet to the next-hop forwarding node 402 based on the indication of the address information included in the first test packet.

A sequence of performing step 706 and step 708 is not limited in this embodiment.

A virtual switch is disposed on the forwarding node in this embodiment. For a description of a specific structure of the virtual switch, refer to FIG. 2. Details are not described again, provided that the virtual switch can forward the first test packet to a next hop based on the address information included in the first test packet.

Figure 9:
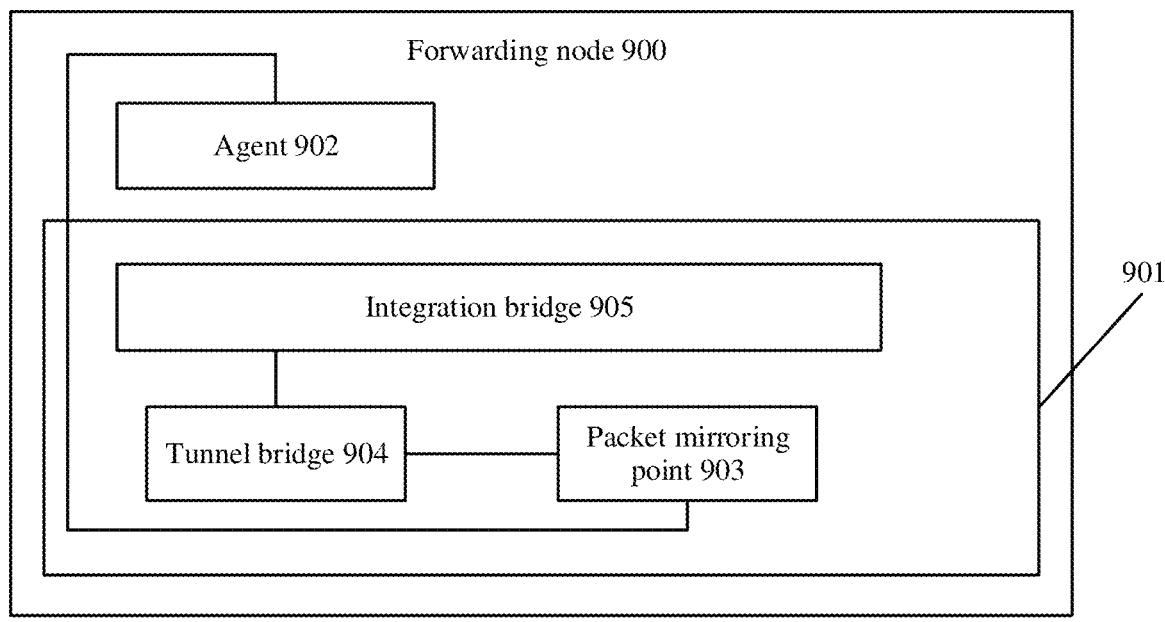
FIG. 9 is a schematic structural diagram of a forwarding node according to an embodiment of this disclosure.

The following describes, with reference to FIG. 9 by using an example, a packet mirroring point included in a forwarding node. A virtual switch 901 of a forwarding node 900 is configured to: receive the first test packet sent by the source node, and mirror the first test packet to generate a mirrored packet.

Specifically, in this embodiment, a packet mirroring point 903 may be disposed on the virtual switch 901, and the first test packet sent by the source node is used to flow into the virtual switch 901 through the packet mirroring point 903. It can be learned that, in this case, the packet mirroring point 903 is a first packet mirroring point through which the first test packet flows into the virtual switch 901. The packet mirroring point 903 is configured to identify whether a currently received packet is the first test packet. If the packet mirroring point 903 identifies that the packet includes the first test packet identifier, the packet mirroring point 903 determines that the packet is the first test packet, the packet mirroring point 903 mirrors the first test packet to generate a first mirrored packet, and the packet mirroring point 903 sends the generated first mirrored packet to an agent 902. The first mirrored packet includes a first generation timestamp and first generation location information. For specific descriptions of the first generation timestamp and the first generation location information, refer to FIG. 8. Details are not described again.

After the virtual switch 901 implements a function of a physical switch for the first test packet, to be specific, after the virtual switch 901 forwards the first test packet to the destination node, still referring to FIG. 9, the first test packet that flows into the virtual switch 901 through the packet mirroring point 903 is sequentially processed by a tunnel bridge 904 and an integration bridge 905, and then is returned to the packet mirroring point 903, so that the first test packet in the virtual switch 901 flows out of the virtual switch 901 through the packet mirroring point 903. In this case, the packet mirroring point 903 is a second packet mirroring point through which the first test packet flows out of the virtual switch 901. When the packet mirroring point 903 identifies the first test packet, the packet mirroring point 903 mirrors the first test packet to generate a second test packet, and the packet mirroring point 903 sends the generated second mirrored packet to the agent 902. The second mirrored packet includes a second generation timestamp and second generation location information. For specific descriptions of the second generation timestamp and the second generation location information, refer to FIG. 8. Details are not described again.

Step 709: The forwarding node sends the mirrored packet to the control node.

It can be learned from the foregoing description that, if the agent 902 of the forwarding node shown in FIG. 9 has received the first mirrored packet and the second mirrored packet that are sent by the packet mirroring point 903, the agent 902 may send the first mirrored packet and the second mirrored packet to the control node through a channel pre-established with the control node.

Optionally, the agent 902 in this embodiment may send the first mirrored packet and the second mirrored packet to the control node at the same time. Optionally, the agent 902 may send the first mirrored packet and the second mirrored packet to the control node at different times. This is not specifically limited in this embodiment.

Optionally, a UUID of the forwarding node is set in the first generation location information and/or the second generation location information. For a description of a specific setting manner, refer to the description of setting the UUID of the source node in the first generation location information and/or the second generation location information in step 706. Details are not described again.

Step 710: The forwarding node sends the first test packet to the destination node.

In this embodiment, an example in which the path includes one forwarding node is used for description. After the forwarding node completes the function of the physical switch for the first test packet, the forwarding node may forward the first test packet to the destination node based on the address information of the first test packet. A specific quantity of forwarding nodes included in the path is not limited in this embodiment. If the path includes two or more forwarding nodes, after the forwarding nodes in the path sequentially implement a function of a physical switch for the first test packet, a last forwarding node located in the path sends the first test packet to the destination node.

Step 711: The destination node sends the mirrored packet to the control node.

Figure 10:
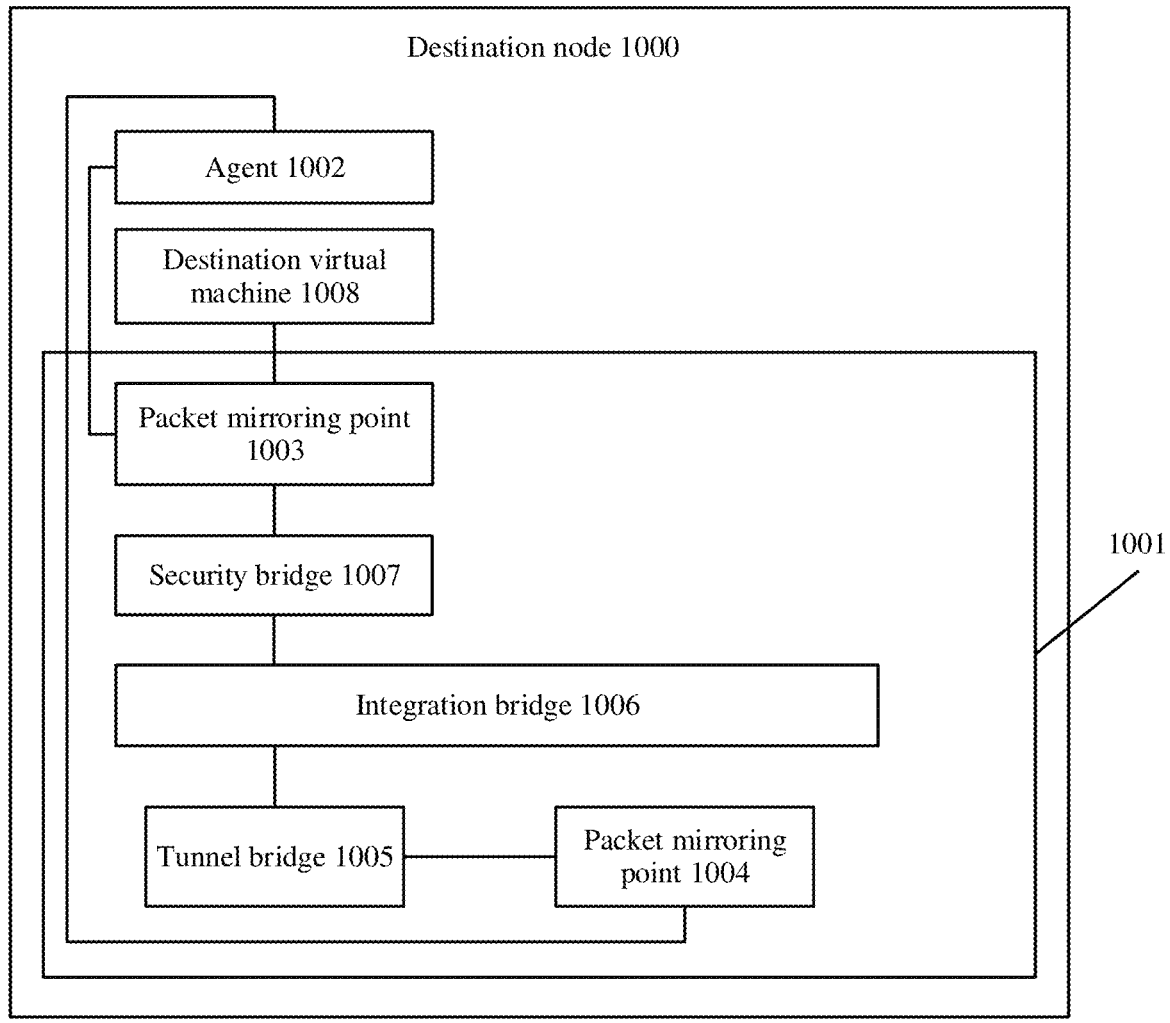
FIG. 10 is a schematic structural diagram of a destination node according to an embodiment of this disclosure.

The following describes, with reference to FIG. 10 by using an example, a specific structure of a destination node on which a packet mirroring point is disposed. In this embodiment, a packet mirroring point 1004 may be disposed on a virtual switch 1001 carried on a destination node 1000. The first test packet forwarded by the forwarding node to the destination node 1000 flows into the virtual switch 1001 through the packet mirroring point 1004. It can be learned that, the packet mirroring point 1004 is a first packet mirroring point through which the first test packet flows into the virtual switch 1001. When the packet mirroring point 1004 identifies, by using the first test packet identifier, that a currently received packet is the first test packet, the packet mirroring point 1004 mirrors the first test packet to generate a first mirrored packet, and the packet mirroring point 1004 sends the generated first mirrored packet to an agent 1002. The agent 1002 sends the first mirrored packet to the control node through a channel pre-established with the control node. The first mirrored packet includes a first generation timestamp and first generation location information. For a specific description, refer to the foregoing description. Details are not described again.

The first test packet that flows into the virtual switch 1001 through the packet mirroring point 1004 flows into a packet mirroring point 1003 sequentially through a tunnel bridge 1005, an integration bridge 1006, and a security bridge 1007. In this example, the packet mirroring point 1003 is disposed inside the virtual switch 1001, and is connected to a destination virtual machine 1008 carried on the destination node 1000. The packet mirroring point 1003 in this embodiment is a second packet mirroring point through which the first test packet flows out of the virtual switch 1001. The packet mirroring point 1003 mirrors the first test packet to generate a second mirrored packet, and the packet mirroring point 1003 sends the generated second mirrored packet to the agent 1002. The agent 1002 sends the second mirrored packet to the control node through the channel pre-established with the control node. The second mirrored packet includes a second generation timestamp and second generation location information. For a specific description, refer to the foregoing description. Details are not described again.

Optionally, the agent 1002 in this embodiment may send the first mirrored packet and the second mirrored packet to the control node at the same time. Optionally, the agent 1002 may send the first mirrored packet and the second mirrored packet to the control node at different times. This is not specifically limited in this embodiment.

Step 712: The destination node ends forwarding of the first test packet.

If a service packet flows out of the virtual switch carried on the destination node, the service packet may be transmitted to the destination virtual machine carried on the destination node, to implement connectivity between the source virtual machine carried on the source node and the destination virtual machine carried on the destination node. However, the first test packet in this embodiment is used to evaluate transmission performance of the network between the source virtual machine and the destination virtual machine, and the destination virtual machine does not need to process the first test packet. In this embodiment, after the destination node mirrors the first test packet to generate the second mirrored packet, the destination node may end transmission of the first test packet, that is, the destination node ends forwarding of the first test packet, so that the first test packet is not forwarded to the destination virtual machine carried on the destination node, and the destination virtual machine does not process the first test packet that is used for evaluation.

FIG. 10 is still used as an example. After the packet mirroring point 1003 mirrors the first test packet to generate the second mirrored packet, the packet mirroring point 1003 may end forwarding of the first test packet, so that the first test packet is not forwarded to the destination virtual machine 1008. In this case, the first test packet is not transmitted to the destination virtual machine 1008 carried on the destination node 1000, thereby effectively preventing the destination virtual machine 1008 from processing the first test packet.

In this embodiment, the source node configures the first test packet for the service packet that needs to be evaluated, so that a path that the first test packet passes through is consistent with a path that the service packet passes through. In this way, the service packet and the first test packet are transmitted together in the path. After the first test packet is mirrored at the second packet mirroring point to generate the second mirrored packet, the second packet mirroring point ends forwarding of the first test packet, thereby effectively avoiding noise generated in a process in which the destination virtual machine processes the first test packet. In addition, a tenant using the destination virtual machine does not perceive existence of the first test packet, thereby avoiding impact of the first test packet on a service of the tenant.

A sequence of performing step 711 and step 712 is not limited in this embodiment.

Step 713: The control node evaluates, based on the mirrored packet, transmission performance related to the network node.

According to the description in the foregoing steps, the control node in this embodiment may obtain the first mirrored packet and the second mirrored packet that are sent by each network node in the path, and the control node may evaluate transmission performance related to each network node between the source node and the destination node based on the first mirrored packet and the second mirrored packet. For a specific description, refer to step 505 shown in FIG. 5. Details are not described again.

Step 714: The control node sends notification information to the configuration node.

In this embodiment, the control node may generate evaluation result information based on an evaluation status of transmission performance related to each network node in the path. The evaluation result information includes a result of evaluating, by the control node, the transmission performance related to each network node in the path. Optionally, the evaluation result information includes the test task identifier. Specifically, after evaluating the transmission performance related to each network node in the path based on the test task information sent by the configuration node, the control node may store, in the evaluation result information, the test task identifier included in the test task information.

After completing evaluation of the transmission performance related to each network node in the path, the control node may send the notification information to the configuration node. The notification information is used to indicate that the control node has completed the evaluation of the transmission performance related to each network node in the path. Optionally, the notification information may include the test task identifier.

Step 715: The configuration node receives the evaluation result information from the control node.

Based on the notification information from the control node, the configuration node may determine that the path corresponding to the test task identifier included in the notification information has been tested. If the configuration node needs to obtain the transmission performance related to each network node in the path corresponding to the test task identifier, the configuration node may send the test task identifier to the control node, and the control node sends, based on the test task identifier, the evaluation result information including the test task identifier to the configuration node. In this way, the operation and maintenance personnel may query, by using the configuration node, the evaluation status of the transmission performance related to each network node in the path corresponding to the test task identifier.

Beneficial effects of using the method in this embodiment are as follows:

According to the method in this embodiment, when transmission performance related to each network node included in a path used to transmit a service packet needs to be evaluated, a first test packet is configured for address information of the service packet, so that both the first test packet and the service packet are transmitted along the path. Transmission performance of each network node and/or between network nodes in the path used to transmit the service packet can be evaluated by using the first test packet. Because "full coverage" detection does not need to be performed on all paths included in a network, a control node can analyze, by using a mirrored packet reported by each network node in the path, transmission performance of at least a part of link that is related to the network node and that is in the path. This improves transmission performance evaluation flexibility, reduces an evaluation difficulty, reduces calculation overheads for performing evaluation, and effectively reduces service resources for networking.

The control node can accurately detect, by using a first mirrored packet and a second mirrored packet that are reported by each network node in the path, transmission performance of the network node and transmission performance of a link between the network node and a next-hop network node, thereby implementing accurate detection of transmission performance Furthermore, the first test packet used to evaluate transmission performance is not forwarded to a destination virtual machine, thereby effectively avoiding noise generated in a process in which the destination virtual machine processes the first test packet. In addition, a tenant using the destination virtual machine does not perceive existence of the first test packet, thereby avoiding impact of the first test packet on a service of the tenant.

Figure 11A:
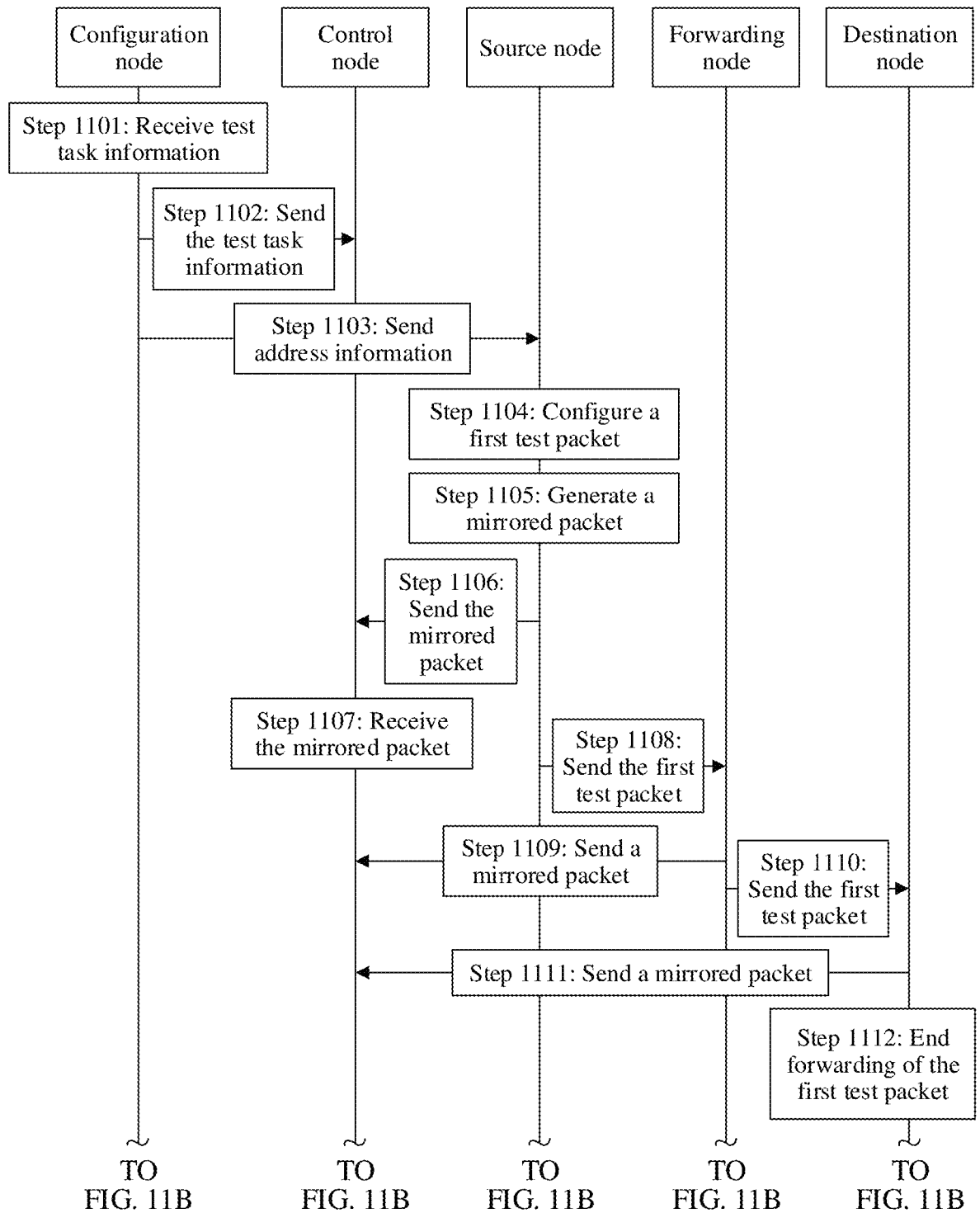
FIG. 11A and FIG. 11B are a flowchart of steps in a method for evaluating transmission performance related to a network node according to another embodiment of this disclosure.
Figure 11B:
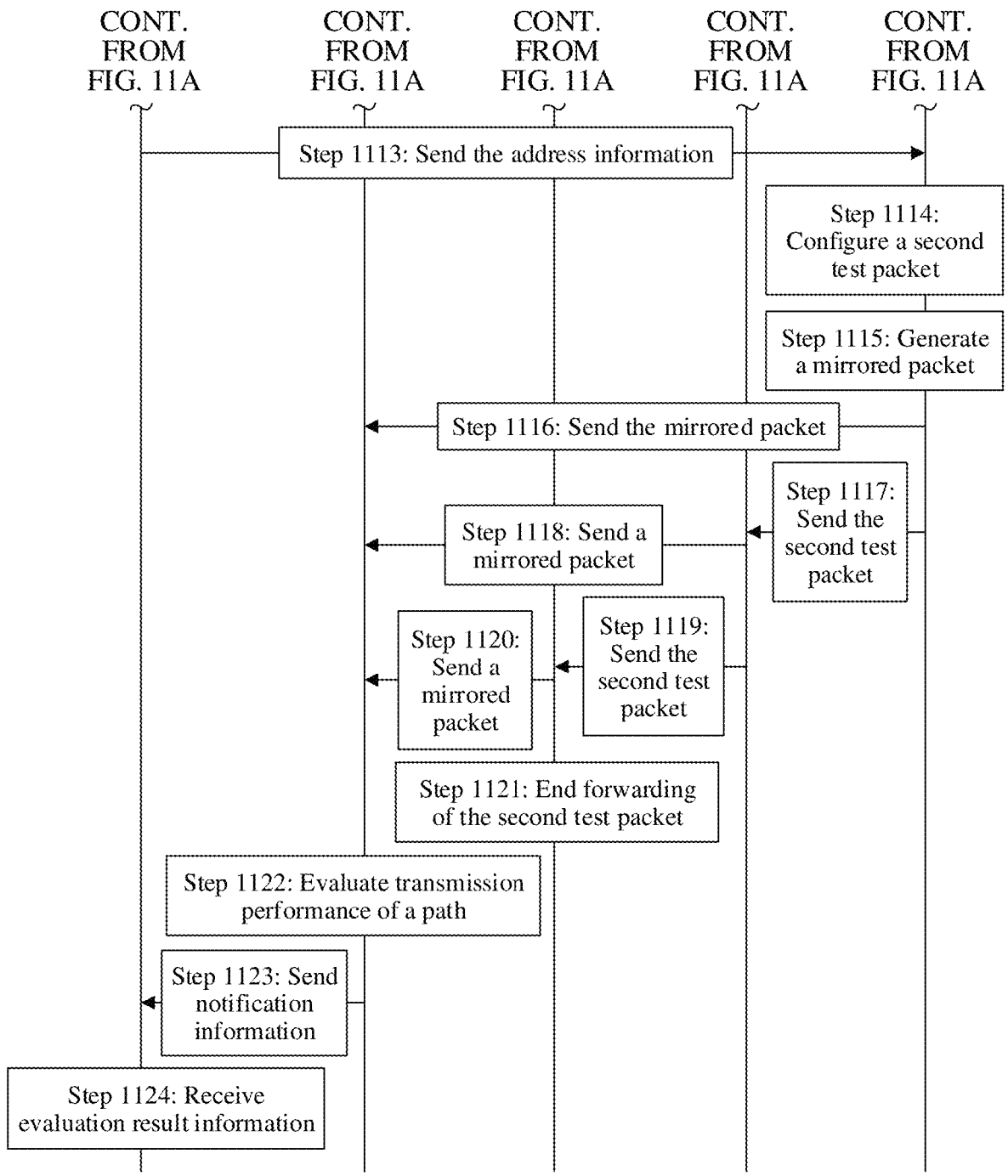

As shown in FIG. 7, the unidirectional test mode is used as an example to evaluate transmission performance of the path. The following describes, with reference to FIG. 11A and FIG. 11B by using an example, a process of evaluating the transmission performance of the path in the bidirectional test mode.

Step 1101: A configuration node receives test task information.

A test mode included in the test task information in this embodiment is the bidirectional test mode. For a description of the test task information, refer to step 701. Details are not described again.

Step 1102: The configuration node sends the test task information to a control node.

Step 1103: The configuration node sends address information to a source node.

Step 1104: The source node configures a first test packet based on the address information.

Step 1105: The source node mirrors the first test packet to generate a mirrored packet.

Step 1106: The source node sends the mirrored packet to the control node.

Step 1107: The control node receives the mirrored packet from the source node.

Step 1108: The source node sends the first test packet to a forwarding node.

Step 1109: The forwarding node sends a mirrored packet to the control node.

Step 1110: The forwarding node sends the first test packet to a destination node.

Step 1111: The destination node sends a mirrored packet to the control node.

Step 1112: The destination node ends forwarding of the first test packet.

For a specific process of performing step 1102 to step 1112 in this embodiment, refer to step 702 to step 712 shown in FIG. 7. The specific performing process is not described again.

Step 1113: The control node sends the address information to the destination node.

In this embodiment, when the control node determines that the test mode included in the test task information is the bidirectional test mode, the control node sends the address information to the source node and the destination node separately. A sequence of performing step 1113 and step 1102 to step 1112 is not limited in this embodiment.

Step 1114: The destination node configures a second test packet based on the address information.

In this embodiment, when an agent of the destination node receives address information that is of a service packet and that is sent by the control node, the agent of the destination node may determine that the second test packet needs to be configured. For a specific description of the second test packet, refer to FIG. 5. Details are not described again in this embodiment.

Step 1115: The destination node mirrors the second test packet to generate a mirrored packet.

This embodiment is described with reference to FIG. 10 by using an example. The agent 1002 of the destination node 1000 is configured to configure the second test packet based on the address information sent by the control node. When the agent 1002 determines that a sending trigger condition is met, the agent 1002 inputs the configured second test packet to the virtual switch 1001 through the packet mirroring point 1003. In this step, the packet mirroring point 1003 is a first packet mirroring point used to enable the second test packet to flow into the virtual switch 1001, and the packet mirroring point 1004 of the virtual switch 1001 is used as a second packet mirroring point used to enable the second test packet to flow out of the virtual switch 1001. For specific descriptions of the first packet mirroring point and the second packet mirroring point, refer to FIG. 7. Details are not described again.

The sending trigger condition is described below. It should be noted that a description of the trigger condition is an optional example and is not limited in this embodiment, provided that the agent 1002 can send the configured second test packet to the virtual switch 1001 when the trigger condition is met.

Optionally, the sending trigger condition may be that the agent 1002 of the destination node has received the address information sent by the control node and the agent 1002 has received a second mirrored packet sent by the packet mirroring point 1003.

Still referring to FIG. 10, in a process of transmitting the second test packet, the packet mirroring point 1003 used as the first packet mirroring point mirrors the second test packet to generate a first mirrored packet, and sends the first mirrored packet to the agent 1002; and the packet mirroring point 1004 used as the second packet mirroring point mirrors the second test packet to generate a second mirrored packet, and sends the second mirrored packet to the agent 1002.

Step 1116: The destination node sends the mirrored packet to the control node.

In this embodiment, the agent of the destination node may send, to the control node, the first mirrored packet and the second mirrored packet that are generated by mirroring the received second test packet.

Step 1117: The destination node sends the second test packet to a forwarding node.

Step 1118: The forwarding node sends a mirrored packet to the control node.

Step 1119: The forwarding node sends the second test packet to the source node.

Step 1120: The source node sends a mirrored packet to the control node.

For a specific process in which the destination node sends the second test packet to the source node and the source node reports the mirrored packet in step 1117 to step 1120 in this embodiment, refer to a specific process in which the source node sends the first test packet to the destination node and the destination node reports the mirrored packet in step 708 to step 710 shown in FIG. 7. Details are not described again.

Step 1121: The source node ends forwarding of the second test packet.

The second test packet in this embodiment is used to evaluate transmission performance related to each network node in a path between a destination virtual machine and a source virtual machine, and the source virtual machine does not need to process the second test packet. In this embodiment, after the source node mirrors the second test packet to generate the second mirrored packet, the source node may end forwarding of the second test packet, that is, the source node does not forward the second test packet to the source virtual machine carried on the source node, so that the source virtual machine does not process the second test packet that is used for evaluation.

FIG. 8 is still used as an example. After the packet mirroring point 803 mirrors the second test packet to generate the second mirrored packet, the packet mirroring point 803 may end transmission of the second test packet, so that the second test packet is not transmitted to the source virtual machine 805 carried on the source node 800, thereby effectively preventing the source virtual machine 805 from processing the second test packet, and effectively avoiding noise generated in a process in which the source virtual machine processes the second test packet.

Step 1122: The control node evaluates transmission performance of the path based on the mirrored packet.

In this embodiment, the control node may evaluate the transmission performance of the path based on a mirrored packet reported by each network node in a process of transmitting the first test packet along the path and based on a mirrored packet reported by each network node in a process of transmitting the second test packet in a direction opposite to a direction of the path.

Step 1123: The control node sends notification information to the configuration node.

Step 1124: The configuration node receives evaluation result information from the control node.

For a specific process of performing step 1123 and step 1124 in this embodiment, refer to step 714 and step 715 shown in FIG. 7. The specific performing process is not described again.

Figure 12A:
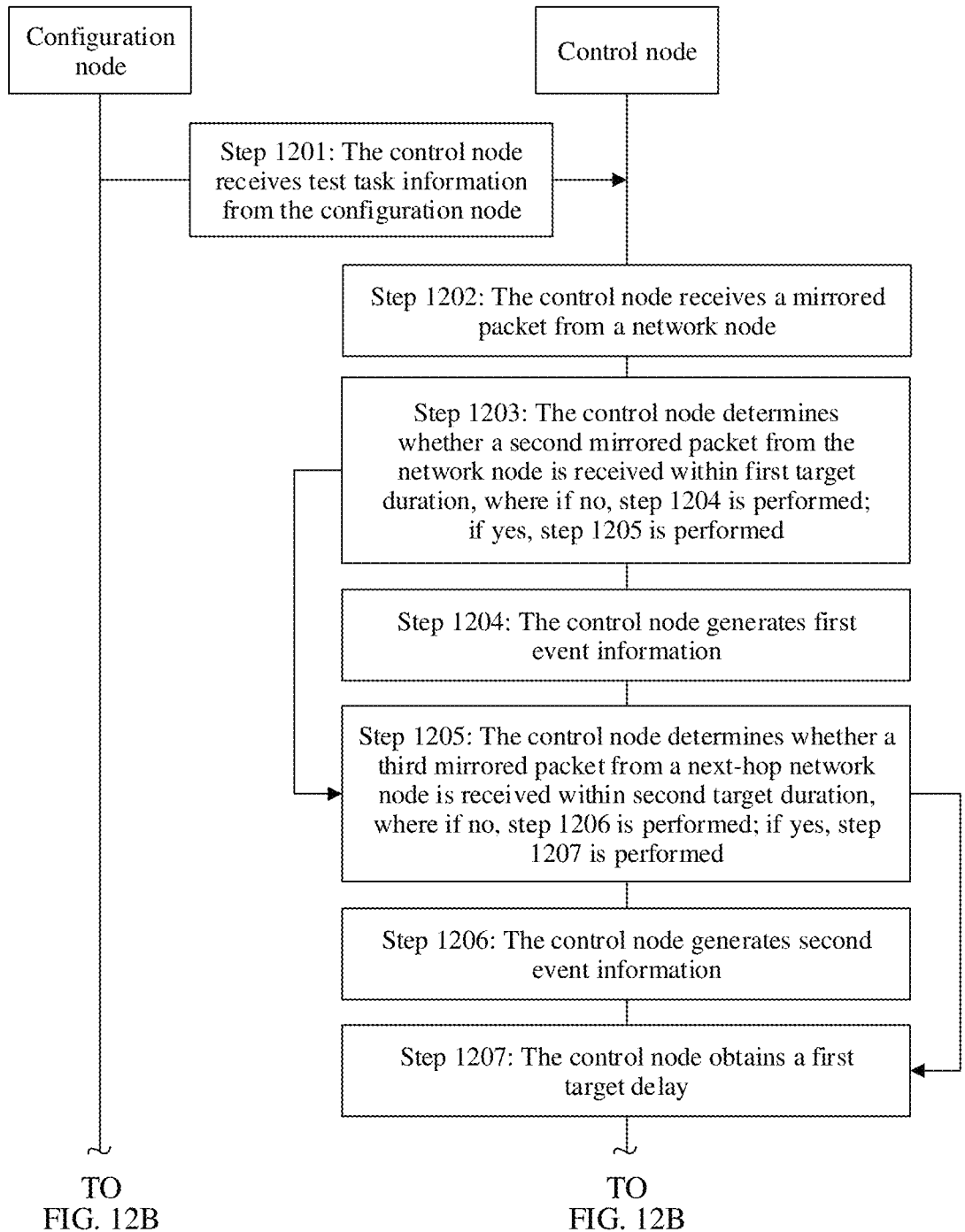
FIG. 12A and FIG. 12B are a flowchart of steps in a method for evaluating transmission performance related to a network node according to another embodiment of this disclosure.
Figure 12B:
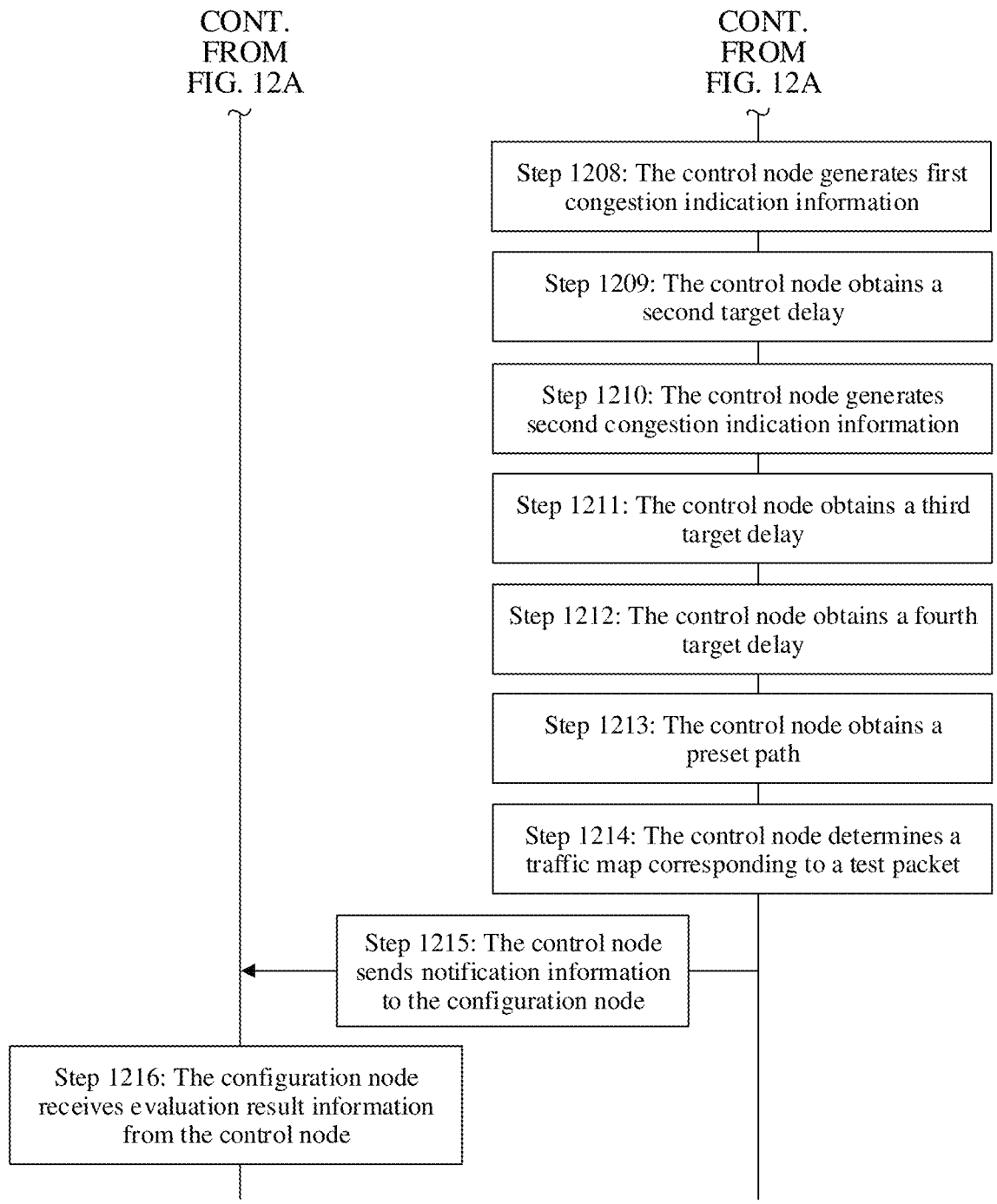

Beneficial effects of using the method in this embodiment are as follows:

According to the method in this embodiment, a control node may evaluate a path between a source node and a destination node by using a first test packet and a second test packet. In comparison with the unidirectional test mode shown in FIG. 7, in the bidirectional test mode shown in FIG. 11A and FIG. 11B, a quantity of times of evaluating transmission performance of each network node in the path and transmission performance of a link between two adjacent network nodes may be increased. This increases accuracy of evaluating transmission performance of the path, and effectively avoids a case of misdetermining Based on the methods shown in FIG. 5, FIG. 7, and FIG. 11A and FIG. 11B, the following describes, with reference to FIG. 12A and FIG. 12B, a specific process in which the control node evaluates transmission performance of the path based on the mirrored packet in the foregoing embodiment.

Step 1201: The control node receives test task information from a configuration node.

For a specific description of the test task information in this embodiment, refer to step 701 shown in FIG. 7. Details are not described again in this embodiment.

Step 1202: The control node receives a mirrored packet from a network node.

The control node receives mirrored packets sent by at least a part of network nodes in the path. Specifically, if no packet loss event occurs inside each network node included in the path and no packet loss event occurs between any two adjacent network nodes, the control node can receive mirrored packets reported by all network nodes in the path. If a packet loss event occurs inside a part of network nodes included in the path and/or a packet loss event occurs on a link between at least one pair of two adjacent network nodes, the control node receives a mirrored packet reported by a network node that can run normally, where the network node that runs normally is a network node that can successfully receive a test packet and inside which no packet loss event occurs. For a description of a specific process in which the control node receives the mirrored packet, refer to step 707 in the foregoing embodiment. Details are not described again in this embodiment.

Step 1203: The control node determines whether a second mirrored packet from the network node is received within first target duration. If no, step 1204 is performed. If yes, step 1205 is performed.

The network node in this embodiment is any network node in the path. As shown in FIG. 4, the network node may be a source node, a forwarding node, or a destination node. The control node may determine whether a packet loss event occurs inside the network node. Details are as follows.

In this example, an example in which an agent of each network node immediately sends a mirrored packet to the control node after receiving the mirrored packet reported by each packet mirroring point is used for description. After the control node receives a first mirrored packet sent by the agent carried on the network node, the control node immediately starts a timer. A timing start point of the timer is a first generation timestamp carried in the first mirrored packet sent by the network node. Specifically, the first generation timestamp indicates a timestamp at which a first packet mirroring point of the network node generates the first mirrored packet, and duration timed by the timer is the first target duration. The first target duration may be entered by operation and maintenance personnel to the control node in advance, or the first target duration may be sent by the control node to the control node. This is not specifically limited in this embodiment.

Step 1204: The control node generates first event information.

In this embodiment, the control node generates the first event information if the control node determines that the control node does not receive, within the first target duration timed by the timer, the second mirrored packet reported by the agent carried on the network node. The first event information is used to indicate that a packet loss event occurs inside the network node.

For a better understanding, the following uses a specific example for description.

The control node receives the mirrored packet from the network node, where generation location information carried in the mirrored packet includes "efec-fece-0987" and "in"; and the control node determines, based on an indication of "efec-fece-0987", that the control node receives the mirrored packet reported by a network node whose UUID is "efec-fece-0987", and based on an indication of "in", determines that the first mirrored packet is a mirrored packet generated by mirroring a first test packet by the first packet mirroring point of the network node. For a description of the character "in", refer to the embodiment shown in FIG. 7. Details are not described again in this embodiment.

When determining that the first mirrored packet is received, the control node may start timing of the timer. If the control node determines that the second mirrored packet reported by the network node is not received within timing duration of the timer, it indicates that a packet loss event occurs in a process in which a virtual switch of the network node processes the first test packet. Consequently, the first test packet cannot be successfully forwarded to a second packet mirroring point, and the control node cannot successfully receive the second mirrored packet reported by the second packet mirroring point. In this case, the control node generates the first event information.

Optionally, the first event information generated by the control node may include the UUID of the network node. In this case, when obtaining the first event information, the operation and maintenance personnel may determine that a packet loss occurs inside the network node having the UUID included in the first event information.

It can be learned that, in this example, the control node may determine, based on the UUID included in the first event information, a specific location of the packet loss in the path. In this way, the location of the packet loss in the path is accurately determined.

Step 1203 and step 1204 in this embodiment are optional steps.

Step 1205: The control node determines whether a third mirrored packet from a next-hop network node is received within second target duration. If no, step 1206 is performed. If yes, step 1207 is performed.

The path in this embodiment further includes a next-hop network node of the network node. After the second packet mirroring point of the network node completes mirroring of the first test packet, the network node may forward the first test packet to the next-hop network node based on an indication of address information included in the first test packet.

When the next-hop network node receives the first test packet, a packet mirroring point of the next-hop network node may mirror the first test packet to generate a first mirrored packet. A quantity and locations of packet mirroring points included in the next-hop network node are not limited in this embodiment. To more accurately detect transmission performance related to each network node in the path, in this embodiment, a location of disposing the packet mirroring point of the next-hop network node is the same as a location of disposing the packet mirroring point of the network node, that is, the next-hop network node also includes the first packet mirroring point and the second packet mirroring point. Optionally, the third mirrored packet in this embodiment may be a mirrored packet generated by mirroring the first test packet by the first packet mirroring point of the next-hop network node. The third mirrored packet includes a generation timestamp and generation location information. For a specific description, refer to FIG. 7. Details are not described again.

In this embodiment, after the control node receives the second mirrored packet sent by the agent carried on the network node, the control node immediately starts a timer. A timing start point of the timer is a second generation timestamp carried in the second mirrored packet sent by the network node. The second generation timestamp indicates a timestamp at which the second packet mirroring point of the network node generates the second mirrored packet, and duration timed by the timer is the second target duration. The second target duration may be entered by the operation and maintenance personnel to the control node in advance, or the second target duration may be sent by the control node to the control node. This is not specifically limited in this embodiment.

Step 1206: The control node generates second event information.

In this embodiment, the control node generates the second event information if the control node determines that the control node does not receive, within the second target duration timed by the timer, the third mirrored packet reported by an agent carried on the next-hop network node. The second event information is used to indicate that a packet loss event occurs on a link between the network node and the next-hop network node.

For a better understanding, the following uses a specific example for description.

The control node receives the second mirrored packet from the network node, where generation location information carried in the second mirrored packet includes "efec-fece-0987" and "out"; and the control node determines, based on an indication of "efec-fece-0987", that the control node receives the mirrored packet reported by a network node whose UUID is "efec-fece-0987", and based on an indication of "out", determines that the second mirrored packet is a mirrored packet generated by mirroring the first test packet by the second packet mirroring point of the network node. In this example, the control node may determine, based on an indication of the generation location information carried in the second mirrored packet, that the second packet mirroring point of the network node has completed mirroring of the first test packet, and the first test packet has flowed out of the virtual switch of the network node to be forwarded to the next-hop network node.

In this case, the control node starts the timer. If the control node determines that the third mirrored packet reported by the next-hop network node is not received within timing duration of the timer, it indicates that the first test packet that flows out of the network node is not successfully forwarded to the next-hop network node. The control node may determine that a packet loss event occurs between the network node and the next-hop network node, and the control node may generate the second event information.

Optionally, the second event information may include the UUID of the network node, and the operation and maintenance personnel determine, based on the second event information, that a packet loss event occurs on the link between the network node and the next-hop network node. It can be learned that, in this example, the control node may determine, based on the second event information, a specific location of a packet loss in the path. In this way, the location of the packet loss in the path is accurately determined.

Step 1205 and step 1206 in this embodiment are optional steps.

Step 1207: The control node obtains a first target delay.

The control node in this embodiment may determine, based on a first mirrored packet and a second mirrored packet that are sent by a same network node, a specific network node inside which a network congestion event occurs in the path. Details are as follows.

In this example, the control node may determine, based on generation location information carried in the received mirrored packets, the first mirrored packet and the second mirrored packet that are reported by the same network node. For example, when the control node determines that a UUID carried in the first mirrored packet is the same as a UUID carried in the second mirrored packet, and both are "efec-fece-0987", the control node may determine that the first mirrored packet and the second mirrored packet are from a same network node whose UUID is "efec-fece-0987".

The control node obtains a first target delay of the network node, where the first target delay is a difference between a second generation timestamp and a first generation timestamp that are sent by the network node.

Step 1208: The control node generates first congestion indication information.

In this embodiment, when the control node has received the test task information sent by the configuration node, where the test task information includes a first timeout threshold, the control node determines whether the first target delay is less than the first timeout threshold. If yes, the control node determines that processing of the first test packet by the network node is normal, that is, no network congestion event occurs inside the network node. If no, the control node generates the first congestion indication information, where the first congestion indication information is used to indicate that a network congestion event occurs inside the network node. In this case, the operation and maintenance personnel determine, based on the first congestion indication information, that congestion occurs when the first test packet is transmitted to the network node. Optionally, the first congestion indication information may include the UUID of the network node, and the operation and maintenance personnel may accurately determine, based on the UUID, a specific network node inside which a network congestion event occurs in the path.

Step 1207 and step 1208 in this embodiment are optional steps.

Step 1209: The control node obtains a second target delay.

The control node in this embodiment may determine a transmission delay of the link between the network node and the next-hop network node based on a mirrored packet reported by the network node in the path and a mirrored packet reported by the next-hop network node.

The second target delay in this embodiment is the transmission delay of the link between the network node and the next-hop network node. Specifically, the second target delay may be a difference between the generation timestamp carried in the third mirrored packet sent by the next-hop network node and a generation timestamp carried in any mirrored packet sent by the network node. The third mirrored packet reported by the next-hop network node may be a mirrored packet generated by the first packet mirroring point of the next-hop network node, or may be a mirrored packet generated by the second packet mirroring point of the next-hop network node. This is not specifically limited in this embodiment.

In this embodiment, an example in which the second target delay is a difference between the generation timestamp carried in the third mirrored packet of the next-hop network node and the second generation timestamp carried in the second mirrored packet of the network node is used for description. The third mirrored packet is a mirrored packet generated by the first packet mirroring point of the next-hop network node, and the second generation timestamp is a timestamp at which the second packet mirroring point of the network node generates the second mirrored packet. It can be learned that, the second target delay in this example is a difference between a moment at which the first test packet flows into a virtual switch of the next-hop network node and a moment at which the first test packet flows out of the virtual switch of the network node.

Step 1210: The control node generates second congestion indication information.

In this embodiment, the test task information received by the control node includes a second timeout threshold. The control node determines whether the second target delay is less than the second timeout threshold. If yes, the control node determines that transmission between the network node and the next-hop network node is normal, that is, no network congestion event occurs between the network node and the next-hop network node. If no, the control node generates the second congestion indication information, where the second congestion indication information is used to indicate that a network congestion event occurs on the link between the network node and the next-hop network node. In this case, the operation and maintenance personnel determine, based on the second congestion indication information, that congestion occurs when the first test packet is transmitted between the network node and the next-hop network node. Optionally, the second congestion indication information may include the UUID of the network node and a UUID of the next-hop network node, so that the operation and maintenance personnel accurately locate the network congestion event occurring on the link between the network node and the next-hop network node.

Step 1209 and step 1210 in this embodiment are optional steps.

Step 1211: The control node obtains a third target delay.

The control node in this embodiment may determine a single trip time (STT) for transmitting the first test packet in the path. A specific process is as follows.

The control node determines a first generation timestamp sent by a source node; and the control node determines a second generation timestamp sent by a destination node. For specific descriptions of the first generation timestamp and the second generation timestamp, refer to the foregoing descriptions. Details are not described again.

The control node obtains the third target delay, where the third target delay is a difference between the second generation timestamp sent by the destination node and the first generation timestamp sent by the source node.

Optionally, the control node may calculate a packet loss rate based on the third target delay. For a specific calculation process, refer to the foregoing description. Details are not described again.

Step 1211 in this embodiment is an optional step.

Step 1212: The control node obtains a fourth target delay.

The fourth target delay in this embodiment is a round trip time (RTT) for transmitting a test packet between the source node and the destination node. A specific process is as follows.

The control node determines a first target generation timestamp, where the first target generation timestamp is a timestamp at which the source node generates a first mirrored packet based on the first test packet.

The control node determines a second target generation timestamp, where the second target generation timestamp is a timestamp at which the source node generates a second mirrored packet based on a second test packet.

The control node obtains the fourth target delay, where the fourth target delay is a difference between the second target generation timestamp and the first target generation timestamp.

The control node in this embodiment may calculate a packet loss rate based on the fourth target delay. For a specific calculation process, refer to the foregoing description. Details are not described again.

Step 1212 in this embodiment is an optional step.

Step 1213: The control node obtains a preset path.

The control node in this embodiment may obtain the preset path from the received test task information. The preset path includes a node type of each network node that a service packet passes through in a process of transmission between the source node and the destination node. For a specific description of the preset path, refer to step 701. Details are not described again in this embodiment.

Step 1214: The control node determines a traffic map corresponding to the test packet.

An example in which the control node obtains a traffic map corresponding to the first test packet is used for description below. Because the first test packet can completely track a process of transmitting the service packet, a fault that occurs in the process of transmitting the service packet along the path can reoccur based on a fault that occurs in a process of transmitting the first test packet along the path. In addition, because the first test packet and the service packet in this embodiment are in a decoupling relationship, to be specific, transmission of the first test packet and transmission of the service packet are separated from each other in the path, normal transmission of the service packet is not affected in a process of evaluating transmission performance of the path by using the first test packet. The following describes a process in which the control node evaluates the transmission performance of the path based on a mirrored packet reported by each network node.

Figure 13:
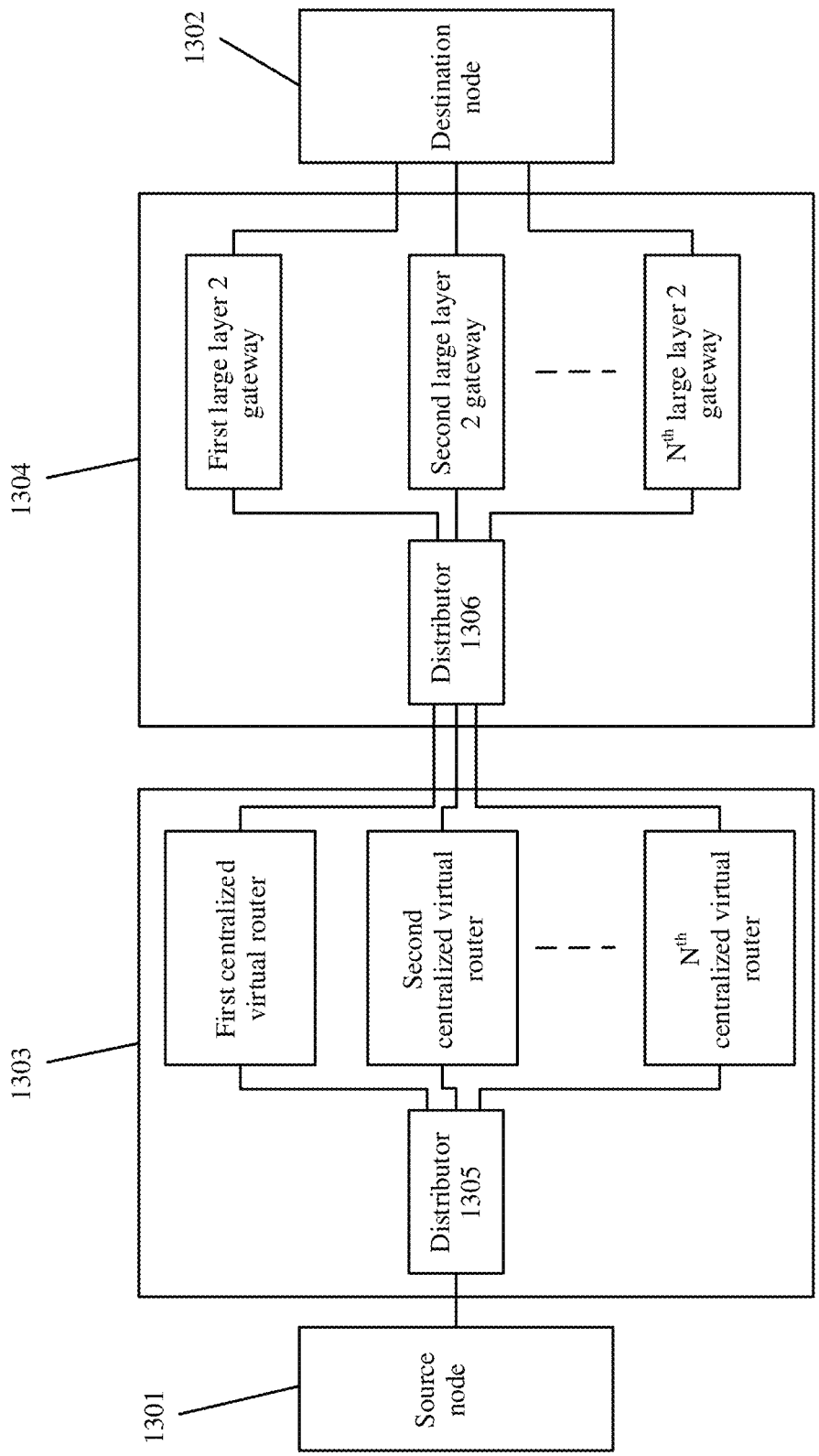
FIG. 13 is a schematic diagram of another network architecture of a network according to this disclosure.

The traffic map corresponding to the first test packet in this embodiment refers to network element instances that the first test packet sequentially passes through in a transmission process. For a better understanding, the following provides an example description with reference to FIG. 13. As shown in FIG. 13, an example in which the path includes a source node 1301, a first forwarding cluster 1303, a second forwarding cluster 1304, and a destination node 1302 is used for description. The first forwarding cluster 1303 includes a plurality of forwarding nodes having a same node type. When the first forwarding cluster 1303 receives the first test packet, a forwarding node included in the first forwarding cluster 1303 forwards the first test packet. For a specific description of the second forwarding cluster 1304, refer to a description of the first forwarding cluster 1303. Details are not described again.

In this embodiment, the test task information received by the control node from the control node includes the preset path. For a specific description of the preset path, refer to step 701. Details are not described again. It can be learned that, the control node can determine, based on the received preset path, a node type of each network node that the first test packet passes through in a process in which the first test packet is transmitted between the source node 1301 and the destination node 1302. However, the control node cannot determine, based on an indication of the preset path, a network element instance of each forwarding node that the first test packet passes through in a specific process in which the first test packet is transmitted between the source node 1301 and the destination node 1302.

For example, if the preset path received by the control node includes a computing node, a centralized virtual router (VROUTER), a large layer 2 gateway (L2GW), and a computing node. In the preset path, a node type of a source node on which a source virtual machine is located is a computing node, a node type of a destination node on which a destination virtual machine is located is a computing node, two forwarding clusters sequentially connected are included between the source node and the destination node, node types of all forwarding nodes included in a first forwarding cluster are centralized virtual routers, and node types of all forwarding nodes included in a second forwarding cluster are large layer 2 gateways.

FIG. 13 is still used as an example. The first forwarding cluster 1303 is a cluster including a plurality of centralized virtual routers, and the second forwarding cluster 1304 is a cluster including a plurality of large layer 2 gateways. The control node can determine, based on the indication of the preset path, that the first test packet flows out of the source node 1301, and then sequentially flows through the first forwarding cluster 1303 and the second forwarding cluster 1304, to flow into the destination node 1302. However, the control node cannot determine a specific centralized virtual router that forwards the first test packet when the first test packet flows through the first forwarding cluster 1303, and cannot determine a specific large layer 2 gateway that forwards the first test packet when the first test packet flows through the second forwarding cluster 1304, either.

According to the method in this embodiment, generation location information carried in the mirrored packet reported by each network node to the control node includes a UUID of the network node and indication information, where the indication information is used to indicate a node type of the network node.

Still referring to FIG. 13, optionally, a first mirrored packet reported by a first packet mirroring point of the source node 1301 to the control node includes a UUID of the source node 1301 and indication information used to indicate that a node type of the source node 1301 is a computing node, and a second mirrored packet reported by a second packet mirroring point of the source node 1301 to the control node also includes the UUID and the indication information of the source node 1301. Optionally, only one of the first mirrored packet and the second mirrored packet in this embodiment may include the UUID and the indication information of the source node 1301.

When the source node 1301 determines, based on an indication of a 5-tuple included in the first test packet, that a next-hop forwarding node used to forward the first test packet is the first forwarding cluster 1303, the source node 1301 may send the first test packet to the first forwarding cluster 1303. The first forwarding cluster 1303 may include a distributor 1305 connected to all the forwarding nodes included in the first forwarding cluster 1303, and the distributor 1305 receives the first test packet. A specific form of the distributor is not limited in this embodiment, provided that the distributor can determine, in the forwarding cluster 1303, a network element instance used to forward the first test packet. For example, the distributor may be a physical computer device that is independent of and coupled to each forwarding node in the first forwarding cluster 1303.

FIG. 13 is still used as an example. The distributor 1305 may determine, in a manner such as load balance, random selection, or the like, a network element instance that is in the first forwarding cluster 1303 and that is used to forward the first test packet. For example, when the forwarding cluster 1303 includes N centralized virtual routers, the distributor 1305 may determine, based on load of each centralized virtual router, a centralized virtual router currently used to forward the first test packet. For another example, the distributor 1305 may randomly select a centralized virtual router from the forwarding cluster 1303 to forward the first test packet. In this embodiment, if the distributor 1305 determines that a second centralized virtual router included in the first forwarding cluster 1303 has lightest load, the distributor 1305 determines that the second centralized virtual router is used to forward the first test packet.

In a process in which the second centralized virtual router forwards the first test packet, the second centralized virtual router may mirror the first test packet to generate a first mirrored packet and a second mirrored packet. At least one of the first mirrored packet and the second mirrored packet that are reported by the second centralized virtual router to the control node includes a node type and a UUID of the second centralized virtual router.

After the second centralized virtual router forwards the first test packet to a next-hop forwarding node, that is, the second forwarding cluster 1304, if a distributor 1306 of the second forwarding cluster 1304 determines that an $N^{th}$ large layer 2 gateway is used to forward the first test packet, at least one of a first mirrored packet and a second mirrored packet that are sent by the $N^{th}$ large layer 2 gateway to the control node includes a node type and a UUID of the $N^{th}$ large layer 2 gateway.

Similarly, at least one of a first mirrored packet and a second mirrored packet that are reported by the destination node 1302 to the control node includes a node type and a UUID of the destination node.

It can be learned that, at least one of a first mirrored packet and a second mirrored packet that are sent by a same network node in the path to the control node includes a UUID of the network node and indication information used to indicate a node type of the network node. In this embodiment, an example in which both a first mirrored packet and a second mirrored packet include a UUID and indication information is used for description.

The control node compares a node type and a UUID of each network node that are carried in each of a first mirrored packet and a second mirrored packet that are sent by the network node that the received first test packet passes through with those in the preset path, to determine a network element instance of each network node that the first test packet passes through. FIG. 13 is still used as an example. If the control node determines that node types included in a first mirrored packet and a second mirrored packet that are reported by the first forwarding cluster 1303 are the same as a node type included in the preset path, and both are centralized virtual routers, the control node may determine, based on UUIDs included in the first mirrored packet and the second mirrored packet that are sent by the first forwarding cluster 1303, that a network element instance used to forward the first test packet is the second centralized virtual router. Similarly, the control node may determine, based on UUIDs included in a first mirrored packet and a second mirrored packet that are sent by the second forwarding cluster 1304, that a network element instance used to forward the first test packet is the $N^{th}$ large layer 2 gateway.

It can be learned that, the control node determines, based on all received first mirrored packets and second mirrored packets, a UUID corresponding to a target node type, where the target node type is any node type included in the preset path, and the target node type is a same node type included in the preset path and the mirrored packet. In this way, the control node may draw a traffic map based on all the received first mirrored packets and second mirrored packets. The traffic map includes a UUID of each network node that the first test packet sequentially passes through in a transmission process. In the foregoing example shown in FIG. 13, the traffic map drawn by the control node includes the UUID of the source node 1301, the UUID of the second centralized virtual router, the UUID of the $N^{th}$ large layer 2 gateway, and the UUID of the destination node 1302.

To better understand the foregoing description, the following describes, with reference to Table 1 by using an example, the traffic map that is of the first test packet and that is determined by the control node based on the foregoing indication information and UUID that are reported by each network node in the path.

TABLE 1

| First network node | Node type | CNA |
|---|---|---|
|  | UUID | efec-fece-0987 |
| Second network node | Node type | VROUTER |
|  | UUID | VROUTER_server_2 |
| Third network node | Node type | L2GW |
|  | UUID | L2GW_server_N |

TABLE 1-continued

| Fourth network node | Node type | CNA |
| --- | --- | --- |
| | UUID | 0c32-fece-641d |

It can be learned from Table 1 that, the control node can indicate, based on Table 1, that in a process of transmitting the first test packet in the path, the node type of the first network node that the first test packet passes through is "CNA" and a corresponding UUID is "efec-fece-0987", the node type of the second network node that the first test packet passes through is "vRouter" and a corresponding UUID is "VROUTER_server_2", that is, the second centralized virtual router shown in FIG. 13, the node type of the third network node that the first test packet passes through is "L2GW" and a corresponding UUID is "L2GW_server_N", that is, the $N^{th}$ large layer 2 gateway shown in FIG. 13, and the node type of the fourth network node that the first test packet passes through is "CNA" and a corresponding UUID is "0c32-fece-641d".

It can be learned that, according to the method in this embodiment, in a network, when there are a plurality of optional paths used to forward a first test packet, a test task is delivered, and a control node and a processor cannot predetermine a network element instance of each network node that the first test packet passes through in a transmission process, the control node may determine, based on a node type and a UUID of the network node that are included in a first mirrored packet and a second mirrored packet, a path that the first test packet actually passes through in the transmission process, and further determine a flow direction of a packet sent by a source node to a destination node.

The control node in this embodiment may further obtain a traffic map corresponding to the second test packet. For a description of a specific process in which the control node obtains the traffic map corresponding to the second test packet, refer to the foregoing description of the example in which the control node obtains the traffic map corresponding to the first test packet. Details are not described again in this embodiment.

Step 1213 and step 1214 in this embodiment are optional steps.

Step 1215: The control node sends notification information to the configuration node.

Step 1216: The configuration node receives evaluation result information from the control node.

For a specific process of performing step 1215 and step 1216 in this embodiment, refer to step 714 and step 715 shown in FIG. 7. Details are not described again.

Beneficial effects of using the method in this embodiment are as follows:

According to the method in this embodiment, the control node can analyze, by using a first mirrored packet and a second mirrored packet that are reported by each network node in a path, whether a fault occurs, whether a packet loss event occurs, whether a network congestion event occurs, or the like on a link between a network node and a next-hop network, or a path inside each network node or a path that a first test packet passes through in a transmission process. This accurately evaluates transmission performance related to each network node in the path, reduces a difficulty in and overheads for evaluating transmission performance of a network, and improves evaluation efficiency.

Because a network node inside which a packet loss event occurs can be accurately located, a phenomenon of a "gray failure" occurring in a network can be effectively avoided, and a UUID of a specific network node inside which the packet loss event occurs in the path can be determined, or a link that is between two specific adjacent network nodes and on which a packet loss event occurs can be determined. According to the method in this embodiment, if the "gray failure" occurs in the network, the "gray failure" can be quickly located.

The control node in this embodiment can determine, for a test packet reported by a network node, a traffic map of the test packet, to be specific, determine a specific network element instance of each network node that the test packet passes through in a transmission process. In this way, the control node can accurately determine a flow direction of a packet transmitted between a source virtual machine and a destination virtual machine, to facilitate traffic scheduling, congestion control, and the like performed by the operation and maintenance personnel on the network.

Figure 14A:
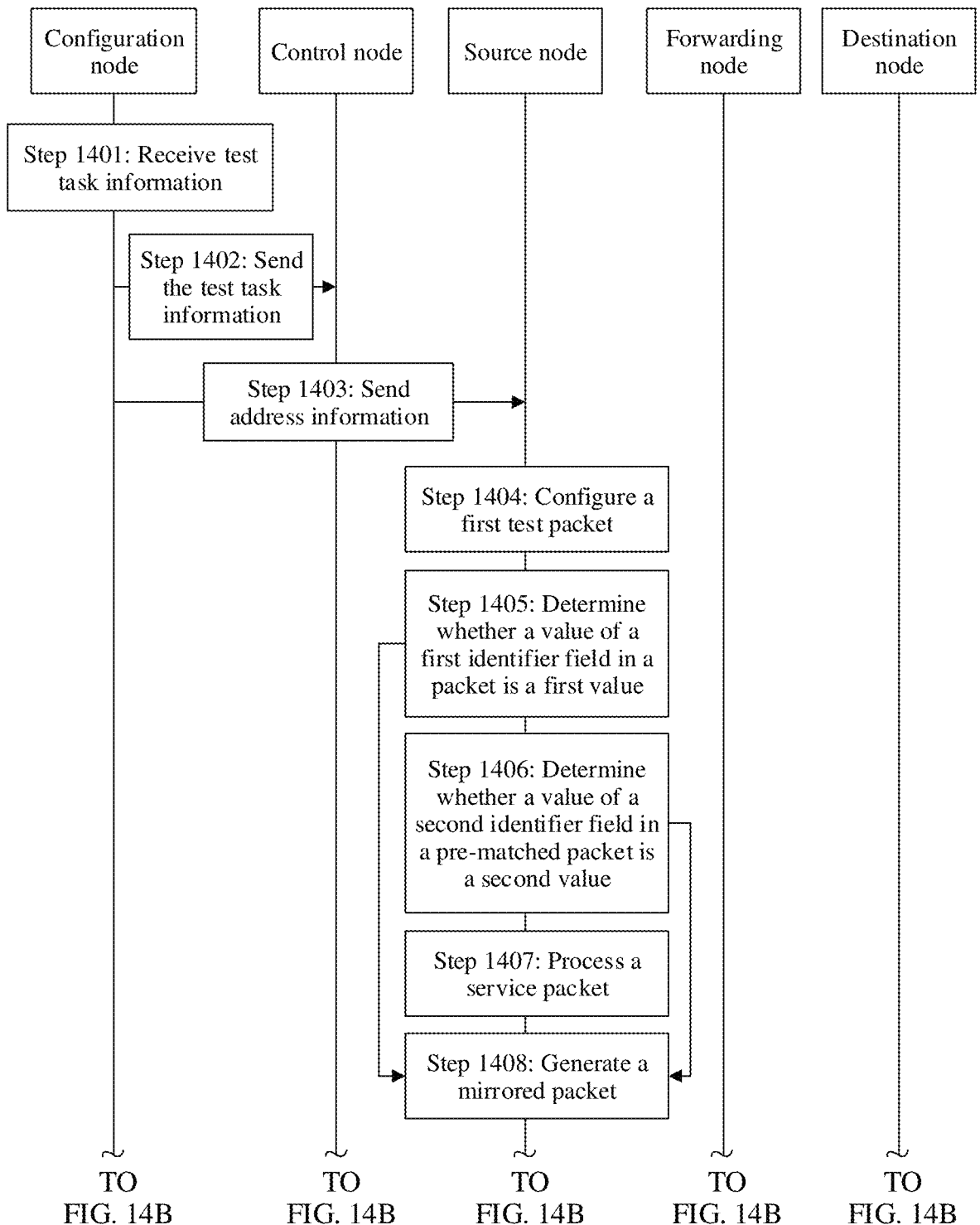
FIG. 14A and FIG. 14B are a flowchart of steps in a method for evaluating transmission performance related to a network node according to another embodiment of this disclosure.
Figure 14B:
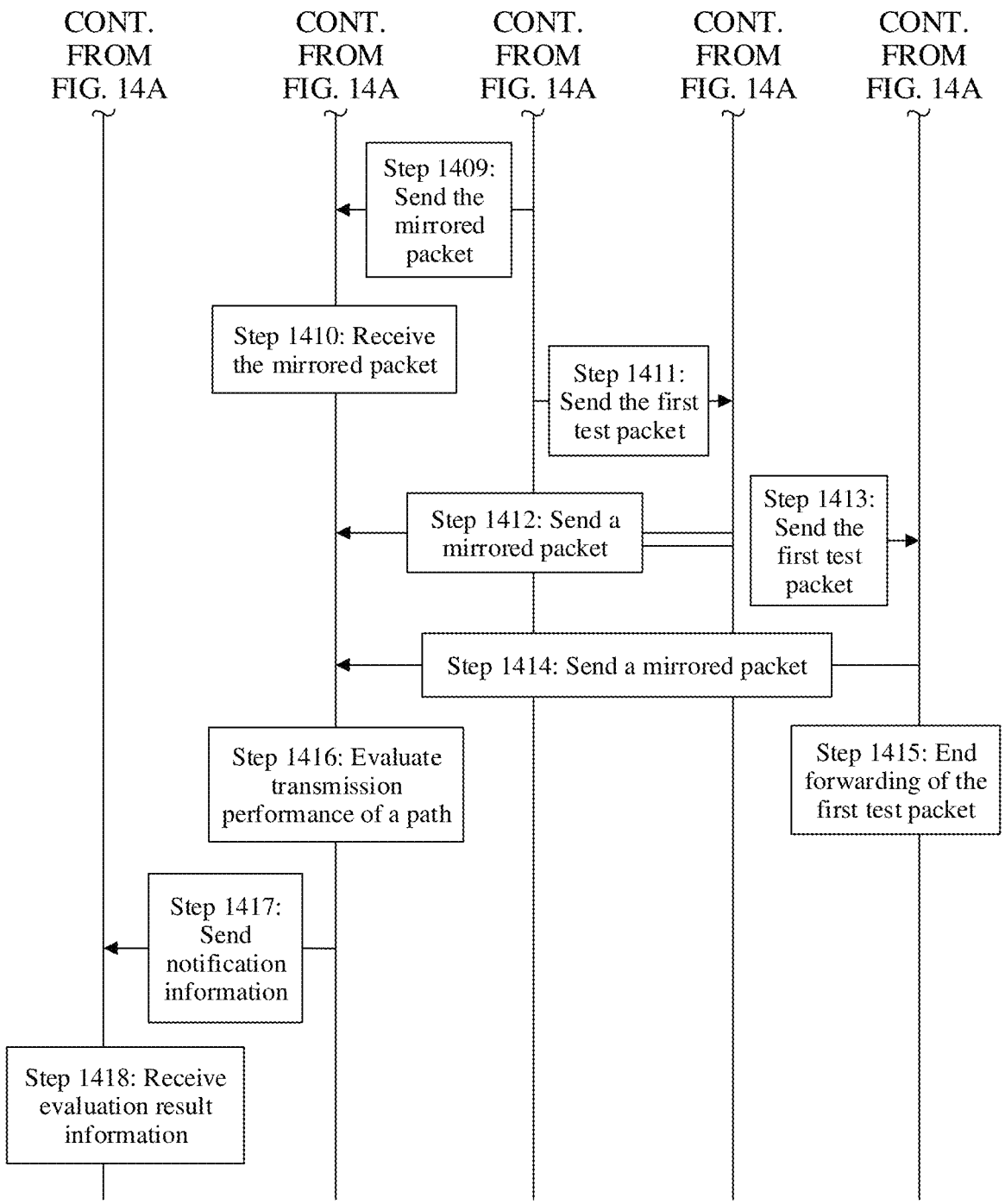

Based on the methods shown in FIG. 5, FIG. 7, FIG. 11A and FIG. 11B, and FIG. 12A and FIG. 12B, the following describes, with reference to FIG. 14A and FIG. 14B by using an example, a configuration process and a detection process of the test packet in the foregoing embodiment.

Step 1401: A configuration node receives test task information.

Step 1402: The configuration node sends the test task information to a control node.

Step 1403: The configuration node sends address information to a source node.

For a specific process of performing step 1401 to step 1403 in this embodiment, refer to step 701 to step 703 shown in FIG. 7. The specific performing process is not described again in this embodiment.

Step 1404: An agent of the source node configures a first test packet based on the address information.

Specifically, the agent carried on the source node in this embodiment is configured to configure the first test packet, where the first test packet configured by the agent includes a first identifier field having a first value and a second identifier field having a second value. Specific locations of the first identifier field and the second identifier field in the first test packet are not limited in this embodiment. To improve efficiency of identifying the first test packet, a bit length of the second identifier field is greater than a bit length of the first identifier field. In this embodiment, the first value and the second value jointly indicate that a packet is a test packet. Specifically, when each packet mirroring point receives a packet, the packet mirroring point can determine that the packet is the first test packet, only when the packet mirroring point determines that a value of a first identifier field included in the packet is the first value and a value of a second identifier field included in the packet is the second value.

In this embodiment, an example in which a packet structure of the first test packet is an internet protocol version 4 (IPv4) packet structure is used for description. It should be noted that a description of a specific packet structure of the first test packet in this embodiment is an optional example. Optionally, the packet structure of the first test packet may alternatively be an internet protocol version 6 (IPv6) packet structure.

Figure 15:
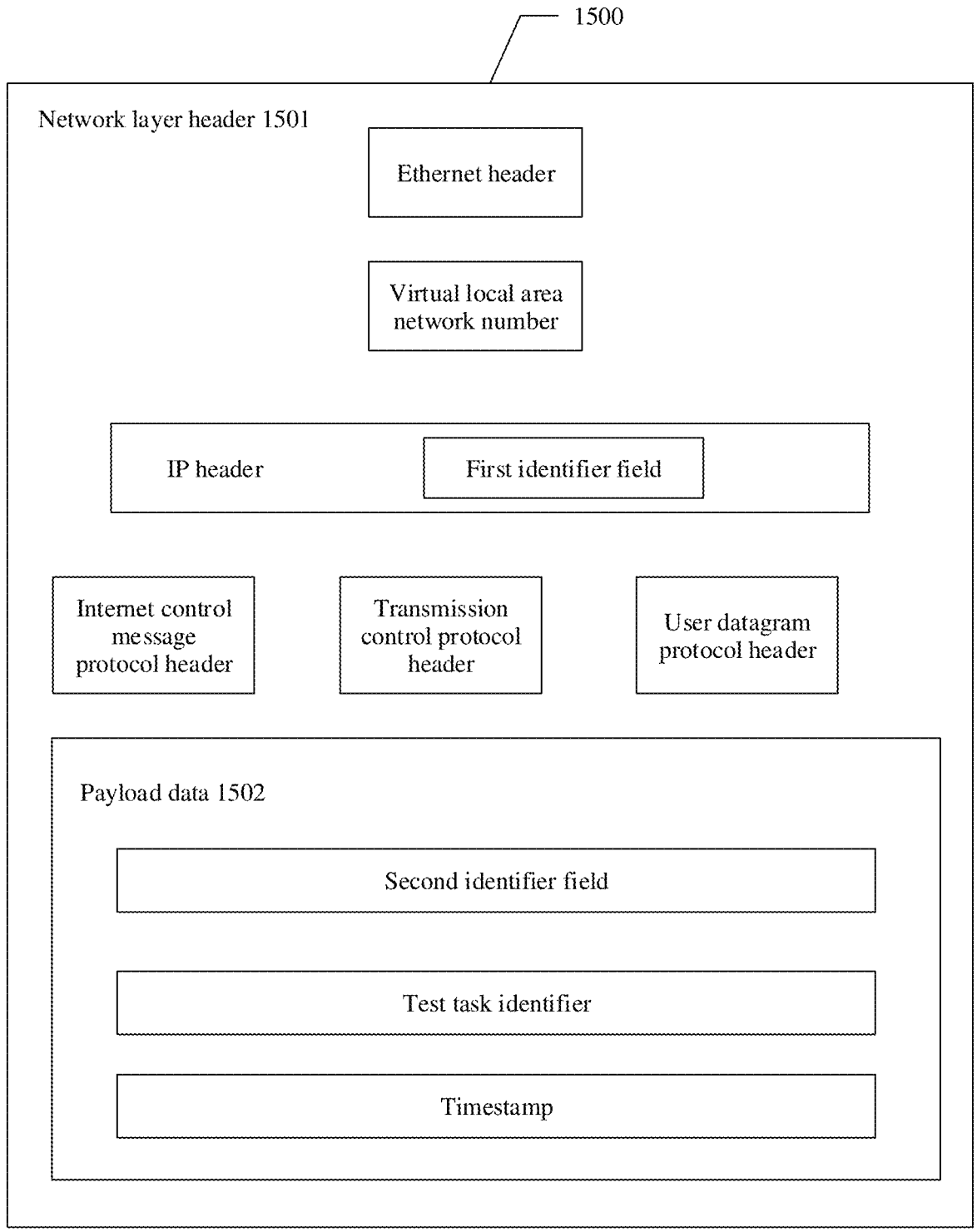
FIG. 15 is a schematic structural diagram of a packet structure of a first test packet according to an embodiment of this disclosure.

When the packet structure of the first test packet is an IPv4 packet structure, for the packet structure of the first test packet, refer to FIG. 15. As shown in FIG. 15, a first test packet 1500 includes a network layer header 1501 and payload data 1502. The network layer header 1501 may include an Ethernet header (Ethernet Hdr), a virtual local area network (VLAN) number, an IP header, an internet control message protocol (ICMP) header, a transmission control protocol (TCP) header, a user datagram protocol (UDP) header, and the like.

Specifically, the IP header includes a source IP address, a destination IP address, a protocol, a fragment flag bit, and the like, where a first bit (that is, a pre-matched bit field) of the fragment flag bit is used as the first identifier field. A reserved bit included in an IP header of the service packet is fixed to 0. When the agent configures the first test packet, the reserved bit is set to 1.

The second identifier field is set in the payload data 1502. The bit length of the first identifier field is 1 bit in this embodiment, and the length of the second identifier field is not limited in this embodiment. In this embodiment, the bit length of the second identifier field is 128 bits. The payload data 1502 further includes a test task identifier, a timestamp, and the like. A description of another structure of the payload data 1502 is not limited in this embodiment.

Optionally, the control node in this embodiment may send, in advance, the first identifier field having the first value and the second identifier field having the second value to an agent of each network node in a path. When the agent of the source node receives the first identifier field having the first value and the second identifier field having the second value, and the agent of the source node receives the test task information, the agent of the source node may configure the first test packet including the first identifier field and the second identifier field. It can be learned from the foregoing embodiment that, the agent of the source node sends the configured first test packet to a first packet mirroring point of the source node.

Step 1405: The first packet mirroring point of the source node determines whether a value of a first identifier field in a packet is the first value. If yes, step 1406 is performed. If no, step 1407 is performed.

Specifically, after the first packet mirroring point of the source node receives a packet, where the packet may be the first test packet sent by the agent of the source node to the first packet mirroring point, or may be a service packet that is sent by a source virtual machine to the first packet mirroring point and that is to be transmitted to a destination virtual machine, the first packet mirroring point needs to identify the received packet; to identify whether the received packet is the first test packet, the first packet mirroring point first obtains a first identifier field included in the packet, where a location of the first identifier field in the packet is a location of a pre-matched bit field; and the first packet mirroring point determines whether a value of the first identifier field in the packet is the first value.

If the value of the first identifier field in the packet is not the first value, it indicates that the packet is a service packet that needs to be transmitted to the destination virtual machine for processing, and step 1407 is performed. If the value of the first identifier field in the packet is the first value, it is determined that the packet is a pre-matched packet, and step 1406 needs to be performed to further accurately determine whether the pre-matched packet is the first test packet, to avoid a possibility of misdetermining.

It can be learned from the foregoing example that, the first identifier field is a pre-matched bit field in an IP header of a packet and has a value of 1. After receiving the packet, the first packet mirroring point parses a value of the pre-matched bit field in the IP header of the packet. If the value is 1, it indicates that the packet is a pre-matched packet. If the value is 0, it indicates that the packet is a service packet.

Step 1406: The first packet mirroring point of the source node determines whether a value of a second identifier field in the pre-matched packet is the second value. If no, step 1407 is performed. If yes, step 1408 is performed.

When the first packet mirroring point determines that the value of the second identifier field in the pre-matched packet is the second value, the first packet mirroring point determines that the pre-matched packet is the first test packet. If the value of the second identifier field in the pre-matched packet is different from the second value, the first packet mirroring point determines that the pre-matched packet is a service packet.

Step 1407: A virtual switch of the source node processes the service packet.

In this embodiment, when the first packet mirroring point of the source node identifies the service packet, the first packet mirroring point does not mirror the service packet, but inputs the service packet into the virtual switch, so that the virtual switch performs corresponding processing on the service packet. For a specific processing process, refer to the foregoing embodiment. Details are not described again in this embodiment.

Step 1408: The packet mirroring point of the source node mirrors the first test packet to generate a mirrored packet.

When the first packet mirroring point identifies that the packet is the first test packet, the first packet mirroring point of the source node mirrors the first test packet to generate a first mirrored packet.

Optionally, the first packet mirroring point in this embodiment may obtain a matching rule of the first test packet in advance. The matching rule specifically means that the first packet mirroring point implements pre-matching for the first test packet by performing step 1405, and only after the pre-matching for the first test packet succeeds, the first packet mirroring point implements exact matching for the first test packet by performing step 1406, and mirrors the first test packet after the exact matching for the first test packet succeeds. The matching rule of the first test packet may be stored in a flow table of the source node, or the matching rule of the first test packet may be added to a hook function of the first packet mirroring point.

The source node in this embodiment further includes a second packet mirroring point. For a specific process in which the second packet mirroring point identifies the first test packet and mirrors the first test packet to generate a second mirrored packet, refer to the foregoing specific description in which the first packet mirroring point identifies the first test packet and generates the first mirrored packet. Details are not described again.

Step 1409: The source node sends the mirrored packet to the control node.

Step 1410: The control node receives the mirrored packet.

For a specific process of performing step 1409 and step 1410 in this embodiment, refer to step 706 and step 707 shown in FIG. 7. The specific performing process is not described again.

Step 1411: The source node sends the first test packet to a forwarding node.

In this embodiment, a first packet mirroring point and a second packet mirroring point of the forwarding node need to separately identify whether the received packet is the first test packet. For a specific identification process, refer to a specific process in which the source node identifies the first test packet in step 1406 to step 1408. Details are not described again in this step.

Step 1412: The forwarding node sends a mirrored packet to the control node.

For a specific process of performing step 1412 in this embodiment, refer to step 710. The specific performing process is not described again.

Step 1413: The forwarding node sends the first test packet to a destination node.

In this embodiment, a first packet mirroring point and a second packet mirroring point of the destination node need to separately identify whether the received packet is the first test packet. For a specific identification process, refer to the specific process in which the source node identifies the first test packet in step 1406 to step 1407. Details are not described again in this step.

Step 1414: The destination node sends a mirrored packet to the control node.

Step 1415: The destination node ends forwarding of the first test packet.

Step 1416: The control node evaluates transmission performance of the path based on the mirrored packet.

Step 1417: The control node sends notification information to the configuration node.

Step 1418: The configuration node receives evaluation result information from the control node.

For a specific process of performing step 1414 to step 1418 in this embodiment, refer to step 711 to step 715 shown in FIG. 7. The specific performing process is not described again.

In this embodiment, a unidirectional test mode is used as an example for description. If the method for evaluating transmission performance related to a network node in this disclosure is applied to a bidirectional test mode, for a specific process in which the destination node configures a second test packet, refer to a specific process in which the source node configures the first test packet in this embodiment. Details are not described again in this embodiment. For a specific process in which each network node identifies whether the received packet is the second test packet, refer to a specific process in which each network node identifies whether the received packet is the first test packet in this embodiment. Details are not described again.

According to the method in this embodiment, the first identifier field having the first value and the second identifier field having the second value may jointly indicate that a packet is a test packet, to implement two-level matching for the test packet. Because the bit length of the first identifier field is less than the bit length of the second identifier field, when a value of a first identifier field in a packet is not the first value, resources of the network node are not consumed to continue to detect whether the packet is a test packet, and most service packets unrelated to the test packet may be filtered out by using the first identifier field, so that resources of the network node are saved, and overheads for identifying the test packet are effectively reduced. When the value of the first identifier field in the packet is the first value, the network node determines whether a value of a second identifier field in the packet is the second value. The network node determines that the packet is the test packet, only when the value of the second identifier field in the packet is the second value. Because the bit length of the second identifier field is relatively long, identification of the test packet by using the second identifier field avoids a case of misidentification, implements accurate identification of the test packet, and eliminates noise caused by misidentification of the test packet.

To better understand the method for evaluating transmission performance related to a network node in the foregoing embodiments, the following describes, with reference to an application scenario, the method for evaluating transmission performance related to a network node in this disclosure.

The application scenario of the method for evaluating transmission performance related to a network node in this disclosure is first described with reference to FIG. 16 by using an example. According to this application scenario, a packet loss location of a path can be accurately determined.

Figure 16:
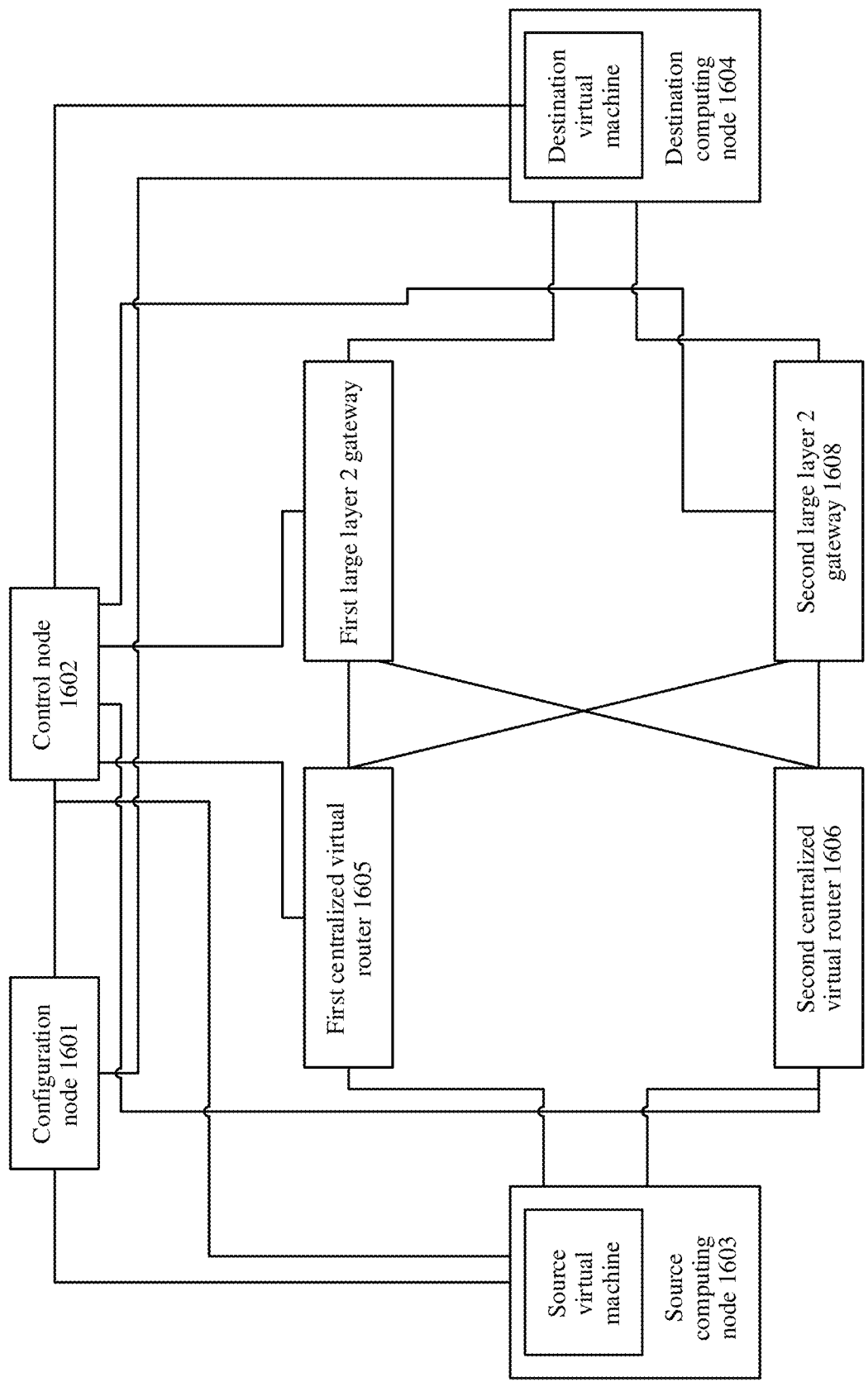
FIG. 16 is a schematic diagram of another network architecture of a network according to this disclosure.

As shown in FIG. 16, in this application scenario, a scenario of "east-west virtual private cloud point-to-point connection traffic" of a data center is used as an example. Network nodes in a preset path of the "east-west virtual private cloud point-to-point connection traffic" are sequentially: a source computing node on which a source virtual machine is located, a centralized virtual router (VROUTER), a large layer 2 gateway (L2GW), and a destination computing node in which a destination virtual machine is located.

In this application scenario, it is assumed that the source virtual machine is located on a first virtual private cloud (VPC), the destination virtual machine is located on a second VPC, and there is a peering connection between the first VPC and the second VPC. When a user accesses the destination virtual machine by using the source virtual machine, it is found that a gray packet loss occurs. To be specific, a part of packets sent from the source virtual machine to a port of the destination virtual machine can arrive at the port of the destination virtual machine, while others cannot arrive at the port of the destination virtual machine. As a result, a service between the source virtual machine and the destination virtual machine is intermittently interrupted. Based on this, operation and maintenance personnel determine that a cluster exists in a network between the source virtual machine and the destination virtual machine, so that a packet sent from the source virtual machine can be transmitted to the destination virtual machine through a plurality of paths, and at least one path in the plurality of paths between the source virtual machine and the destination virtual machine is unreachable, resulting in a packet loss.

Therefore, the operation and maintenance personnel create test task information by using a configuration node 1601. The configuration node 1601 may send the test task information to a source computing node 1603. The source computing node 1603 configures a first test packet to be sent from the source virtual machine to the destination virtual machine. For a specific process, refer to the foregoing embodiment. Details are not described again.

In this application scenario, an example in which the source computing node 1603 sends the first test packet to a destination computing node 1604 for 10 times is used for description. Specifically, an agent of the source node sends the configured first test packet to a first packet mirroring point of the source node for 10 times. The first test packet sent each time flows into a virtual switch of the source node through the first packet mirroring point, and flows out of the virtual switch through a second packet mirroring point. For descriptions of the first packet mirroring point and the second packet mirroring point, refer to the foregoing example. Details are not described again.

According to an indication of a 5-tuple in the first test packet, a next hop of the first test packet that flows out of the source computing node 1603 is a centralized virtual router cluster. The centralized virtual router cluster includes two centralized virtual routers that can forward the first test packet, that is, a first centralized virtual router 1605 and a second centralized virtual router 1606.

Because the source computing node 1603 sends 10 first test packets to the centralized virtual router cluster, after receiving the first test packets, according to a readily available distribution principle, the centralized virtual router cluster may send three of the 10 first test packets to the first centralized virtual router 1605, and send the other seven first test packets to the second centralized virtual router 1606.

The first centralized virtual router 1605 and the second centralized virtual router 1606 each need to mirror the first test packet by using a first packet mirroring point to generate a first mirrored packet, and send the first mirrored packet to a control node 1602; and further need to mirror the first test packet by using a second packet mirroring point to generate a second mirrored packet, and send the second mirrored packet to the control node 1602. For specific descriptions of the first packet mirroring point and the second packet mirroring point, refer to the foregoing embodiment. Details are not described again.

The first centralized virtual router 1605 is used as an example. After receiving the first mirrored packet reported by the first centralized virtual router 1605, the control node 1602 starts timing by using a first generation timestamp carried in the first mirrored packet as a timing start point; and determines whether the first centralized virtual router 1605 receives, within first target duration, the second mirrored packet reported by the first centralized virtual router 1605. In this application scenario, after the control node 1602 receives the first mirrored packet reported by the second centralized virtual router 1606, if the second mirrored packet reported by the second centralized virtual router 1606 is not received within the first target duration, it indicates that a packet loss event occurs inside the second centralized virtual router 1606, and the second centralized virtual router 1606 cannot forward the first test packet to a next-hop large layer 2 gateway cluster.

It can be learned that, according to this application scenario, packet loss location detection results of the 10 first test packets sent by the source computing node 1603 are shown in Table 2. In the 10 sent first test packets, seven packet loss events occur. To be specific, if the control node 1602 receives the first mirrored packet reported by the second centralized virtual router 1606, but does not detect, when the first target duration expires, the second mirrored packet reported by the second centralized virtual router 1606, the control node 1602 determines the packet loss events. In addition, packet loss locations are all inside the second centralized virtual router 1606. The other three test packets are distributed to the first centralized virtual router 1605, and can be normally forwarded to the next-hop large layer 2 gateway cluster. In this way, the control node 1602 can accurately diagnose that a fault point location of the "gray packet loss" is the second centralized virtual router 1606 in the centralized virtual router cluster, thereby implementing accurate locating of the "gray packet loss".

TABLE 2

| Network element instance | Quantity of received first mirrored packets | Quantity of received second mirrored packets |
|---|---|---|
| First centralized virtual router | 3 | 3 |
| Second centralized virtual router | 7 | 0 |

In this application scenario, a network node on which a failure such as congestion occurs and that is in a network between the source virtual machine and the destination virtual machine may be further evaluated. Details are as follows.

FIG. 16 is still used as an example. In this example, all network nodes in the preset path can implement normal packet forwarding. However, when the source virtual machine sends ping tests to the destination virtual machine, it is found that delays of some pings are excessively large. To find a bottleneck location, the source computing node 1603 configures the first test packet.

After receiving a first mirrored packet and a second mirrored packet that are sent by each network node, the control node 1602 may determine a first target delay of a same first test packet flowing into and flowing out of the network node. For a specific description of the first target delay, refer to the foregoing description. Details are not described again.

For example, the source computing node 1603 sends the first test packet for 4000 times in total. After analyzing a packet processing delay of each network node, the control node 1602 finds that a processing delay of the source computing node 1603 on which the source virtual machine is located is abnormal. As shown in Table 3, the control node 1602 can determine, based on all first mirrored packets and second mirrored packets reported by the source computing node 1603, a first target delay of forwarding each first test packet when the source computing node 1603 forwards the 4000 first test packets. The control node 1602 obtains 4000 first target delays through calculation, where a minimum value of the 4000 first target delays is used as a minimum intra-point processing delay in Table 3, a maximum value of the 4000 first target delays is used as a maximum intra-point processing delay in Table 3, an average value of the 4000 first target delays is used as an average intra-point processing delay in Table 3, and a standard deviation of the 4000 first target delays is used as an intra-point processing delay standard deviation. For details about statistics collected by the control node 1602 on the source computing node 1603, refer to Table 3.

According to measurement results shown in Table 3, the average intra-point processing delay of the source computing node 1603 is normal, and therefore, most ping test results of a tenant are normal. However, the maximum intra-point processing delay in Table 3 is obviously excessively large. Therefore, it is determined that occasional congestion occurs or another failure occurs on the virtual switch that is on the source computing node 1603 and that is responsible for forwarding the first test packet, and the operation and maintenance personnel are prompted to make a further check inside the source computing node 1603.

TABLE 3

| Node type | Computing node (CNA) |
|---|---|
| uuid | 60c6c579-b9c1-4172-85bd-27f648132a40 |
| Quantity of first test packets | 4000 |
| Minimum intra-point processing delay (ms) | 0.025331 |
| Maximum intra-point processing delay (ms) | 0.410671 |
| Average intra-point processing delay (ms) | 0.041166353 |
| Intra-point processing delay standard deviation | 0.00727703 |

Still referring to FIG. 16, the preset path includes a centralized virtual router cluster and a large layer 2 gateway cluster. When the source virtual machine sends a service packet to the destination virtual machine, an actual forwarding path that the service packet passes through cannot be determined. To be specific, a centralized virtual router that is actually responsible for forwarding the service packet and that is in the centralized virtual router cluster cannot be determined; and a large layer 2 gateway that is actually responsible for forwarding the service packet and that is in the large layer 2 gateway cluster cannot be determined, either.

To determine an actual packet forwarding path between the source virtual machine and the destination virtual machine, an example in which the agent of the source computing node 1603 sends the first test packet to the first packet mirroring point for 10 times is used in this application scenario. Both the first mirrored packet and the second mirrored packet that are sent by the source computing node 1603 to the control node 1602 include a UUID and indication information that is used to indicate a network element type. For a specific description, refer to the foregoing embodiment. Details are not described again.

The control node 1602 restores, based on the indication information and the UUID that are included in each mirrored packet, an actual path for forwarding the first test packet between the source computing node 1603 and the destination computing node 1604. With reference to Table 4 below, it can be learned that, because there are a plurality of paths in a cluster, 10 first test packets sent from the source computing node 1603 are distributed to two paths, where four first test packets are distributed to a first path, and six first test packets are distributed to a second path. Table 3 obtained through statistics collected by the control node 1602 provides a specific type and a UUID of a network node in each path. The operation and maintenance personnel can draw a traffic map in a multi-path scenario based on the result, and learn a specific traffic direction of a packet transmitted between the source computing node 1603 and the destination computing node 1604.

source computing node 1603 is "efec-fece-0987", and in the 10 first test packets sent by the source computing node 1603, four first test packets are transmitted along the first path. The first path sequentially includes the source computing node 1603, the first centralized virtual router 1605, a second large layer 2 gateway 1608, and the destination computing node 1604. A type of the first centralized virtual router 1605 is "vRouter", and a UUID of the first centralized virtual router 1605 is "VROUTER_server_1"; a type of the second large layer 2 gateway 1608 is "L2GW", and a UUID of the second large layer 2 gateway 1608 is "L2GW_server_2"; and a type of the destination computing node 1604 is "CNA", and a UUID of the destination computing node 1604 is "0c32-fece-641d". In the 10 first test packets sent by the source computing node 1603, six first test packets are transmitted along the second path. The second path sequentially includes the source computing node 1603, the second centralized virtual router 1606, the second large layer 2 gateway 1608, and the destination computing node 1604. A type of the second centralized virtual router 1606 is "vRouter", and a UUID of the second centralized virtual router 1606 is "VROUTER_server_2"; and the type of the second large layer 2 gateway 1608 is "L2GW", and the UUID of the second large layer 2 gateway 1608 is "L2GW_server_2".

Figure 17:
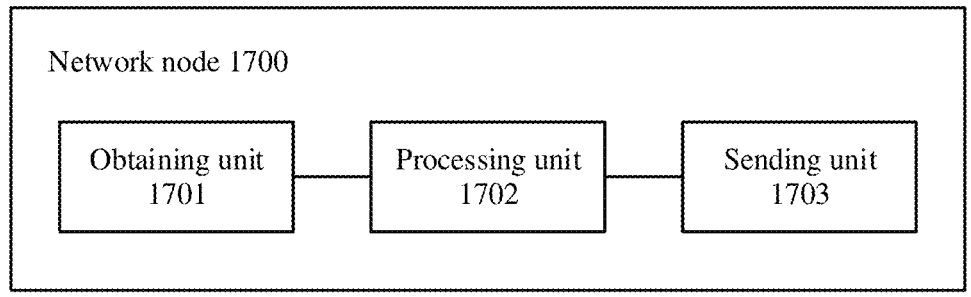
FIG. 17 is a schematic structural diagram of a network node according to an embodiment of this disclosure.

The method for evaluating transmission performance related to a network node provided in this disclosure is described above in detail with reference to FIG. 5, FIG. 7, FIG. 11A and FIG. 11B, FIG. 12A and FIG. 12B, and FIG. 14A and FIG. 14B. A network node 1700 provided in this disclosure is described below with reference to FIG. 17. The network node 1700 belongs to a path from a source node to a destination node, and the network node 1700 in this embodiment is configured to perform the method for evaluating transmission performance related to a network node in the foregoing embodiment. For a specific performing process, refer to the foregoing embodiment. Details are not described again.

The network node 1700 includes:

an obtaining unit 1701, configured to obtain a test packet, where the test packet includes a 5-tuple corresponding to the path;

TABLE 4

| Traffic map | First path | | Second path | |
|---|---|---|---|---|
| Quantity of transmitted first test packets | 4 | | 6 | |
| Source computing node | Type | CNA | Type | CNA |
| Traffic map | First path | | Second path | |
| | UUID | efec-fece-0987 | UUID | efec-fece-0987 |
| Centralized virtual router cluster | Type | vRouter | Type | vRouter |
| | UUID | VROUTER_server_1 | UUID | VROUTER_server_2 |
| Large layer 2 gateway cluster | Type | L2GW | Type | L2GW |
| | UUID | L2GW_server_2 | UUID | L2GW_server_2 |
| Destination computing node | Type | CNA | Type | CNA |
| | UUID | 0c32-fece-641d | UUID | 0c32-fece-641d |

It can be learned from Table 4 that, a node type of the source computing node 1603 is "CNA", a UUID of the a processing unit 1702, configured to process the test packet by using a virtual switch, to generate a mirrored packet corresponding to the test packet, where the mirrored packet carries a generation timestamp and generation location information, the generation timestamp is used to indicate a timestamp of a time for generating the mirrored packet, the generation location information is used to indicate a location at which the mirrored packet is generated, and the mirrored packet is used to evaluate transmission performance of at least a part of link that is related to the network node and that is in the path; and a sending unit 1703, configured to send the mirrored packet to a control node.

Optionally, the processing unit 1702 is configured to: mirror the test packet by using a first packet mirroring point of the network node, to generate a first mirrored packet, where the test packet flows into the virtual switch through the first packet mirroring point; and/or mirror the test packet by using a second packet mirroring point of the network node, to generate a second mirrored packet, where the test packet flows out of the virtual switch through the second packet mirroring point.

Optionally, the test packet includes a first identifier field having a first value and a second identifier field having a second value, the first value and the second value jointly indicate that a packet is a test packet, and a bit length of the second identifier field is greater than a bit length of the first identifier field.

Optionally, the first identifier field is a pre-matched bit field in a packet header, and the second identifier field is located inside payload data of the test packet.

Optionally, the obtaining unit 1701 is further configured to: determine at least one pre-matched packet from a plurality of received packets based on the first identifier field having the first value; and determine the test packet from the at least one pre-matched packet based on the second identifier field having the second value.

Optionally, the network node is a destination node. The obtaining unit 1701 is configured to receive a first test packet, where a source address carried in the first test packet is an address of the source node and a destination address carried in the first test packet is an address of the destination node. The processing unit 1702 is further configured to: when it is determined that the obtaining unit 1701 receives the first test packet, trigger the sending unit 1703 to send a second test packet. The sending unit 1703 is further configured to send the second test packet to the source node, where a source address carried in the second test packet is the address of the destination node and a destination address carried in the second test packet is the address of the source node.

Optionally, the network node is the source node or the destination node, and the processing unit 1702 is further configured to end, by using the second packet mirroring point, forwarding of the test packet.

Optionally, the sending unit 1703 is further configured to forward the test packet to a next-hop network node by using the virtual switch based on the 5-tuple included in the test packet.

Figure 18:
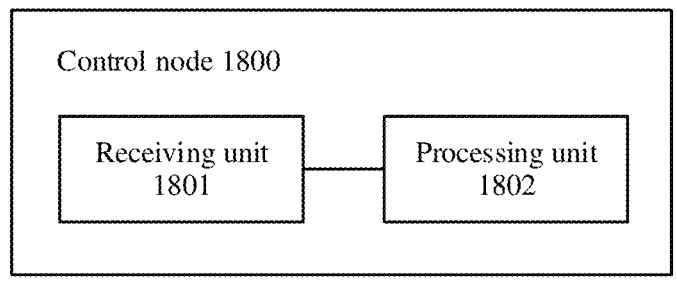
FIG. 18 is a schematic structural diagram of a control node according to an embodiment of this disclosure.

The method for evaluating transmission performance related to a network node provided in this disclosure is described above in detail with reference to FIG. 5, FIG. 7, FIG. 11A and FIG. 11B, FIG. 12A and FIG. 12B, and FIG. 14A and FIG. 14B. A control node 1800 provided in this disclosure is described below with reference to FIG. 18. The control node 1800 is coupled to each of a plurality of network nodes included in a path from a source node to a destination node, and the control node 1800 in this embodiment is configured to perform the method for evaluating transmission performance related to a network node in the foregoing embodiment. For a specific performing process, refer to the foregoing embodiment. Details are not described again.

The control node 1800 includes:

a receiving unit 1801, configured to receive a mirrored packet from the network node, where the mirrored packet carries a generation timestamp and generation location information, the generation timestamp is used to indicate a timestamp of a time for generating the mirrored packet, and the generation location information is used to indicate a location at which the mirrored packet is generated; and a processing unit 1802, configured to evaluate, based on the mirrored packet, transmission performance of at least a part of link that is related to the network node and that is in the path.

Optionally, the receiving unit 1801 is configured to: receive a first mirrored packet from the network node, where first generation location information carried in the first mirrored packet is used to indicate that the first mirrored packet is generated at a first packet mirroring point of the network node, and a first generation timestamp carried in the first mirrored packet is used to indicate a timestamp at which the first packet mirroring point generates the first mirrored packet; and/or receive a second mirrored packet from the network node, where second generation location information carried in the second mirrored packet is used to indicate that the second mirrored packet is generated at a second packet mirroring point of the network node, and a second generation timestamp carried in the second mirrored packet is used to indicate a timestamp at which the second packet mirroring point generates the second mirrored packet.

Optionally, the processing unit 1802 is configured to generate first event information when the second mirrored packet from the network node is not received within first target duration, where the first event information is used to indicate that a packet loss event occurs inside the network node, a timing start point of the first target duration is the first generation timestamp carried in the first mirrored packet that is received by the receiving unit 1801, and the first generation location information carried in the first mirrored packet and the second generation location information carried in the second mirrored packet are jointly used to indicate the network node.

Optionally, the path further includes a next-hop network node of the network node, and the processing unit 1802 is configured to generate second event information when a third mirrored packet from the next-hop network node is not received within second target duration, where the second event information is used to indicate that a packet loss event occurs on a link between the network node and the next-hop network node, a timing start point of the second target duration is the second generation timestamp carried in the second mirrored packet that is received by the receiving unit 1801 from the network node, and the generation location information carried in the second mirrored packet is used to indicate the network node.

Optionally, the processing unit 1802 is further configured to obtain a first target delay, where the first target delay is a difference between a second generation timestamp and a first generation timestamp that are sent by a same network node.

Optionally, the processing unit 1802 is configured to generate first congestion indication information when the first target delay is greater than or equal to a first timeout threshold, where the first congestion indication information is used to indicate that a network congestion event occurs inside the network node.

Optionally, the path includes a network node and a next-hop network node that are adjacent, the next-hop network node is a next-hop network node of the network node, and the processing unit 1802 is further configured to obtain a second target delay, where the second target delay is a difference between a generation timestamp that is sent by the next-hop network node and the second generation timestamp that is sent by the network node.

Optionally, the processing unit 1802 is configured to generate second congestion indication information when the second target delay is greater than or equal to a second timeout threshold, where the second congestion indication information is used to indicate that a network congestion event occurs on a link between the network node and the next-hop network node.

Optionally, the generation location information includes a universally unique identifier UUID of the network node, and the processing unit 1802 is further configured to obtain the UUID of each network node in the path based on the mirrored packet that is received from each network node in the path.

A specific structure of a device is described below from a perspective of entity hardware with reference to FIG. 19 by using an example. The device shown in FIG. 19 may be used as a control node or a network node to perform the method for evaluating transmission performance related to a network node in the foregoing embodiment. For a specific performing process, refer to the foregoing embodiment. Details are not described again.

Figure 19:
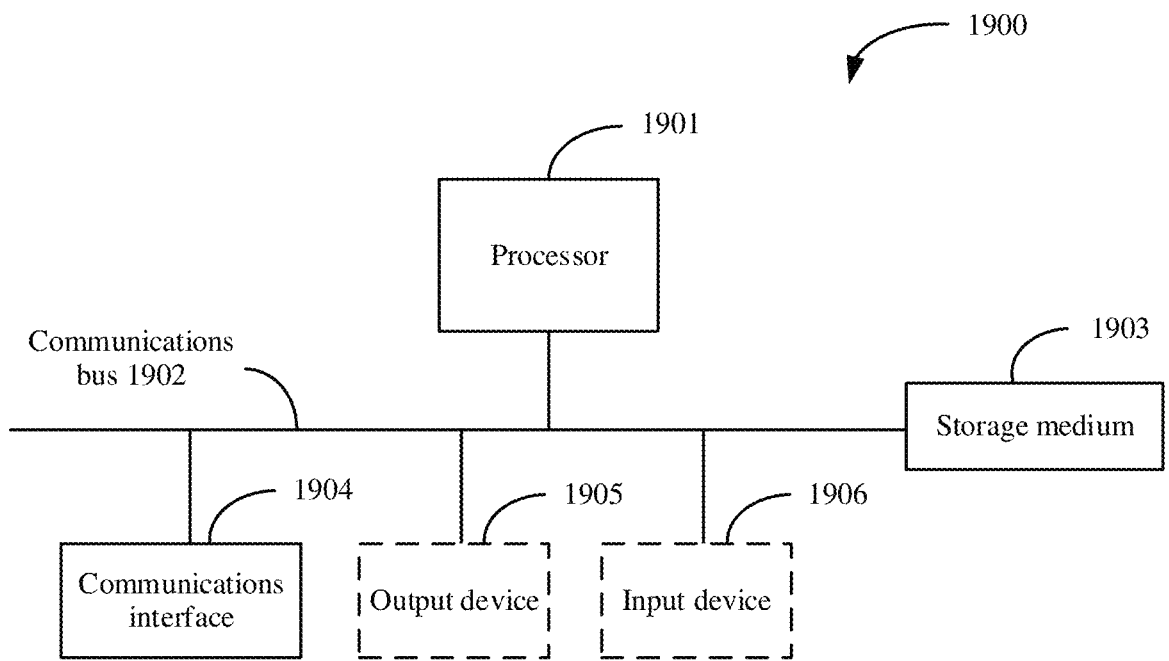
FIG. 19 is a schematic structural diagram of a device configured to perform a method for evaluating transmission performance related to a network node according to an embodiment of this disclosure.

As shown in FIG. 19, a device 1900 includes at least one processor 1901, a communications bus 1902, a storage medium 1903, and at least one communications interface 1904.

The processor 1901 may be a general-purpose central processing unit (CPU), a microprocessor, an application-specific integrated circuit (ASIC), or one or more integrated circuits configured to control program execution of the solutions in the present invention. In this embodiment, an example in which the processor 1901 is an integrated circuit is used for description.

The communications bus 1902 may include a path for transmitting information between the foregoing components.

The communications interface 1904 uses any apparatus such as a transceiver. For example, the communications interface 1904 may be an input/output interface, a pin, or a circuit. The communications interface 1904 is configured to communicate with another device or a communications network, for example, the Ethernet, a radio access network (RAN), or a wireless local area network (WLAN).

The storage medium 1903 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM), another optical disk storage, an optical disc storage (including a compact disc, a laser disc, an optical disc, a digital versatile disc, a Blu-ray disc, or the like), a disk storage medium, another magnetic storage device, or any other medium that can be used to carry or store expected program code in a form of instructions or a data structure and that can be accessed by a computer. However, this is not limited thereto. The storage medium may exist independently, and is connected to the processor through the bus. The storage medium may alternatively be integrated with the processor.

In specific implementation, in an embodiment, the device 1900 may further include an output device 1905 and an input device 1906. The output device 1905 communicates with the processor 1901.

This disclosure further provides a computer-readable storage medium. The computer-readable storage medium stores a computer program. When the computer program is executed by a computer, the computer is enabled to perform an operation and/or processing performed by a network node in any method embodiment, or the computer is enabled to perform an operation and/or processing performed by a control node in any method embodiment.

This disclosure further provides a computer program product. The computer program product includes computer program code. When the computer program code is run on a computer, the computer is enabled to perform an operation and/or processing performed by a network node in any method embodiment, or the computer is enabled to perform an operation and/or processing performed by a control node in any method embodiment.

This disclosure further provides a chip. The chip includes a processor, and a memory configured to store a computer program is disposed independent of the chip. The processor is configured to execute the computer program stored in the memory, to perform an operation and/or processing performed by a network node in any method embodiment, or to perform an operation and/or processing performed by a control node in any method embodiment. Further, the chip may alternatively include a memory and/or a communication interface. The communication interface may be an input/output interface, an input/output circuit, or the like.

The processor mentioned in the foregoing embodiments may be an integrated circuit chip, and has a signal processing capability. In an implementation process, steps in the foregoing method embodiments may be implemented by using an integrated logical circuit of hardware in the processor or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like. Steps in the methods disclosed in the embodiments of this disclosure may be directly performed and accomplished by a hardware coding processor, or may be performed and accomplished by a combination of hardware and software modules in the coding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and accomplishes the steps in the foregoing methods in combination with hardware of the processor.

A person of ordinary skill in the art may be aware that, in combination with units and algorithm steps in the examples described in the embodiments disclosed in this specification, the embodiments may be implemented by electronic hardware or a combination of computer software and electronic hardware. This specifically depends on specific applications and design constraints of the technical solutions. A person skilled in the art may use different methods to implement the described functions for each particular application, but it should not be considered that the implementation goes beyond the scope of this disclosure.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the prior art, or a part of the technical solutions may be implemented in a form of a software product. The computer software product is stored in a storage medium, and includes several instructions for instructing a computer device (which may be a personal computer, a server, a network device, or the like) to perform all or a part of the steps in the methods described in the embodiments of this disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A system for evaluating transmission performance related to a network node, wherein the system comprises the network node and a control node coupled to the network node, and the network node belongs to a path; and
    the network node is configured to obtain a test packet, wherein the test packet comprises a 5-tuple corresponding to the path, and process the test packet by using a virtual switch, to generate a mirrored packet corresponding to the test packet, wherein the mirrored packet carries a generation timestamp and generation location information, the generation timestamp is used to indicate a timestamp of a time for generating the mirrored packet, and the generation location information is used to indicate a location at which the mirrored packet is generated; and
    the control node is configured to receive the mirrored packet from the network node, to evaluate, based on the mirrored packet, the transmission performance of at least a part of a link that is related to the network node and that is in the path;
    wherein the test comprises a first identifier field having a first value and a second identifier field having a second value, the first value and the second value jointly indicate that the test packet is a test packet, and a bit length of the second identifier field is greater than a bit length of the first identifier field.

2. The system according to claim 1, wherein the transmission performance of the at least a part of the link that is related to the network node comprises a first transmission performance of the network node, and/or another transmission performance of a link between the network node and any other network node in the path.

3. The system according to claim 1, wherein in order to perform the processing of the test packet by using the virtual switch to generate the mirrored packet of the test packet, the network node is further configured to:
    mirror the test packet by using a first packet mirroring point, to generate a first mirrored packet, wherein the test packet flows into the virtual switch through the first packet mirroring point; and/or
    mirror the test packet by using a second packet mirroring point, to generate a second mirrored packet, wherein the test packet flows out of the virtual switch through the second packet mirroring point.

4. The system according to claim 3, wherein the control node is further configured to:
    generate first event information when the second mirrored packet from the network node is not received within a first target duration, wherein the first event information is used to indicate that a packet loss event occurs inside the network node, a timing start point of the first target duration is a first generation timestamp carried in the first mirrored packet that is received by the control node, and the generation location information carried in the first mirrored packet and the generation location information carried in the second mirrored packet are jointly used to indicate the network node.

5. The system according to claim 3, wherein the system further comprises a next-hop network node of the network node in the path;
    the network node is further configured to send the test packet as processed to the next-hop network node;
    the next-hop network node is configured to: receive the test packet from the network node, generate a third mirrored packet based on the test packet, and send the third mirrored packet to the control node; and
    the control node is further configured to generate event information when the third mirrored packet from the next-hop network node is not received within a target duration, wherein the event information is used to indicate that a packet loss event occurs on a link between the network node and the next-hop network node, a timing start point of the target duration is the generation timestamp carried in the second mirrored packet that is received by the control node from the network node, the generation location information carried in the second mirrored packet is used to indicate the network node, and generation location information carried in the third mirrored packet is used to indicate the next-hop network node.

6. The system according to claim 1, wherein the first identifier field is a pre-matched bit field in a packet header, and the second identifier field is located inside payload data of the test packet.

7. The system according to claim 1, wherein the network node is further configured to:
    determine at least one pre-matched packet from a plurality of received packets based on the first identifier field having the first value; and
    determine the test packet from the at least one pre-matched packet based on the second identifier field having the second value.

8. A method for evaluating transmission performance related to a network node, wherein the method is used for the network node, the network node belongs to a path from a source node to a destination node, and the method comprises:

obtaining, by the network node, a test packet, wherein the test packet comprises a 5-tuple corresponding to the path;

processing, by the network node, the test packet by using a virtual switch, to generate a mirrored packet corresponding to the test packet, wherein the mirrored packet carries a generation timestamp and generation location information, the generation timestamp is used to indicate a timestamp of a time for generating the mirrored packet, the generation location information is used to indicate a location at which the mirrored packet is generated, and the mirrored packet is used to evaluate the transmission performance of at least a part of a link that is related to the network node and that is in the path; and sending, by the network node, the mirrored packet to a control node;

wherein the test packet comprises a first identifier field having a first value and a second identifier field having a second value, the first value and the second value jointly indicate that the test packet is a test packet, and a bit length of the second identifier field is greater than a bit length of the first identifier field.

9. The method according to claim 8, wherein the transmission performance of the at least a part of the link that is related to the network node comprises a first transmission performance of the network node, and/or another transmission performance of a link between the network node and the any other network node in the path.

10. The method according to claim 8, wherein the processing, by the network node, of the test packet by using the virtual switch, to generate the mirrored packet of the test packet comprises:

mirroring the test packet by using a first packet mirroring point of the network node, to generate a first mirrored packet, wherein the test packet flows into the virtual switch through the first packet mirroring point; and/or mirroring the test packet by using a second packet mirroring point of the network node, to generate a second mirrored packet, wherein the test packet flows out of the virtual switch through the second packet mirroring point.

11. The method according to claim 8, wherein the first identifier field is a pre-matched bit field in a packet header, and the second identifier field is located inside payload data of the test packet.

12. The method according to claim 8, wherein the obtaining, by the network node, of the test packet comprises:

determining, by the network node, at least one pre-matched packet from a plurality of received packets based on the first identifier field having the first value; and determining, by the network node, the test packet from the at least one pre-matched packet based on the second identifier field having the second value.

13. The method according to claim 10, wherein if the network node is the destination node, after the obtaining, by the network node, of the test packet, the method further comprises:

when the network node receives a first test packet, sending, by the network node, a second test packet to the source node, wherein a source address carried in the first test packet is an address of the source node and a destination address carried in the first test packet is an address of the destination node, and a source address carried in the second test packet is the address of the destination node and a destination address carried in the second test packet is the address of the source node.

14. The method according to claim 13, wherein if the network node is the destination node, the method further comprises: ending, by the second packet mirroring point of the network node, forwarding of the first test packet.

15. The method according to claim 13, wherein if the network node is the source node, the method further comprises: ending, by the second packet mirroring point of the network node, forwarding of the second test packet.

16. A method for evaluating transmission performance related to a network node, wherein the method is used for a control node, the control node is coupled to the network node, the network node belongs to a path from a source node to a destination node, and the method comprises:

receiving, by the control node, a mirrored packet from the network node, wherein the mirrored packet carries a generation timestamp and generation location information, the generation timestamp is used to indicate a timestamp of a time for generating the mirrored packet, and the generation location information is used to indicate a location at which the mirrored packet is generated; and evaluating, by the control node based on the mirrored packet, the transmission performance of at least a part of a link that is related to the network node and that is in the path:

wherein the test packet comprises a first identifier field having a first value and a second identifier field having a second value, the first value and the second value jointly indicate that the test packet is a test packet, and a bit length of the second identifier field is greater than a bit length of the first identifier field.

17. The method according to claim 16, wherein the receiving, by the control node, of the mirrored packet from the network node comprises:

receiving, by the control node, a first mirrored packet from the network node, wherein first generation location information carried in the first mirrored packet is used to indicate that the first mirrored packet is generated at a first packet mirroring point of the network node, and a first generation timestamp carried in the first mirrored packet is used to indicate a timestamp at which the first packet mirroring point generates the first mirrored packet; and/or receiving, by the control node, a second mirrored packet from the network node, wherein second generation location information carried in the second mirrored packet is used to indicate that the second mirrored packet is generated at a second packet mirroring point of the network node, and a second generation timestamp carried in the second mirrored packet is used to indicate a timestamp at which the second packet mirroring point generates the second mirrored packet.

18. The method according to claim 17, wherein the method further comprises:

obtaining, by the control node, a first target delay, wherein the first target delay is a difference between the second generation timestamp carried in the second mirrored packet and the first generation timestamp carried in the first mirrored packet.

19. The method according to claim 16, wherein the first identifier field is a pre-matched bit field in a packet header, and the second identifier field is located inside payload data of the test packet.

20. The method according to claim 16, wherein:
the first identifier field having the first value is for determining at least one pre-matched packet from a plurality of received packets; and
the second identifier field having the second value is for determining the test packet from the at least one pre-matched packet.

\* \* \* \* \*

UNITED STATES PATENT AND TRADEMARK OFFICE
CERTIFICATE OF CORRECTION

PATENT NO. : 12,126,514 B2
APPLICATION NO. : 17/586853
DATED : October 22, 2024
INVENTOR(S) : Hao Wu et al.

It is certified that error appears in the above-identified patent and that said Letters Patent is hereby corrected as shown below:

In the Claims

At Column 55, Line 59, please amend Claim 1 as follows:
"wherein the test packet comprises a first identifier field having a first value and..."

Signed and Sealed this
Nineteenth Day of November, 2024

Katherine Kelly Vidal
*Director of the United States Patent and Trademark Office*